United States Patent
Shi et al.

(10) Patent No.: US 7,993,562 B2
(45) Date of Patent: Aug. 9, 2011

(54) METHOD OF PRODUCING A THERMOPLASTIC FILM

(75) Inventors: Zemin Shi, Minami-ashigara (JP); Kazuhiro Ono, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1084 days.

(21) Appl. No.: 11/808,101

(22) Filed: Jun. 6, 2007

(65) Prior Publication Data

US 2007/0281112 A1    Dec. 6, 2007

(30) Foreign Application Priority Data

Jun. 6, 2006   (JP) ................... 2006/157004
Jul. 31, 2006  (JP) ................... 2006/208740

(51) Int. Cl.
  B29C 41/24   (2006.01)
  B29C 47/88   (2006.01)
(52) U.S. Cl. .......... 264/212; 264/1.34; 264/211.12; 264/217; 264/288.4; 264/290.2
(58) Field of Classification Search .......... 264/1.1, 264/1.34, 1.6, 2.7, 210.1, 210.2, 211.12, 264/212, 217, 288.4, 290.2, 175
See application file for complete search history.

(56) References Cited

U.S. PATENT DOCUMENTS

| 5,658,514 A * | 8/1997 | Fujii et al. ............. 264/210.2 |
| 7,427,372 B2 * | 9/2008 | Morita ................. 264/210.2 |
| 2007/0145615 A1 * | 6/2007 | Heki ..................... 264/1.34 |

FOREIGN PATENT DOCUMENTS

| JP | 2000-352620 A | 12/2000 |
| JP | 2003-232930 A | 8/2003 |
| JP | 2006-063169 A | 3/2006 |

OTHER PUBLICATIONS

A. N. Baczynski et al., *Physics Handbook,* Jan. 1957, p. 60, Commercial Press, Ltd., and English language translation of excerpt.
Chinese Official Action dated Apr. 27, 2011, issued in corresponding Chinese Application No. 200710109944.2, and English language translation thereof.

* cited by examiner

*Primary Examiner* — Mathieu D. Vargot
(74) *Attorney, Agent, or Firm* — Buchanan Ingersoll & Rooney PC

(57) ABSTRACT

A method for producing a thermoplastic film, comprising cooling and solidifying a filmy thermoplastic melt resin, by holding it between a metallic presser and a metallic casting roll for cooling; wherein the temperature of the filmy thermoplastic resin just before being held between the metallic presser and the casting roll for cooling is from $Tg+20°$ C. to $Tg+90°$ C. and a difference between a surface temperature (Tt) of the metallic presser and a surface temperature (T1) of the casting roll for cooling satisfies the formula (1) and a contact length Q satisfies the following formula (2)

$$0.5° \text{ C.} \leq T1-Tt \leq 20° \text{ C.} \tag{1}$$

$$0.1 \text{ cm} \leq Q \leq 8 \text{ cm} \tag{2}$$

The method provides a thermoplastic film having high thickness accuracy and surface smoothness.

11 Claims, 5 Drawing Sheets

METHOD OF PRODUCING A THERMOPLASTIC FILM

FIELD OF THE INVENTION

The present invention relates to a thermoplastic film and a method for producing it, in particular to a thermoplastic film having a quality favorable for liquid-crystal display devices and a method for producing it, and also relates to a polarizing plate, an optical compensation film, an antireflection film and a liquid-crystal display device comprising it.

BACKGROUND OF THE INVENTION

Heretofore, in producing thermoplastic films such as cellulose acylate films for use in liquid-crystal image display devices, a solution-casting method has been principally carried out, which comprises dissolving cellulose acylate in a chlorine-containing organic solvent such as dichloromethane, casting it on a substrate, and drying it to form a film. Of chlorine-containing organic solvents, dichloromethane is favorably used since it is a good solvent for cellulose acylate and since it has advantages in that its boiling point is low (about 40° C.) and it may be readily vaporized in the film-forming and drying step in its production process.

On the other hand, recently, from the viewpoint of environmental protection, it has become strongly required to retard release of organic solvents such as typically chlorine-containing organic solvents. Accordingly, various measures are now taken for almost completely preventing release of organic solvents in outdoor air. For example, employed is a method of preventing organic solvent leakage through a more severe closed system, and even if an organic solvent leaks out by any chance in a process of film formation, employed is a method of installing a gas absorption tower to adsorb and treat it before it is released in outdoor air. Further, before discharged, an organic solvent is burnt with flames or is decomposed with electron beams, whereby the organic solvent is not almost discharged out. However, it is still impossible to completely prevent the release of organic solvents, and further improvements are required.

A melt-casting method of producing a film of cellulose acylate has been developed as a film formation method not using an organic method (for example, see JP-A 2000-352620, 2006-63169). These references describe a technique of prolonging the carbon chain of the ester group of cellulose acylate to lower the polymer, thereby facilitating melt-casting film formation of the polymer. Concretely, cellulose acetate is changed into cellulose propionate or the like, thereby facilitating melt-casting film formation of the polymer.

Recently, it has been proposed to use, in place of cellulose acylate, a thermoplastic saturated norbornene-based resin film for a protective layer of a polarizing element, of which the photoelasticity is low, or that is, the birefringence change under external stress applied thereto is small and the optical properties are therefore hardly influenced (for example, see JP-A 2003-232930).

In case where the above-mentioned cellulose acylate film or thermoplastic saturated norbornene-based resin film is produced according to a melt-casting film formation method, the optical properties of the film produced are satisfactory in some degree. However, even though the optical properties of the film are satisfactory in some degree, the surface smoothness thereof in its formation is insufficient, or the thickness accuracy may fluctuate or there may occur a difference in the surface smoothness between the two surfaces of the film owing to the unevenness of the temperature change in the film, and further, there may occur die streaks and lateral unevenness; and for these reasons, it has heretofore been extremely difficult to obtain a film that is excellent both in its optical properties and in its physical properties as a protective film suitable for polarizing plates.

In case where the thickness accuracy and the surface smoothness of a film are unsatisfactory, the length of the film may fluctuate; and when the film is wound up, then its outward appearance may worsen. Further, when the film is used as a protective film for a polarizing element, then there may occur another problem in that there is adhesion unevenness between the film and a polarizing element. On the other hand, when the film is used as a substrate of a retardation plate, then there may occur still another problem in that it may cause retardation unevenness when stretched. Further, in case where the surface smoothness of the film is unsatisfactory and where the film has die streaks or lateral unevenness and when the film is built in a liquid-crystal display device as a protective film of the polarizing element therein, then we have experiences still another problem in that the film causes blurred display and image distortion.

From the above, it is earnestly desired to develop a thermoplastic film having excellent thickness accuracy and surface smoothness in addition to having good optical properties.

SUMMARY OF THE INVENTION

In consideration of the above-mentioned prior art situation, an object of the invention is to provide a method for producing a thermoplastic film at high producibility, capable of efficiently producing a film having high thickness accuracy and surface smoothness. Accordingly, the method may make it possible to efficiently produce a thermoplastic film having high thickness accuracy, having extremely small surface roughness Ra, having no trouble of rough streaks on its surface and having small retardation (Re and Rth) with suppressed optical distortion. Another object of the invention is to provide a thermoplastic film having further more improved thickness accuracy, surface smoothness and optical properties, according to the production method of the invention having excellent producibility.

Still another object of the invention is to provide a polarizing plate, an optical compensation film, an antireflection film and a liquid-crystal display device capable of preventing blurred display and image distortion, by the use of the thermoplastic film of the invention.

The inventors of the present invention have specifically noted a polishing film formation method that uses a metallic presser such as a metallic touch roll or a metallic belt, for example, a polishing touch roll film formation method or a polishing metallic belt film formation method, as a means for solving the above-mentioned problems. The present inventors have found that, in the polishing film formation method, the film thickness accuracy and surface smoothness may be improved by specifically controlling the condition in film formation as defined in the invention, and further, a thermoplastic film having small retardation (Re and Rth) can be produced by controlling the optical distortion therein. Accordingly, the inventors have provided the present invention that comprises the following constitutive embodiments.

(1) A method for producing a thermoplastic film, comprising cooling and solidifying a filmy thermoplastic resin melt extruded out through a die, by holding it between a metallic presser and a metallic casting roll for cooling; wherein the temperature of the filmy thermoplastic resin just before being held between the metallic presser and the casting roll for cooling is from Tg+20° C. to Tg+90° C., in which Tg is a glass translation temperature of the thermoplastic resin, and a difference between a surface temperature (Tt) of the metallic presser and a surface temperature (T1) of the casting roll for cooling satisfies the following formula (1), and a contact length Q, which is a length contacting one surface of the filmy thermoplastic resin with the metallic presser and contacting the other surface of the filmy thermoplastic resin with the casting roll for cooling, satisfies the following formula (2):

$$0.5° C. \leq T1-Tt \leq 20° C. \tag{1}$$

$$0.1 \text{ cm} \leq Q \leq 8 \text{ cm} \tag{2}$$

wherein T1 indicates a surface temperature of the casting roll for cooling; Tt indicates a surface temperature of the metallic presser; Q indicates a contact length, which is a length contacting one surface of the filmy thermoplastic resin with the metallic presser and contacting the other surface of the filmy thermoplastic resin with the casting roll for cooling.

(2) A method for producing a thermoplastic film, comprising cooling and solidifying a filmy thermoplastic resin melt extruded out through a die, by holding it between a metallic presser and a metallic casting roll for cooling; wherein the temperature of the filmy thermoplastic resin just before being held between the metallic presser and the casting roll for cooling is from Tg+20° C. to Tg+90° C., in which Tg means a glass transition temperature of the thermoplastic resin, and a difference between a surface temperature (Tt) of the metallic presser and a surface temperature (T1) of the casting roll for cooling satisfies the following formula (1), and a center angle θ, which is derived from a contact length Q, which is a length contacting one surface of the filmy thermoplastic resin with the metallic presser and contacting the other surface of the filmy thermoplastic resin with the casting roll for cooling, and a radius of the metallic casting roll for cooling satisfies the following formula (3):

$$0.5° C. \leq T1-Tt \leq 20° C. \tag{1}$$

$$0.2° \leq \theta \leq 31°. \tag{3}$$

wherein T1 indicates a surface temperature of the casting roll for cooling; Tt indicates a surface temperature of the metallic presser; Q indicates a contact length, which is a length contacting one surface of the filmy thermoplastic resin with the metallic presser and contacting the other surface of the filmy thermoplastic resin with the casting roll for cooling.

(3) The method for producing a thermoplastic film according to (1) or (2), wherein the metallic presser is a metallic elastic touch roll or an endless metallic belt runnable under tension.

(4) The method for producing a thermoplastic film according to (1) or (2), wherein the surface temperature (Tt) of the metallic presser is from Tg−40° C. to Tg+50° C., in which Tg means a glass transition temperature of the thermoplastic resin.

(5) The method for producing a thermoplastic film according to (1) or (2), wherein the surface roughness Ra of the metallic presser and the casting roll for cooling is from 0 to 100 nm.

(6) The method for producing a thermoplastic film according to (1) or (2), wherein from 1 to 6 metallic rigid rolls are installed on the downstream side of the metallic casting roll for cooling in series.

(7) A thermoplastic film produced according to the production method of (1) or (2), which is such that the film thickness is from 20 to 300 μm, the film thickness fluctuation in the transverse direction and in the longitudinal direction are from 0 to 3 μm, the film surface roughness Ra is from 0.01 to 200 nm, and the ratio of the film surface roughness Ra of one surface to the other surface is from 0.8 to 1.2.

(8) The thermoplastic film according to (7), which has a residual solvent content of at most 0.01% by mass and satisfies the following formulae (I) and (II):

$$Re \leq 10, \text{ and } |Rth| \leq 15, \tag{I}$$

$$|Re(10\%)-Re(80\%)|<5, \text{ and } |Rth(10\%)-Rth(80\%)|<15, \tag{II}$$

wherein Re and Rth indicate the retardation value (unit: nm) of the film in the in-plane direction and the thickness direction, respectively, at a wavelength of 590 nm; and Re (H %) and Rth (H %) mean the retardation value of the film in the in-plane direction and the thickness direction, respectively, at a relative humidity of H (unit: %) and at a wavelength of 590 nm.

(9) The thermoplastic film according to (7), wherein the thermoplastic resin is a cellulose acylate having a number-average molecular weight of from 20,000 to 70,000 and satisfying all the following formulae (S-1) to (S-3):

$$2.5 \leq X+Y \leq 3.0, \tag{S-1}$$

$$0 \leq X \leq 1.8, \tag{S-2}$$

$$1.0 \leq Y \leq 3.0; \tag{S-3}$$

wherein X means a degree of substitution of the hydroxyl group in cellulose with an acetyl group; Y means a total degree of substitution of the hydroxyl group in cellulose acylate with an acyl group having from 3 to 22 carbon atoms.

(10) The thermoplastic film according to (7), which contains a cellulose acylate having a composition that satisfies the following formulae (T-1) and (T-2):

$$2.5 \leq A+C \leq 3.0, \tag{T-1}$$

$$0.1 \leq C < 2, \tag{T-2}$$

wherein A indicates a degree of substitution with an acetyl group; and C indicates a degree of substitution with a substituted or unsubstituted aromatic acyl group.

(11) The thermoplastic film according to (7), which contains a norbornene resin.

(12) The thermoplastic film according to (7), which contains at least one stabilizer having a molecular weight of at least 500 in an amount of from 0.01 to 3% by mass of the thermoplastic resin, and has a melt viscosity at 240° C. of from 100 to 3000 Pa·s.

(13) The thermoplastic film according to (7), which was stretched in at least one direction by from 1 to 300%, and has an in-plane retardation (Re) at 25° C. and at a relative humidity of 60% of from 0 to 200 nm and a thickness direction retardation (Rth) at 25° C. and at a relative humidity of 60% of from −100 to 300 nm.

(14) The thermoplastic film according to (7), which was stretched in an aspect ratio, length/width, L/W of from more than 2 to 50, or from 0.01 to 0.3.

(15) The thermoplastic film according to (7), which was stretched in the transverse direction and then pretreated at a temperature higher than the stretching temperature by from 1° C. to 50° C.

(16) The thermoplastic film produced according to (7), which was stretched in the transverse direction and then heat-treated at a temperature lower than the stretching temperature by from 1° C. to 50° C.

(17) The thermoplastic film according to (7), which was stretched in at least one direction of longitudinal direction or transverse direction and then thermally relaxed by conveying it at a temperature of from (Tg−50° C.) to (Tg+30° C.) under a tension of from 0.1 kg/m to 20 kg/m.

(18) A polarizing plate, an optical compensation film or an antireflection film comprising a thermoplastic film of (7).

(19) A liquid-crystal display device comprising at least one of a polarizing plate, an optical compensation film and an antireflection film of (18).

According to the invention, there is provided a method for producing a thermoplastic film at high producibility, which produces a thermoplastic film having high thickness accuracy and surface smoothness. Therefore, according to the method for producing a thermoplastic film of the invention, a thermoplastic film can be efficiently produced, having high thickness accuracy, having extremely small surface roughness Ra, having no trouble of rough streaks on its surface and having small retardation (Re and Rth) with suppressed optical distortion. Further, according to the invention, there is provided a thermoplastic film having further more improved thickness accuracy, surface smoothness and optical properties.

In addition, according to the invention, there are provided a polarizing plate, an optical compensation film, an antireflection film and a liquid-crystal display device capable of preventing blurred display and image distortion.

DESCRIPTION OF SPECIFIC EMBODIMENTS

Figure 1:
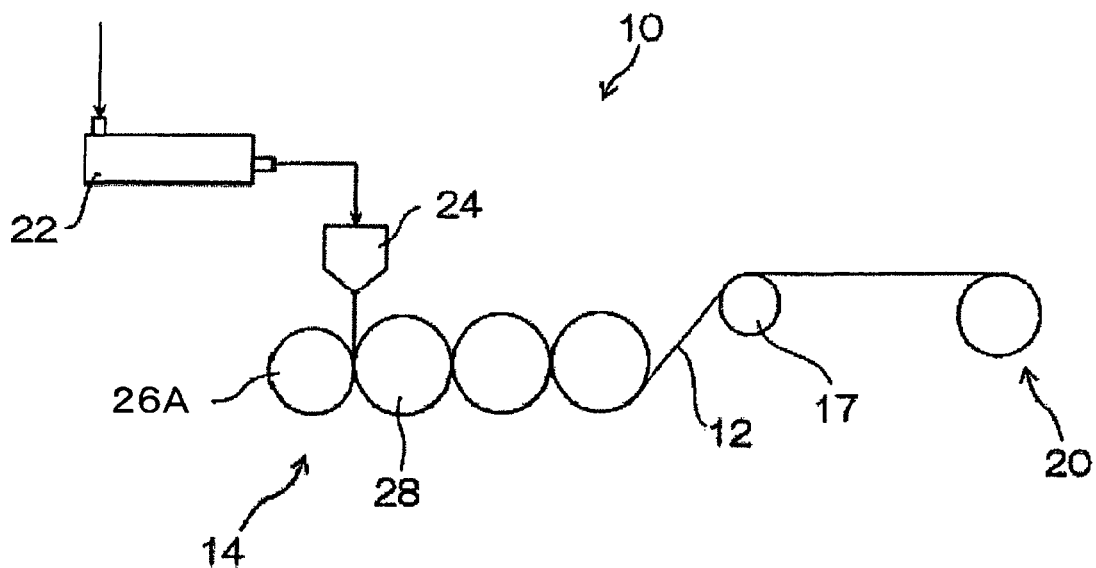
FIG. 1 is a graphical view showing one example of an outline constitution of an apparatus for producing a thermoplastic film by the use of a polishing metallic elastic touch roll.

Preferred embodiments of the method for producing a thermoplastic film of the invention and the thermoplastic film obtained according to the production method are described suitably with reference to the drawings. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

<<Method for Producing Thermoplastic film>>

The method for producing a thermoplastic film of the invention comprises cooling and solidifying a filmy thermoplastic resin melt extruded out through a die, by holding it between a metallic presser and a metallic casting roll for cooling, wherein a temperature of the filmy thermoplastic resin just before being held between the metallic presser and the casting roll for cooling is from Tg+20° C. to Tg+90° C., in which Tg means a glass transition temperature of the thermoplastic resin, and a difference between a surface temperature (Tt) of the metallic presser and a surface temperature (T1) of the casting roll for cooling satisfies the following formula (1), and a contact length Q, which is a length contacting one surface of the filmy thermoplastic resin with the metallic presser and contacting the other surface of the filmy thermoplastic resin with the casting roll for cooling, satisfies the following formula (2):

$$0.5° C. \leq T1-Tt \leq 20° C. \quad (1)$$

$$0.1 \text{ cm} \leq Q \leq 8 \text{ cm} \quad (2)$$

wherein T1 indicates a surface temperature of the casting roll for cooling; Tt indicates a surface temperature of the metallic presser; Q indicates a contact length, which is a length contacting one surface of the filmy thermoplastic resin with the metallic presser and contacting the other surface of the filmy thermoplastic resin with the casting roll for cooling.

Not specifically defined in point of its shape and material, the "metallic presser" as referred to herein may be any metallic presser capable of pressing the filmy thermoplastic resin melt extruded out through a die such as a T-die, to the surface of a metallic casting roll for cooling to thereby hold the filmy thermoplastic resin with the casting roll for cooling and to cool and solidify it. A known roll or endless belt may be used as the metallic presser. The metallic presser is preferably an elastic metallic presser. In the invention, preferred for the metallic presser is a surface-polishing roll or endless belt. Concretely, the metallic presser is preferably any of a metallic elastic touch roll or an endless metallic belt runnable under tension, more preferably a polishing metallic elastic roll (shown in FIG. 1 and FIG. 3) or an endless polishing metal belt runnable under tension (shown in FIG. 2 and FIG. 4).

The roll diameter R of the casting roll for cooling is preferably from 50 mm to 5000 mm, more preferably from 100 mm to 1000 mm, even more preferably from 120 mm to 600 mm.

According to the invention, the temperature of the filmy thermoplastic resin just before being held between the metallic presser and the casting roll for cooling is from Tg+20° C. to Tg+90° C., and the difference between a surface temperature (Tt) of the metallic presser and a surface temperature (T1) of the casting roll for cooling, and the contact length Q satisfy the above-mentioned formulae (1) and (2), respectively, whereby the formed film may be prevented from having a trouble of a roughened surface and may be improved in point of the thickness accuracy thereof, and in addition, the film may be prevented from having a residual distortion and having a retardation in its production. Accordingly, a film having excellent optical properties may be obtained.

Preferred embodiments of the method for producing a thermoplastic film of the invention are described below, with reference to the drawings.

Figure 2:
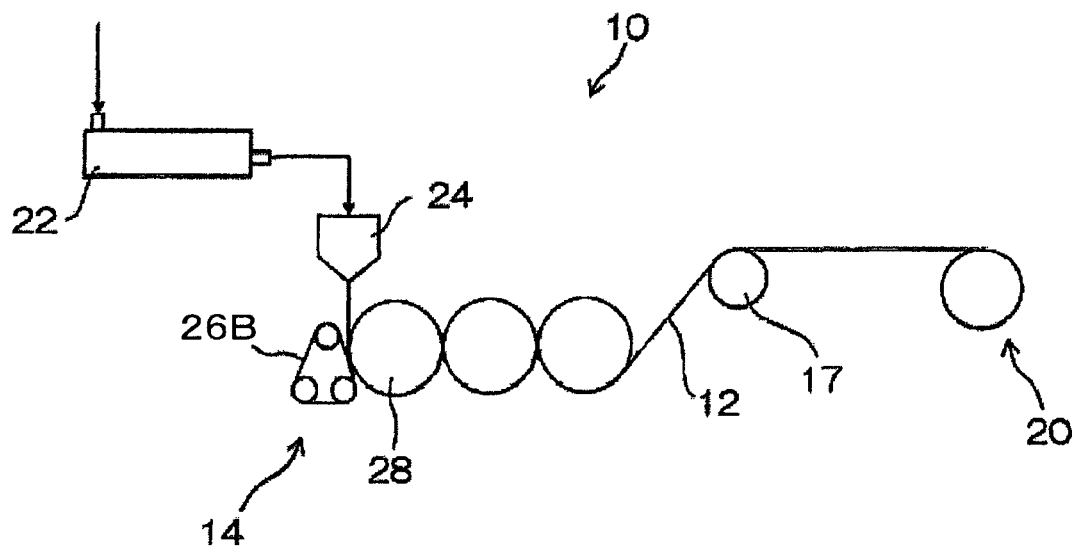
FIG. 2 is a graphical view showing one example of an outline constitution of an apparatus for producing a thermoplastic film by the use of an endless polishing metallic belt runnable under tension.

FIG. 1 shows one example of an outline constitution of an apparatus for producing a thermoplastic film by the use of a polishing metallic elastic roll. FIG. 2 shows one example of an outline constitution of an apparatus for producing a thermoplastic film by the use of an endless polishing metallic belt runnable under tension. As in FIG. 1 and FIG. 2, the film production apparatus 10 comprises mainly a film-forming zone 14 for forming a thermoplastic film (cellulose acylate film) 12, and a film-winding zone 20 for winding up the thermoplastic film 12.

As in FIG. 1, a thermoplastic resin melted in an extruder 22 is extruded out in the form of sheet through a die 24, and fed between a rotating metallic elastic touch roll 26A and a rotating metallic casting roll for cooling 28. Then, the filmy thermoplastic resin is held between the metallic elastic touch roll 26A and the metallic casting roll for cooling 28, and formed into a film in a mode of casting film formation. The filmy thermoplastic resin layer is thus cast-formed into a cellulose acylate film 12, and via a pass roll 17, it is wound up in the film-winding zone 20.

As in FIG. 2, a thermoplastic resin melted in an extruder 22 is extruded out in the form of sheet through a die 24, and fed between a rotating metallic belt 26B and a rotating metallic casting roll for cooling 28. Then, the filmy thermoplastic resin is held between the metallic belt 26B and the metallic casting roll for cooling 28, and formed into a film in a mode of casting film formation. The filmy thermoplastic resin layer is thus cast-formed into a thermoplastic film 12, and via a pass roll 17, it is wound up in the film-winding zone 20.

Next, the metallic elastic touch roll and the endless belt used as the metallic presser in the invention are described below.

Figure 3:
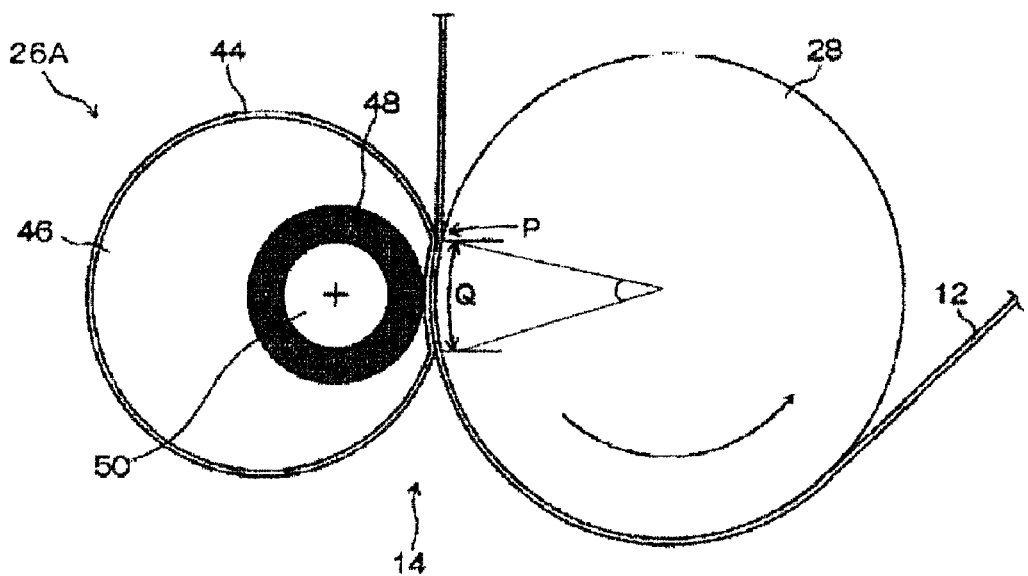
FIG. 3 is a cross-sectional view of the film-forming zone 14 that comprises a polishing metallic elastic touch roll.

FIG. 3 is a cross-sectional view of the film-forming zone 14 that comprises a polishing metallic elastic touch roll. As in FIG. 3, the metallic elastic touch roll 26A comprises an outer coat 44, a liquid medium layer 46, an elastic layer (inner cylinder) 48 and a metal shaft 50 in that order from its outer side. Owing to the rotation of the casting roll for cooling 28 that is kept in contact with the touch roll 26A via a sheet-like resin melt held therebetween, the outer coat 44 and the inner cylinder 48 of the elastic roll 26A rotate. When the sheet-like resin melt is held between a pair of polishing rolls (metallic elastic touch roll 26A, casting roll for cooling 28), then the metallic elastic touch roll 26A receives a reaction force from the casting roll for cooling 28 via the resin melt sheet, and it undergoes concaved elastic deformation, following the surface profile of the casting roll for cooling 28. The thickness of the outer coat 44 is preferably from 0.05 mm to 7.0 mm, more preferably from 0.2 mm to 5.0 mm. Concretely, for example, those described in JP-A 11-314263, 2002-36332, 11-235747, 2004-216717, 2003-145609, and WO97/28950 may be used herein.

Figure 4:
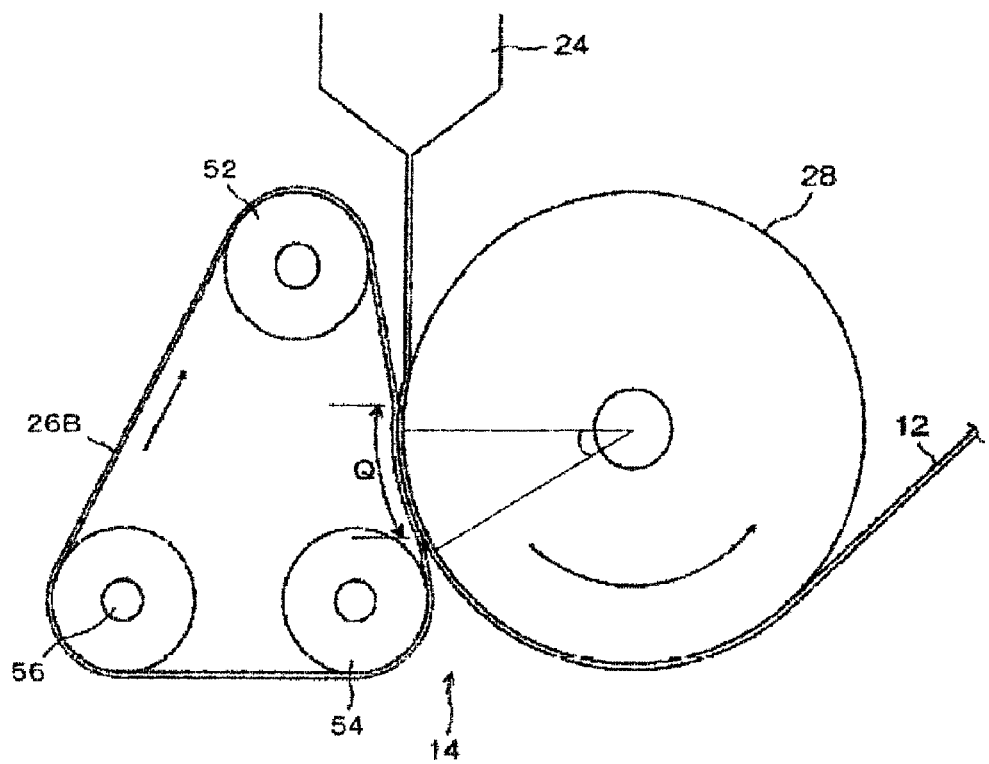
FIG. 4 is a cross-sectional view of the film-forming zone 14 that comprises an endless polishing metallic belt runnable under tension.

FIG. 4 is a cross-sectional view of the film-forming zone 14 that comprises an endless polishing metallic belt runnable under tension. As in FIG. 4, the endless metallic belt 26B in the invention is preferably formed of a thin metal film having a seamless structure with no welded joint. The belt is so constituted that it is held under tension by rolls 52, 54 and 56 so as not to be loosened and is run by the rotation of the rolls 52, 54 and 56. Accordingly, when the sheet-like resin melt is held by the metallic belt 26B and the casting roll for cooling in that condition, then the metallic belt 26B receives a reaction force from the casting roll for cooling 28 via the resin melt sheet, and it undergoes concaved elastic deformation, following the surface profile of the casting roll for cooling 28. The metallic belt 26B and the casting roll for cooling 28 are connected to a rotary driving unit such as a motor, and are made to rotate at nearly the same speed as the speed of the resin melt jetted out from the die 24 at the point at which the resin melt reaches the two.

In FIGS. 3 and 4, Q indicates the contact length of the thermoplastic resin to the metallic presser 26A, 26B and to the casting roll for cooling 28. The center angle θ is derived from the contact length Q of the filmy thermoplastic resin to the casting roll for cooling and the radius R of the casting roll for cooling.

According to the method for producing a thermoplastic film of the invention, the temperature of the filmy thermoplastic resin just before being held between the metallic presser such as the touch roll or the endless belt and the casting roll for cooling is from Tg+20° C. to Tg+90° C. in which Tg means a glass transition temperature of the thermoplastic resin, from the viewpoint that the thermoplastic resin may keep its flowability within a range within which the thermoplastic resin does not decompose. The wording "just before being held between" is meant to indicate the mean temperature of the thermoplastic resin within a range of at most 5 cm on the upstream side of the resin flow starting from a point at which the resin flow begins to be held under pressure between the metallic presser and the casting roll for cooling (pressing point P in FIG. 3).

When the temperature of the thermoplastic resin just before being held between the metallic presser and the casting roll for cooling is lower than Tg+20° C., then the leveling property of the resin melt when held between the two may be poor; but when it is higher than Tg+90° C., then the thermoplastic resin may fuse when held between the two. The temperature of the thermoplastic resin just before being held between the metallic presser and the casting roll for cooling is more preferably from Tg+25° C. to Tg+80° C., even more preferably from Tg+30° C. to Tg+50° C.

This is because, when the temperature of the filmy thermoplastic resin is controlled to fall within the range as defined in the invention just before being held between the metallic presser and the casting roll for cooling, then the leveling property of the resin film may be improved when held between the two and therefore no stress is given when the resin film is deformed. Accordingly, when the resin is controlled to have a temperature falling within the above-mentioned temperature range while it is pressed and deformed in its film formation, then the stress of the thermoplastic resin to be generated may be extremely small and therefore the thickness fluctuation unevenness and the residual retardation (Re, Rth) to occur in the formed film may be minimized. For further reducing the thickness accuracy fluctuation and the residual retardation in the transverse direction of the film, the temperature fluctuation in the transverse direction of the film is preferably smaller than ±10° C., more preferably smaller than ±5° C. The temperature fluctuation, if any, may cause stress fluctuation in deformation of the thermoplastic resin, therefore resulting in that the thickness and the residual retardation of the obtained film may fluctuate, and the optical axis of the film may shift owing to local stress concentration in a part of the film.

A concrete method for uniformly keeping the temperature of the thermoplastic resin just before being held between the metallic presser and the casting roll for cooling to fall within a range of from Tg+20° C. to Tg+90° C. is not specifically defined, for which, therefore, any known method may be employed not having any negative influence on the effect of the invention. For the method, for example, employable is a controlling method of controlling the die temperature of the T-die or the like used, or shortening the distance between the die and the metallic casting roll for cooling, or providing a heater, or providing a thermal insulation box.

In the method for producing a thermoplastic film of the invention, the difference between the surface temperature (Tt) of the metallic presser such as a metallic elastic touch roll or a metallic belt used and the surface temperature (T1) of the metallic casting roll for cooling is designed to satisfy the following formula (1), and therefore, when the filmy thermoplastic resin melt is led to pass between the two under pressure, the filmy resin melt may be smoothly led to the casting roll for cooling side, which is therefore extremely effective for canceling the sticking traces on the film and for improving the film surface smoothness. In addition, the film thickness fluctuation, the die streaks and the lateral unevenness owing to the roll driving fluctuation may be greatly reduced. Further, since the touch temperature is controlled within the range of the formula (1), the filmy resin melt hardly sticks to the pressing surface of the metallic presser (the touch surface of the touch roll), and in addition, it also hardly sticks to the roll surface of the casting roll for cooling, and therefore the thermoplastic film may be stably produced in a well-balanced condition.

$$0.5° C. \leq T1-Tt \leq 20° C. \tag{1}$$

When "T1−Tt" in formula (1) is lower than 0.5° C., then the filmy resin melt may stick to the metallic presser such as the metallic elastic touch roll or the metallic belt, and the formed film may have sticking traces and its surface smoothness may worsen. On the other hand, when it is higher than 20° C., then the filmy resin melt may excessively stick to the chill roll surface, and therefore lateral unevenness may occur on the formed film. In addition, when it is higher than 20° C., then there may occur a temperature difference between the two surfaces of the filmy resin melt being led to run between the rolls, and therefore the surface smoothness may differ and uneven between the two surfaces of the formed film. When the above-mentioned condition that "T1−Tt" is from 0.5° C. to 20° C. is satisfied, then it is good with no problem, but preferably it is from 1° C. to 15° C., more preferably from 2° C. to 10° C.

In addition, in the method for producing a thermoplastic film of the invention, the contact length Q, which is a length contacting one surface of the filmy thermoplastic resin with the metallic presser and contacting the other surface of the filmy thermoplastic resin with the casting roll for cooling, satisfies the following formula (2):

$$0.1 \text{ cm} \leq Q \leq 8 \text{ cm}. \tag{2}$$

The contact length Q (contact width) means the length of the contact of the filmy thermoplastic resin to the metallic presser (metallic elastic touch roll 26A or metallic belt 26B) and to the casting roll for cooling 28, in the circumferential direction, as in FIG. 3 and FIG. 4.

When the contact length Q is less than 0.1 cm, then the metallic presser such as the touch roll or the metallic belt could not fully follow the movement of the resin film or the rotary movement of the metallic casting roll for cooling with the result that air may penetrate in the space between the film and the chill roll thereby causing film thickness fluctuation. On the contrary, when the contact length is more than 8 cm, then the film thickness may fluctuate in the film running direction. This is because the pressure fluctuation to the resin film from the rolls and the viscosity of the resin being cooled may have some influence on the film thickness. In addition, when the contact length is too large, then the contact pressure dust after the start of contacting may be small with the result that the resin may solidify under a weak pressure and the film thickness fluctuation may increase. As opposed to this, in the method for producing a thermoplastic film of the invention, the contact length Q is defined to fall within the specific range as above, and therefore the film thickness fluctuation may be minimized.

The contact length Q is preferably from 0.2 to 7.5 cm, more preferably from 0.2 to 7 cm. Accordingly, the pressure for surface contact may be dispersed and a low surface pressure may be attained. Therefore, residual distortion may not remain in the film held between the rolls, and the film thickness accuracy and the film surface smoothness may be enhanced.

The film-holding contact length Q may be determined by putting a pre-scale (a sheet that colors sensitive to pressure) between a pair of stationary rolls along with a spacer therebetween so as to have the same thickness as that of the resin film, and measuring the colored length of the pre-scale. The film-holding contact length Q may be controlled by changing the cylinder pressure of the metallic elastic touch roll or the metallic belt.

In the invention, the center angle θ derived from the contact length Q of the filmy thermoplastic resin to the casting roll for cooling and the radius R of the casting roll for cooling (as the case may be, the angle may be referred to as a touch contact angle) satisfies the following formula (3). Also the factor of the above formula (1) is satisfied:

$$0.2° \leq \theta \leq 31°. \tag{3}$$

When the thermoplastic film is produced while the center angle θ is controlled to fall within the range, then the film thickness fluctuation may be reduced and the film surface property (not having lateral unevenness and longitudinal streaks) may be improved. Preferably, the center angle θ is large when the diameter of the casting roll for cooling is small (for example, at most 250 mm), and is small when the diameter of the casting roll for cooling is large (for example, at least 260 mm), so as to correspond to the touch contact length Q. Specifically, for example, when the diameter of the casting roll for cooling is 300 mm, then the lowermost limit of the center angle θ is preferably 0.2°, more preferably 0.5°. On the other hand, the uppermost limit of the center angle θ is preferably 19°, more preferably 15°, even more preferably 10°.

When the diameter of the casting roll for cooling is 180 mm, then the lowermost limit of the center angle θ is preferably 20°. On the other hand, the uppermost limit of the center angle θ is preferably 31°, more preferably 30°.

The contact length Q and the center angle θ may be controlled by suitably selecting and controlling the type of the metallic presser and the distance between the metallic presser and the casting roll for cooling 28.

Preferably, the surface temperature Tt of the metallic presser such as the metallic elastic touch roll and the metallic belt in the method for producing a thermoplastic film of the invention is from Tg−40° C. to Tg+5° C., more preferably from Tg−30° C. to Tg+3° C., even more preferably from Tg−20° C. to Tg. Accordingly, the surface smoothness and the thickness accuracy of the formed film may be improved, and residual distortion may be prevented from remaining in the film, and the retardation may be prevented from being expressed in the film. Accordingly, a film having excellent optical properties can be obtained. When the surface temperature Tt of the metallic presser is lower than Tg−40° C., then the pressing stress may remain in the formed film with the result that the film may have residual distortion and retardation (Re, Rth) therein. On the other hand, when the surface temperature is higher than Tg+5° C., then the filmy thermoplastic resin melt may stick to the metallic presser such as the elastic touch roll or the metallic belt, therefore forming sticking traces in the formed film and worsening the film surface condition and the film thickness accuracy. The temperature control of the metallic presser may be attained, for example, by introducing a temperature-conditioned liquid or vapor into its inside space (for example, into the inside of the roll).

Preferably, the metallic presser such as the metallic elastic touch roll or the endless metallic belt and the metallic casting roll for cooling for use in the method for producing a thermoplastic film of the invention have a mirror surface or a surface near to a mirror condition. The surface roughness Ra of the metallic presser and the metallic casting roll for cooling is preferably from 0 to 100 nm, more preferably from 0 to 50 nm, even more preferably from 0 to 25 nm; and to that degree, the surface thereof is preferably mirror-finished. When a filmy thermoplastic resin melt is held between such rolls and cooled and solidified, then it may produce a synergistic effect of film thickness accuracy and surface roughness reduction. The surface roughness Ra as referred to herein means a center line average roughness Ra as defined in JIS B0601-1982.

The metallic elastic touch roll and the endless metallic belt that are used as the metallic presser in the invention may polish the film more accurately than conventional rubber elastic touch rolls. Accordingly, the eccentric fluctuation may be completely removed from them, and a film having much better thickness accuracy and surface smoothness may be obtained. In particular, it may be believed that the influence of the eccentric fluctuation of the rolls accompanied by the pressure fluctuation or the rotary cycle fluctuation thereof in film formation on the thickness accuracy and the surface smoothness of the formed film may be minimized.

The linear pressure in the method for producing a thermoplastic film of the invention is preferably from 3 kg/cm to 100 kg/cm, more preferably from 5 kg/cm to 80 kg/cm, even more preferably from 7 kg/cm to 60 kg/cm. The linear pressure as referred to herein is a value obtained by the force given to the metallic presser such as the metallic elastic touch roll or the metallic belt by the width of the orifice of the die.

Preferably, in the method for producing a thermoplastic film of the invention, the ratio of the peripheral velocity V1 of the metallic casting roll for cooling to the peripheral velocity Vt of the polishing touch roll (metallic presser), V1/Vt is defined to be from 0.990 to less than 1.01, more preferably from 0.995 to less than 1.000. When the ratio of V1/Vt is too large, then the sheet-like cellulose acylate resin may be stretched and the retardation Re and Rth values may be thereby increased. On the other hand, when the ratio of V1/Vt is too small, then the film may loosen on the casting roll for cooling surface, and may therefore have appearance failure such as wrinkles. Preferably, the polishing touch roll and the casting roll for cooling are so set as to rotate in the opposite directions and their peripheral speed are defined accordingly.

Preferably, in the method for producing a thermoplastic film of the invention, from 1 to 6, more preferably from 2 to 4 metallic rigid rolls are continuously disposed on the downstream side of the metallic casting roll for cooling in the running direction of the thermoplastic resin, thereby gradually cooling the resin film. In this case, the roll diameter is preferably from 50 mm to 5000 mm, more preferably from 150 mm to 1000 mm. The distance between the plural rolls, if nay, is preferably from 0.3 mm to 300 mm, more preferably from 3 mm to 30 mm as the face-to-face distance between them.

<<Characteristics of Thermoplastic Film>>

According to the method for producing a thermoplastic film of the invention, a thermoplastic film may be obtained, having a film thickness of from 20 to 300 μm, having a film thickness fluctuation of from 0 to 3 μm in both the transverse direction and the longitudinal direction of the film, and having a film surface roughness Ra of from 0.01 to 200 nm, in which the ratio of the surface roughness Ra of both surfaces of the film is from 0.8 to 1.2. The surface roughness Ra as referred to herein is a center line average roughness Ra as defined in JIS B0601-1982.

When the film thickness is less than 20 μm, then the film handlability may be poor; but when it is more than 300 μm, then the film windability may be poor.

When the thickness fluctuation of the film in any of the transverse direction or the longitudinal direction thereof is more than 3 μm, then the optical characteristic of the film, the retardation value thereof (Re and Rth) may greatly fluctuate.

When the surface roughness Ra of the film is less than 0.01 nm, then the film production may be substantially difficult; and when it is more than 200 nm, the film surface smoothness may be poor.

When the ratio of the surface roughness Ra of both surfaces of the film is less than 0.8 or more than 1.2, then the film surface smoothness may differ on both surfaces of the film.

According to the method for producing a thermoplastic film of the invention, a thermoplastic film may be obtained, having a residual solvent content of at most 0.01% by mass and satisfying all the following formulae (I) and (II):

$$Re \leq 10, \text{ and } |Rth| \leq 15, \tag{I}$$

$$|Re(10\%) - Re(80\%)| < 5, \text{ and } |Rth(10\%) - Rth(80\%)| < 15, \tag{II}$$

[wherein Re and Rth indicate the retardation value (unit: nm) of the film in the in-plane direction and the thickness direction, respectively, at a wavelength of 590 nm; and Re (H %) and Rth (H %) mean the retardation value of the film in the in-plane direction and the thickness direction, respectively, at a relative humidity of H (unit: %) and at a wavelength of 590 nm.]

Satisfying both the formulae (I) and (II), the retardation (Re and Rth) of the film may reduce and the retardation fluctuation with humidity fluctuation may be inhibited, and the film may be favorably used as a protective film for polarizing plates.

Using the thermoplastic film having such high thickness accuracy, having minimized film surface roughness, not having a trouble of rough streaks on its surface, having no difference in the surface smoothness on both surfaces thereof, and having small retardation (Re and Rth) with reduced optical distortion, may solve the problems of blurred display and image distortion that may occur when a resin film is built in liquid-crystal display devices.

The thermoplastic resin suitable to the invention, and its film formation method and its working method are described in detail in order of their processing steps.

Preferred examples of the thermoplastic resin for use in the invention are cellulose acylate resin, polycarbonate resin, norbornene resin. Above all, more preferred are cellulose acylate resin and norbornene resin. In this embodiment, shown is an example of producing a cellulose acylate film, to which, however, the invention should not limited. The invention is applicable to production of norbornene resin films and polycarbonate resin films.

(Cellulose Acylate Resin)

Preferably, the cellulose acylate for use in the invention satisfies a degree of substitution of the following formulae (S-1) to (S-3):

$$2.5 \leq X + Y \leq 3.0, \tag{S-1}$$

$$0 \leq X \leq 1.8, \tag{S-2}$$

$$1.0 \leq Y \leq 3.0; \tag{S-3}$$

more preferably, the following formulae (S-4) to (S-6):

$2.6 \leq X+Y \leq 3.0$, (S-4)

$0 \leq X \leq 1.2$, (S-5)

$1.5 \leq Y \leq 3$; (S-6)

even more preferably, the following formulae (S-7) to (S-9):

$2.65 \leq X+Y \leq 3.0$, (S-7)

$0 \leq X \leq 0.8$, (S-8)

$2.0 \leq Y \leq 3$. (S-9)

In the above formulae, X means a degree of substitution of the hydroxyl group in cellulose with an acetyl group; Y means a total degree of substitution of the hydroxyl group in cellulose acylate with an acyl group having from 3 to 22 carbon atoms. Defining the degree of substitution of the cellulose acylate to fall within the above range lowers the melting temperature of the polymer and betters the meltability thereof, thereby enabling more uniform film formation.

The acyl group having from 3 to 22 carbon atoms in the invention may be an aliphatic acyl group or an aromatic acyl group. A plurality of such acyl group may exist in one cellulose acylate. However, when the acyl group is longer than the above-mentioned one, then the molecular hydrophobicity may be too strong, and if so, the saponification characteristic of the film may lower and the sticking capability of the film to a polarizing element may worsen. Accordingly, preferred are a propionate group, a butyrate group and a pentanoyl group larger than acetyl group; more preferred are a propionate group and a butyrate group; and even more preferred is a propionate group.

The cellulose material to produce the cellulose acylate for use in the invention is preferably one derived from hardwood pulp, softwood pulp or cotton linter.

Methods for producing the cellulose acylate for use in the invention are described in detail in JP-A 2006-45500, paragraphs [0018] to [0033]; JP-A 2006-45501, paragraphs [0014] to [0030]; JP-A 2006-45502, paragraphs [0018] to [0023]. The methods are also described in detail in Hatsumei Kyokai Disclosure Bulletin (No. 2001-1745, published by the Hatsumei Kyokai on Mar. 15, 2001), pp. 7-12. These production methods are favorably used in the invention. Regarding the concrete process of producing the cellulose acylate favorably used in the invention, referred to are Production Example 1 and Production Example 2 given hereinunder. One or more different types of such cellulose acylates may be used herein either singly or as combined. If desired, any other polymer component than cellulose acylate may be suitably mixed with the cellulose acylate for use herein.

The number-average molecular weight of the cellulose acylate favorably used in the invention must be from 20,000 to 70,000, preferably from 30,000 to 60,000, more preferably from 40,000 to 50,000. When the molecular weight is smaller than 20,000, then the mechanical properties of the film may be insufficient, and the film may be broken. On the other hand, when the molecular weight is larger than 70,000, then the melt viscosity of the polymer in melt-castings film formation may be too high. In the invention, it is desirable that the ratio of weight-average degree of polymerization/number-average degree of polymerization of the cellulose acylate, as measured through GPC, is from 1.5 to 4.0, more preferably from 1.6 to 3.6, even more preferably from 1.7 to 3.5.

Preferably, the thermoplastic resin for use in the invention is formed into a film, as mixed with a stabilizer and others mentioned below. Preferably, the melt viscosity at 240° C. of the thermoplastic resin containing such a stabilizer and others is from 100 to 3000 Pa·s, more preferably from 150 to 2000 Pa·s, even more preferably from 200 to 1500 Pa·s. In particular, it is desirable that the melt viscosity of the thermoplastic resin containing from 0.01 to 3% by mass of a stabilizer having a molecular weight of at least 500 falls within the above-mentioned range.

(Aromatic Acylated Cellulose Acylate)

In the invention, it is also preferred to use cellulose acylate of which composition satisfies the following formulae (T-1) and (T-2):

$2.5 \leq A+C \leq 3.0$ and  Formula (T-1)

$0.1 \leq C < 2$,  Formula (T-2)

more preferably satisfies the following $2.6 \leq A+C \leq 2.95$ and  Formula (T-3)

$0.1 \leq C < 1.5$,  Formula (T-4)

further preferably satisfies the following $2.7 \leq A+C \leq 2.95$ and  Formula (T-3)

$0.1 \leq C < 1.0$.  Formula (T-4)

wherein A indicates a degree of substitution with an acetyl group; and C indicates a degree of substitution with a substituted or unsubstituted aromatic acyl group.

Here, as for the substituted or unsubstituted aromatic acyl group, a group represented by the following general formula (I) may be used.

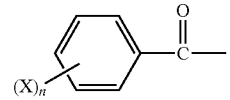

General Formula (I)

First, the general formula (I) will be described. X indicates a substitution group. Examples of the substitution group include a halogen atom, a cyano group, an alkyl group, an alkoxy group, an aryl group, an aryloxy group, an acyl group, a carbonamide group, a sulfonamide group, an ureido group, an aralkyl group, a nitro group, an alkoxycarbonyl group, an aryloxycarbonyl group, an aralkyloxycarbonyl group, a carbamoyl group, a sulfamoyl group, an acyloxy group, an alkenyl group, an alkynyl group, an alkylsulfonyl group, an arylsulfonyl group, an alkyloxysulfonyl group, an aryloxysulfonyl group, an alkylsulfonyloxy group, an aryloxysulfonyl group, —S—R, —NH—CO—OR, —PH—R, —P(—R)$_2$, —PH—O—R, —P(—R)(—O—R), —P(—O—R)$_2$, —PH(=O)—R—P(=O) (—R)$_2$, —PH(=O)—O—R, —P(=O)(—R) (—O—R), —P(=O)(—O—R)$_2$, —O—PH (=O)—R, —O—P(=O) (—R)$_2$—O—PH(=O)—O—R, —O—P(=O)(—R)(—O—R), —O—P(=O) (—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$, and —O—Si(—R)$_3$. Here, R indicates an aliphatic group, an aromatic group, or a heterocyclic group. The number of the substitution group is preferably in the range of 1 to 5, more preferably in the range of 1 to 4, further preferably in the range of 1 to 3, and most preferably 1 or 2. As for the substitution group, a halogen atom, a cyano group, an alkyl group, an alkoxy group, an aryl group, an aryloxy group, an acyl group, a carbonamide group, a sulfonamide group, or an ureido group is preferable; a halogen atom, a cyano group, an alkyl group, an alkoxy group, an aryloxy group, an acyl group, or a carbonamide group is more preferable; a halogen atom, a cyano group, an alkyl group, an alkoxy group, or an aryloxy group is further preferable; and a halogen atom, an alkyl group, or an alkoxy group is most preferable.

The halogen atom includes a fluorine atom, a chlorine atom, a bromine atom, and an iodine atom. The alkyl group may have a cyclic or a branched structure. The number of carbon atom in alkyl group is preferably 1 to 20, more preferably 1 to 12, even more preferably 1 to 6, and most preferably 1 to 4. When alkyl group has a substitution group, it is preferable that the above number of carbon atom includes the number of carbon atom included in the substitution group. Examples of the alkyl group include methyl group, ethyl group, propyl group, isopropyl group, butyl group, tert-butyl group, hexyl group, cyclohexyl group, octyl group and 2-ethylhexyl group. The above-mentioned alkoxy group may have a cyclic or a branched structure. The number of carbon atom in alkoxy group is preferably 1 to 20, more preferably 1 to 12, even more preferably 1 to 6, and most preferably 1 to 4. The alkoxy group may be further substituted with the other alkoxy group. Examples of the alkoxy group include methoxy group, ethoxy group, 2-methoxyethoxy group, 2-methoxy-2-ethoxyethoxy group, butyloxy group, hexyloxy group, and octyloxy group.

The number of carbon atom in aryl group is preferably 6 to 20, and more preferably 6 to 12. Examples of aryl group include phenyl group and naphthyl group.

The number of carbon atom in aryloxy group is preferably 6 to 20, and more preferably 6 to 12. Examples of the aryloxy group include phenoxy and naphthoxy.

The number of carbon atom in acyl group is preferably 1 to 20, and more preferably 1 to 12. Examples of the acyl group include formyl group, acetyl group, and benzoyl group. The number of carbon atom in carbonamide group is preferably 1 to 20, and more preferably 1 to 12. Examples of the carbonamide group include acetamide group, and benzamide group. The number of carbon atom in sulfonamide group is preferably 1 to 20, and more preferably 1 to 12. Examples of the sulfonamide group include methansulfonamide group, benzensulfonamide group, and p-toluenesulfonamide group.

The number of carbon atom in the ureido group is preferably 1 to 20, and more preferably 1 to 12. Examples of the ureido group include (unsubstituted) ureido.

The number of carbon atom in aralkyl group is preferably 7 to 20, and more preferably 7 to 12. Examples of the aralkyl group include benzyl group, phenethyl group, and naphthylmethyl group. The number of carbon atom in alkoxycarbonyl group is preferably 1 to 20, and more preferably 2 to 12. Example of alkoxycarbonyl includes methoxycarbonyl. The number of carbon atom in aryloxycarbonyl group is preferably 7 to 20, and more preferably 7 to 12. Examples of aryloxycarbonyl group include phenoxycarbonyl. The number of carbon atom in aralkyloxy group is preferably 8 to 20, and more preferably 8 to 12. Example of aralkyloxycarbonyl group includes benzoxycarbonyl. The number of carbon atom in carbamoyl group is preferably 1 to 20, and more preferably 1 to 12. Examples of the carbamoyl group include (unsubstituted) carbamoyl and N-methylcarbamoyl. The number of carbon atom in sulfamoyl group is preferably 20 or less, and more preferably 12 or less. Examples of sulfamoyl group include (unsubstituted) sulfamoyl and N-methylsulfamoyl.

The number of carbon atom in acyloxy group is preferably 1 to 20, and more preferably 2 to 12. Examples of acyloxy group include acetoxy and benzoyloxy.

The number of carbon atom in alkenyl group is preferably 2 to 20, and more preferably 2 to 12. Examples of the alkenyl group include vinyl group, allyl group, and isopropenyl group. The number of carbon atom in alkenyl group is preferably 2 to 20, and more preferably 2 to 12. Example of alkenyl group includes thienyl group. The number of carbon atom in alkylsulfonyl group is preferably 1 to 20, and more preferably 1 to 12. The number of carbon atom in arylsulfonyl group is preferably 6 to 20, and more preferably 6 to 12. The number of carbon atom in alkyloxysulfonyl group is preferably 1 to 20, and more preferably 1 to 12. The number of carbon atom in aryloxysulfonyl group is preferably 6 to 20, and more preferably 6 to 12. The number of carbon atom in alkylsulfonyloxy group is preferably 1 to 20, and more preferably 1 to 12. The number of carbon atom in aryloxysulfonyl group is preferably 6 to 20, and more preferably 6 to 12.

Such compounds are obtained by the substitution of an aromatic acyl group to the hydroxyl group of cellulose. Generally, a process using a symmetry acid anhydride and mixed acid anhydride derived from aromatic carboxylic acid chloride or aromatic carboxylic acid, and the like are exemplified. As the specifically preferable process, the process using the acid hydride derived from aromatic caroboxylic acid (described in Journal of Applied Polymer Science, Vol. 29, 3981-3990 (1984)) is exemplified. As the process for producing a cellulose-mixed acid esterified compound, (1) a process comprising once producing cellulose aliphatic acid monomer or diester, then introducing an aromatic acyl group represented by the above formula (I), to the other hydroxyl group, (2) a process reacting the mixed acid anhydride of aliphatic caroboxylic acid and aromatic carboxylic acid with cellulose directly, and the like are exemplified. In the above (1), the process for producing a cellulose aliphatic acid ester or diester is a well known process, and a reaction of the subsequent step for further introducing an aromatic acyl group thereto, differs according to the kind of the aromatic acyl group, and performed under the conditions of a reacting temperature of preferably 0 to 100° C., and more preferably 20 to 50° C., and reacting time for preferably 30 minutes or more, and more preferably 30 to 300 minutes. In the above (2) of the process using the mixed acid anhydride, the reacting conditions differs according to the kind of the mixed acid anhydride, preferably is a reacting temperature of 0 to 100° C., more preferably 20 to 50° C., a reacting time is preferably 30 to 300 minutes, more preferably 60 to 200 minutes. In any reactions above, the reaction may be performed without a solvent or in a solvent, but preferably performed in the solvent. As the solvent, dichloromethane, chloroform, dioxane, and the like may be used.

Hereinafter, specific examples of the aromatic acyl group represented by the following formulae will be shown but the invention is not limited thereto.

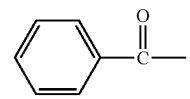

1

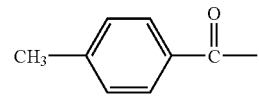

2

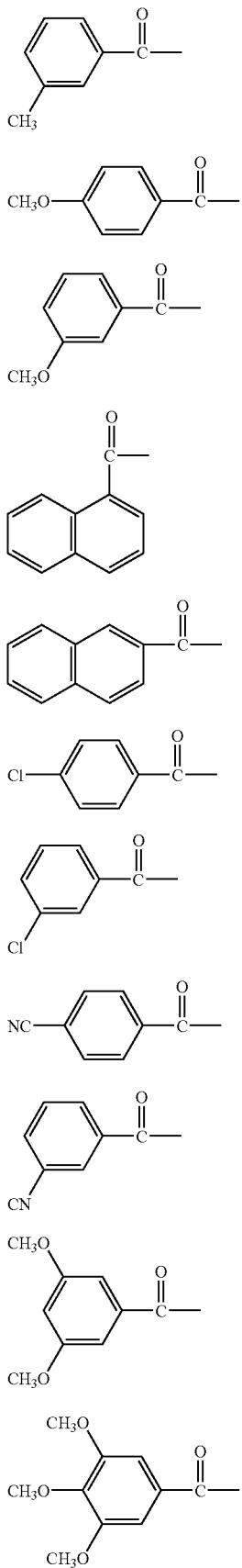
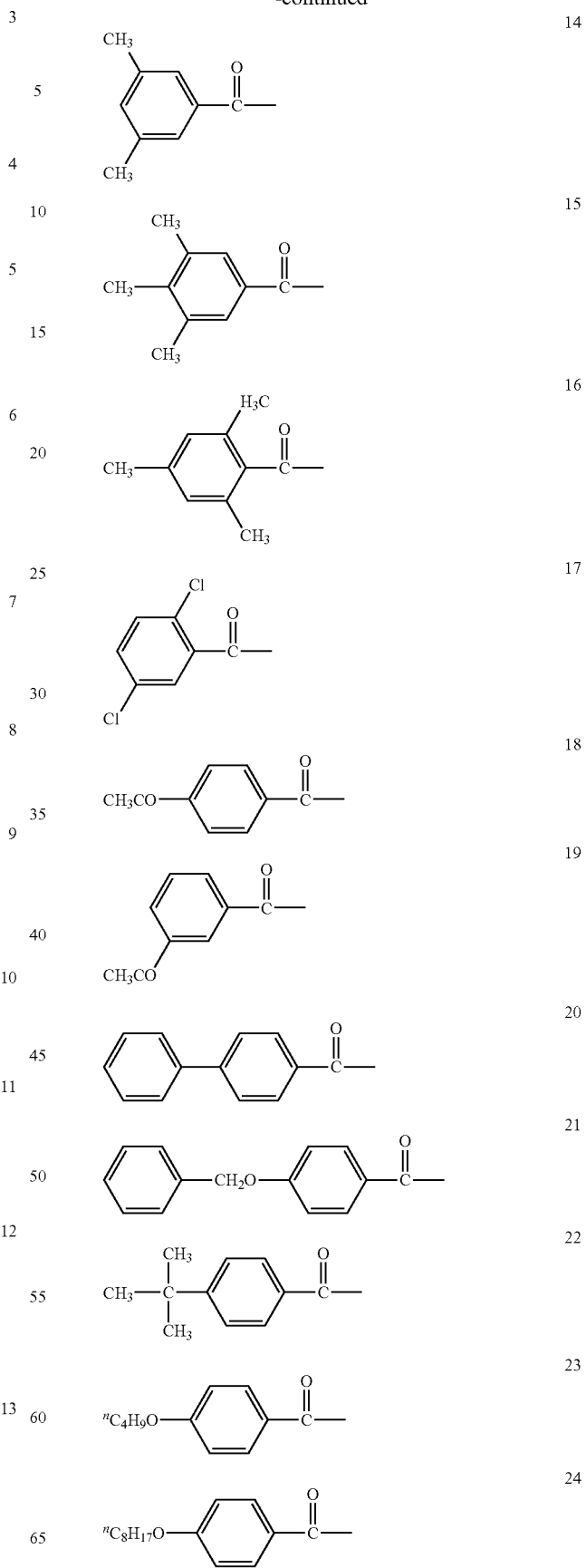

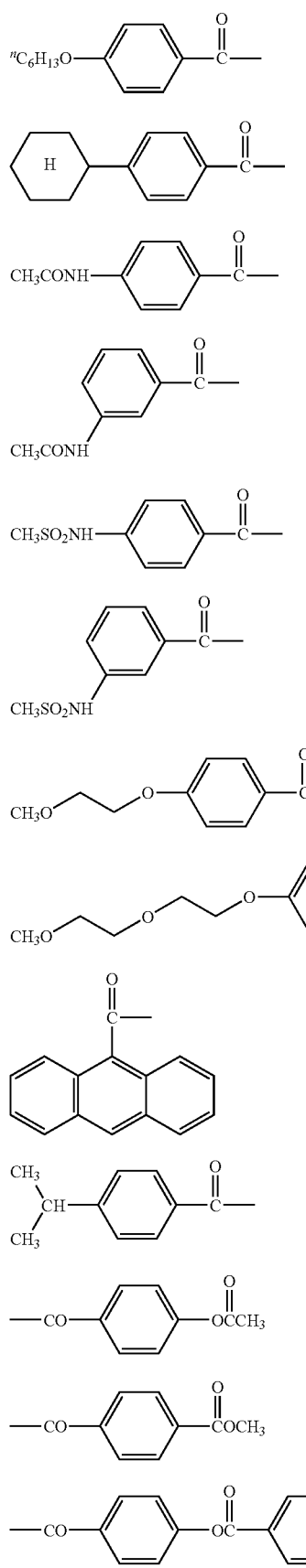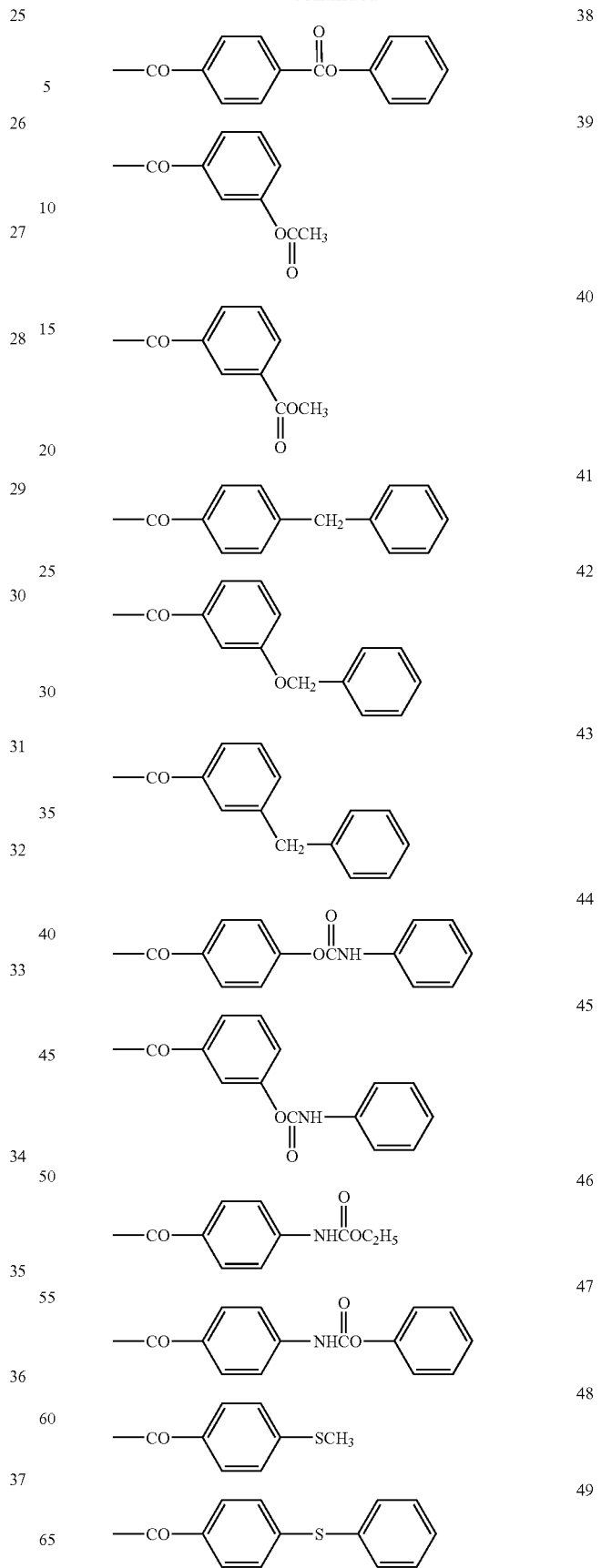

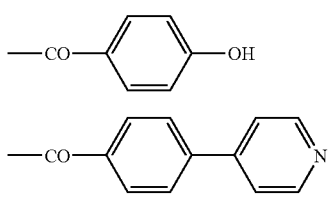

Among these substitution groups, the substitution groups shown as numerals 1 to 9, 18 to 19, and 27 to 28 are preferable, the substitution groups shown as reference numerals 1 to 3 are more preferable, and the substitution group shown as reference numeral 1 is most preferable.

<<Additives>>

(1) Stabilizer:

In the invention, a stabilizer is preferably added to the cellulose acylate in high-temperature melt-casting film formation thereof, for preventing thermal deterioration, gellation or coloration of the polymer. In the invention, any stabilizer may be used, but preferred are phenolic structure, phosphite structure or thioether structure-having compounds. One or more different types of the stabilizers may be used herein either singly or as combined.

In the invention, it is desirable that the volatility of the stabilizer is fully low at high temperatures, and that the molecular weight thereof is from 500 to 4000, more preferably from 530 to 3500, even more preferably from 550 to 3000. When the molecular weight thereof is at least 500, then the thermal volatility of the stabilizer may be more readily reduced; and when it is at most 4000, then the compatibility thereof with cellulose acylate may be better.

Mass loss under heat may be employed as an index of volatility. For example, it is desirable that the mass loss of the stabilizer kept in a nitrogen atmosphere at 240° C. for 1 hour is at most 15% by mass, more preferably at most 10% by mass, even more preferably at most 5% by mass, most preferably at most 3% by mass. With that, thermal evaporation of the stabilizer may be greatly reduced even under a severe condition (at high temperatures owing to local resin retention and shear heat) in a process of melt-casting film formation in the invention.

Preferably, the amount of the stabilizer to be added to the thermoplastic resin (e.g., cellulose acylate) in the invention is from 0.01 to 3% by mass, more preferably from 0.05 to 1.5% by mass, even more preferably from 0.1 to 1% by mass of the resin.

Preferred stabilizers are described below.

(Phenolic Structure-having Stabilizer)

As a phenolic structure-having stabilizer, any known phenolic stabilizer may be used herein. Preferred examples of the phenolic structure-having stabilizer are hindered phenolic stabilizers. In particular, it is desirable that the hindered phenolic stabilizers have a substituent at the site adjacent to the hydroxyphenyl group therein, in which the substituent is preferably a substituted or unsubstituted alkyl group having from 1 to 22 carbon atoms, more preferably a methyl group, an ethyl group, a propyl group, an isopropyl group, a butyl group, an isobutyl group, a tert-butyl group, a pentyl group, an isopentyl group, a tert-pentyl group, a hexyl group, an octyl group, an isooctyl group, a 2-ethylhexyl group.

Examples of the phenolic stabilizer are the following (F-1) to (F-12). However, the phenolic stabilizer usable in the invention is not limited to these.

(F-1)
N-octadecyl 3-(3',5'-di-tert-butyl-4'-hydroxyphenyl)propionate (molecular weight 531)

(F-2)
Tetrakis-[methylene-3-(3,5-di-tert-butyl-4-hydroxyphenyl) propionate]methane (molecular weight 1178)

(F-3)
Tris-(3,5-di-tert-butyl-4-hydroxybenzyl) isocyanurate (molecular weight 784)

(F-4)
Triethylene Glycol Bis-[3-(3-Tert-Butyl-4-Hydroxy-5-methylphenyl)propionate] (molecular weight 588)

(F-5)
3,9-Bis{2-[3-(3-tert-butyl-4-hydroxy-5-methylphenyl)propionyloxy]-1,1-dimethylethyl}-2,4,8,10-tetroxaspiro[5,5]undecane (molecular weight 741)

(F-6)
1,3,5-Trimethyl-2,4,6-tris(3,5-di-tert-butyl-4-hydroxybenzyl)benzene (molecular weight 775)

(F-7)
1,1,3-Tris(5-di-tert-butyl-4-hydroxy-2-methylphenyl)butane (molecular weight 545)

(F-8)
1,6-Hexanediol bis{3-(3,5-di-tert-butyl-4-hydroxyphenyl) propionate} (molecular weight 639)

(F-9)
2,4-Bis(n-octylthio)-6-(4-hydroxy-3,5-di-tert-butylanilino)-1,3,5-triazine (molecular weight 589)

(F-10)
2,2-Thio-diethylenebis[3-(3,5-di-tert-butyl-4-hydroxyphenyl)-propionate] (molecular weight 643)

(F-11)
N,N'-hexamethylenebis(3,5-di-tert-butyl-4-hydroxy-hydrocinnamide) (molecular weight 637)

(F-12)
Calcium bis(ethyl 3,5-di-tert-butyl-4-hydroxybenzylphosphonate) (molecular weight 695)

These are easily available as commercial products, and are sold by the following manufactures.

From Ciba Speciality Chemicals, available are Irganox 1076, Irganox 1010, Irganox 3113, Irganox 245, Irganox 1135, Irganox 1330, Irganox 259, Irganox 565, Irganox 1035, Irganox 1098, Irganox 1425WL. From Asahi Denka Kogyo, available are Adekastab AO-50, Adekastab AO-60, Adekastab AO-20, Adekastab AO-70, Adekastab AO-80. From Sumitomo Chemical, available are Sumilizer BP-76, Sumilizer BP-101, Sumilizer GA-80. From Sypro Chemical, available are Seenox 326M, Seenox 336B.

(Phosphite Structure-having Stabilizer)

Examples of a phosphite structure-having stabilizer are described in JP-A 51-70316, 10-306175, 57-78431, 54-157159, 55-13765. Other examples of the stabilizer are described in detail in Hatsumei Kyokai Disclosure Bulletin (No. 2001-1745, published by the Hatsumei Kyokai on Mar. 15, 2001), pp. 17-22. In the invention, a suitable one may be selected from various stabilizers such as those described in these, and may be used.

Phosphite-type stabilizers having an antioxidant effect and having a molecular weight of at least 500 are preferably used in the invention, as they vaporize little at high temperatures. These stabilizers may be selected from the compounds described in JP-A 2004-182979, [0023] to [0039].

As the phosphite-type stabilizers having a molecular weight of at least 500 for use in the invention may be any conventional known phosphite-type stabilizers. The phosphites for use in the invention are preferably triesters, more preferably not contaminated with impurities such as monoesters and diesters. When the triester contains such an impurity, the impurity content thereof is preferably at most 10% by mass, more preferably at most 5% by mass, even more preferably at most 2% by mass.

Preferred examples (P-1) to (P-7) of phosphite-type stabilizers are mentioned below. However, the phosphite-type stabilizer for use in the invention is not limited to these.

(P-1)
Trisnonylphenyl phosphite (molecular weight 689)
(P-2)
Tris(2,4-di-tert-butylphenyl) phosphite (molecular weight 647)
(P-3)
Distearylpentaerythritol Diphosphite (Molecular Weight 733)
(P-4)
Bis(2,4-di-tert-butylphenyl)pentaerythritol phosphite (molecular weight 605)
(P-5)
Bis(2,6-Di-Tert-Butyl-4-Methylphenyl)pentaerythritol phosphite (molecular weight 633)
(P-6)
2,2-Methylenebis(4,6-di-tert-butylphenyl)octyl phosphite (molecular weight 529)
(P-7)
Tetrakis(2,4-Di-Tert-Butylphenyl)-4,4-Biphenylene diphosphite (molecular weight 517)

These are commercially sold by Asahi Denka Kogyo as Adekastab 1178, 2112, PEP-8, PEP-24G, PEP-36, HP-10, and by Clariant as Sandostab P-EPQ; and are therefore commercially available.

(Thioether Structure-having Stabilizer)

As the thioether structure-having stabilizer, any known thioether-type stabilizer may be used herein. Preferred examples (S1) to (S4) of thioether-type stabilizers are mentioned below. However, the thioether structure-having stabilizer for use in the invention should not be limited to these.

(S1)
Dilauryl 3,3-thiodipropionate (molecular weight 515)
(S2)
Dimyristyl 3,3-thiodipropionate (molecular weight 571)
(S3)
Distearyl 3,3-thiodipropionate (molecular weight 683)
(S4)
Pentaerythritol tetrakis(3-laurylthiopropionate) (molecular weight 1162)

These are commercially sold by Sumitomo Chemical as Sumilizer TPL, TPM, TPS, TPD. From Asahi Denka Kogyo, Adekastab AO-412S is commercially available.

Not specifically limited, the ratio of the phenolic stabilizer to the phosphite stabilizer or the thioether stabilizer to be in the resin in the invention may be preferably from 1/10 to 10/1 (parts by mass), more preferably from 1/5 to 5/1 (parts by mass), even more preferably from 1/3 to 3/1 (parts by mass), still more preferably from 1/3 to 2/1 (parts by mass).

(Stabilizer Having Hydroxyphenyl Group and Phosphite Group in One Molecule)

Further in the invention, it is recommended to use a stabilizer having a hydroxyphenyl group and a phosphite group in one molecule. The stabilizer is not specifically defined in point of its structure, so far as it has a hydroxyphenyl group and a phosphite group in one molecule. It may be a low-molecular compound or a polymer compound (produced through polymerization or condensation of single molecules). The number or the functional groups, hydroxyphenyl group and phosphite group to be in the stabilizer is not specifically defined, so far as they are in one molecule. For example, the number is preferably from 1 to 20 each, more preferably from 1 to 10 each, even more preferably from 1 to 6 each. These compounds are described in JP-A 10-273494. Sumilizer GP (by Sumitomo Chemical) is a commercial product of the stabilizer.

Preferred examples (PF-1) to (PF-14) of the stabilizer having a hydroxyphenyl group and a phosphite group in one molecule for use in the invention are mentioned below. However, the stabilizer for use in the invention should not be limited to these.

(PF-1)
2,10-Dimethyl-4,8-di-tert-butyl-6-[3-(3,5-di-tert-butyl-4-hydroxyphenyl)propoxy]-12H-dibenzo[d,g][1,3,2]dioxaphosphocin (molecular weight 632)
(PF-2)
2,4,8,10-Tetra-tert-butyl-6-[3-(3,5-di-tert-butyl-4-hydroxyphenyl)propoxy]dibenzo[d,f][1,3,2]dioxaphosphepin (molecular weight 702)
(PF-3)
2,4,8,10-Tetra-tert-pentyl-6-[3-(3,5-di-tert-butyl-4-hydroxyphenyl)propoxy]-12-methyl-12H-dibenzo[d,g][1,3,2]dioxaphosphocin (molecular weight 787)
(PF-4)
2,10-Dimethyl-4,8-di-tert-butyl-6-[3-(3,5-di-tert-butyl-4-hydroxyphenyl)propionyloxy]-12H-dibenzo[d,g][1,3,2] dioxaphosphocin (molecular weight 646)
(PF-5)
2,4,8,10-Tetra-tert-pentyl-6-[3-(3,5-di-tert-butyl-4-hydroxyphenyl)propionyloxy]-12-methyl-12H-dibenzo[d,g][1,3,2]dioxaphosphocin (molecular weight 801)
(PF-6)
2,4,8,10-Tetra-tert-butyl-6-[3-(3,5-di-tert-butyl-4-hydroxyphenyl)propionyloxy]-dibenzo[d,f][1,3,2]dioxaphosphepin (molecular weight 716)
(PF-7)
2,10-Dimethyl-4,8-di-tert-butyl-6-(3,5-di-tert-butyl-4-hydroxybenzoyloxy)-12H-dibenzo[d,g][1,3,2]dioxaphosphocin (molecular weight 618)
(PF-8)
2,4,8,10-Tetra-tert-butyl-6-(3,5-di-tert-butyl-4-hydroxybenzoyloxy)-12-methyl-12H-dibenzo[d,g][1,3,2]dioxaphosphocin (molecular weight 717)
(PF-9)
2,4,8,10-tetra-tert-butyl-6-[3-(3-methyl-4-hydroxy-5-tert-butylphenyl)propoxy]dibenzo[d,f][1,3,2]dioxaphosphepin (molecular weight 660)
(PF-10)
2,10-Dimethyl-4,8-di-tert-butyl-6-[3-(3-methyl-4-hydroxy-5-tert-butylphenyl)propoxy]-12H-dibenzo[d,g][1,3,2]dioxaphosphocin (molecular weight 590)
(PF-11)
2,4,8,10-Tetra-tert-butyl-6-[3-(3,5-di-tert-butyl-4-hydroxyphenyl)propoxy]-12H-dibenzo[d,g][1,3,2]dioxaphosphocin (molecular weight 717)
(PF-12)
2,10-Diethyl-4,8-di-tert-butyl-6-[3-(3,5-di-tert-butyl-4-hydroxyphenyl)propoxy]-12H-dibenzo[d,g][1,3,2]dioxaphosphocin (molecular weight 661)
(PF-13)
2,4,8,10-Tetra-tert-butyl-6-[2,2-dimethyl-3-(3-tert-butyl-4-hydroxy-5-methylphenyl)propoxy]-dibenzo[d,f][1,3,2]dioxaphosphepin (molecular weight 688) (PF-14)
6-[3-(3-tert-butyl-4-hydroxy-5-methyl)propoxy]-2,4,8,10-tetra-tert-butyldibenzo[d,f][1,3,2]dioxaphosphepin (molecular weight 660)

(Amine-type Stabilizer)

Further, long-chain aliphatic amines as in JP-A 61-63686, steric hindered amine group-containing compounds as in JP-A 6-329830, hindered piperidinyl-type light stabilizers as in JP-A 7-90270, and organic amines as in JP-A 7-278164 are also usable herein.

Preferred amine-type stabilizers are commercially sold by Asahi Denka Kogyo as Adekastab LA-57, LA-52, LA-67, LA-62, LA-77; and by Ciba Speciality Chemicals as Tinuvin 765, 144. The ratio of the amine stabilizer to the phosphite (1) may be generally from 0.01 to 3% by mass or so.

(UV Absorbent)

The cellulose acylate may contain an UV inhibitor. UV inhibitors are described, for example, in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-8-29619, JP-A-8-239509, JP-A-2000-204173. The amount of the UV inhibitor that to be added is preferably from 0.01 to 2% by mass of the resin melt being prepared herein, more preferably from 0.01 to 1.5% by mass.

Commercially-available UV absorbents such as those mentioned below are also usable herein. Commercially-available benzotriazole compounds are Tinubin P (by Ciba Speciality Chemicals), Tinubin 234 (by Ciba Speciality Chemicals, Tinubin 320 (by Ciba Speciality Chemicals), Tinubin 326 (by Ciba Speciality Chemicals), Tinubin 327 (by Ciba Speciality Chemicals), Tinubin 328 (by Ciba Speciality Chemicals), Sumisorb 340 (by Sumitomo Chemical), Adekastab LA-31 (by Asahi Denka Kogyo). Commercially-available benzophenone-type UV absorbents are Seesorb 100 (by Sypro Chemical), Seesorb 101 (by Sypro Chemical), Seesorb 101S (by Sypro Chemical), Seesorb 102 (by Sypro Chemical), Seesorb 103 (by Sypro Chemical), Adekastab LA-51 (by Asahi Denka Kogyo), Chemisorb 111 (by Chemipro Chemical), Uvinul D-49 (by BASF). Commercially-available oxalic acid anilide-type UV absorbents are Tinubin 312 (by Ciba Speciality Chemicals), Tinubin 315 (by Ciba Speciality Chemicals). Commercially-available salicylic acid-type UV absorbents are Seesorb 201 (by Sypro Chemical), Seesorb 202 (by Sypro Chemical); and commercially-available cyanoacrylate-type UV absorbents are Seesorb 501 (by Sypro chemical), Uvinul N-539 (by BASF).

(Fine Particles)

Fine particles may be added to the cellulose acylate in the invention. Fine particles include those of an inorganic compounds and those of an organic compound, any of which may be used in the invention. Preferably, the fine particles to be in the cellulose acylate in the invention have a mean primary particle size of from 5 nm to 3 μm, more preferably from 5 nm to 2.5 μm, even more preferably from 20 nm to 2.0 μm. The amount of the fine particles to be added to the cellulose acylate may be from 0.005 to 1.0% by mass of the acylate, more preferably from 0.01 to 0.8% by mass, even more preferably from 0.02 to 0.4% by mass.

The inorganic compound includes $SiO_2$, $ZnO$, $TiO_2$, $SnO_2$, $Al_2O_3$, $ZrO_2$, $In_2O_3$, $MgO$, $BaO$, $MoO_2$, $V_2O_5$, talc, calcined kaolin, calcined calcium silicate, calcium silicate hydrate, aluminium silicate, magnesium silicate, and calcium phosphate. Preferred is at least one of $SiO_2$, $ZnO$, $TiO_2$, $SnO_2$, $Al_2O_3$, $ZrO_2$, $In_2O_3$, $MgO$, $BaO$, $MoO_2$ and $V_2O_5$; and more preferred are $SiO_2$, $TiO_2$, $SnO_2$, $Al_2O_3$, $ZrO_2$.

As fine particles of $SiO_2$, herein usable are commercial products of, for example, Aerosil R972, R972V, R974, R812, 200, 200V, 300, R202, OX50, TT600 (all by Nippon Aerosil). As fine particles of $ZrO_2$, usable are commercial products of, for example, Aerosil R976 and R811 (both by Nippon Aerosil). In addition, Seahostar KE-E10, E30, E40, E50, E70, E150, W10, W30, W50, P10, P30, P50, P100, P150, P250 (all by Nippon Shokubai) are also usable herein. Further Silica Microbeads P-400, 700 (by Shokubai Kasei Kogyo) are also usable. SO-G1, SO-G2, SO-G3, SO-G4, SO-G5, SO-G6, SO-E1, SO-E2, SO -E3, SO-E4, SO-E5, SOP-E6, SO-C1, SO-C2, SO-C3, SO-C4, SO-C5, SO-C6 (all by Admatechs) are also usable. Further, Moritex's Silica Particles (produced by powdering aqueous dispersion) 8050, 8070, 8100, 8150 are also usable.

As the fine particles of an organic compound usable in the invention, preferred are polymers such as silicone resin, fluorine resin and acrylic resin; and more preferred is silicone resin. The silicone resin preferably has a three-dimensional network structure. Commercial products are usable herein, such as Tospearl 103, 105, 108, 120, 145, 3120 and 240 (all by Toshiba Silicone).

Preferably, the fine particles of an inorganic compound for use herein are subjected to surface treatment so that they may stably exist in the cellulose acylate film. It is also desirable that the inorganic fine particles are used herein after subjected to surface treatment. The surface treatment includes chemical surface treatment with a coupling agent, and physical surface treatment such as plasma discharge treatment or corona discharge treatment. In the invention, preferred is the surface treatment with a coupling agent. The coupling agent is preferably an organoalkoxy-metal compound (e.g., silane coupling agent, titanium coupling agent). For inorganic fine particles (especially $SiO_2$ particles) that may be used herein as fine particles, treatment with a silane coupling agent may be especially effective. Not specifically defined, the amount of the coupling agent may be preferably from 0.005 to 5% by mass, more preferably from 0.01 to 3% by mass of the inorganic fine particles.

(Plasticizer)

When a plasticizer is added to the cellulose acylate, then the crystalline melting temperature (Tm) of the acylate may be lowered. The plasticizer for use in the invention is not specifically defined in point of its molecular weight, but preferably has a high molecular weight. For example, its molecular weight is preferably at least 500, more preferably at least 550, even more preferably at least 600. Regarding its type, the plasticizer usable herein includes phosphates, alkylphthalylalkyl glycolates, carboxylates, fatty acid esters of polyalcohols. Regarding its morphology, the plasticizer may be solid or oily. Accordingly, the plasticizer is not specifically defined in point of its melting point or boiling point. In melt-casting film formation, a non-volatile plasticizer is especially preferred.

(Lubricant)

A lubricant may be added to the cellulose acylate in the invention. The lubricant is preferably a fluorine-containing compound. The fluorine-containing compound may be a low-molecular compound or a polymer compound capable of expressing an effect of lubricant. The polymers described in JP-A-2001-269564 may be used as the polymer lubricant. As the fluorine-containing polymer lubricant, preferred are polymers produced through polymerization of a fluoroalkyl group-containing ethylenic unsaturated monomer as an indispensable ingredient. The fluoroalkyl group-containing ethylenic unsaturated monomer for the polymer may be any compound having an ethylenic unsaturated group and a fluoroalkyl group in the molecule, not specifically defined. Fluorine-containing surfactants are also usable herein, and nonionic surfactants are especially preferred.

(Norbornene Resin)

For the thermoplastic film of the invention, usable is a norbornene resin for the purpose of reducing the humidity dependence of the retardation of the film. The norbornene resin includes, for example, hydrogenates of ring-cleaved polymers of norbornene-type monomer, addition-polymerization polymers of norbornene-type monomer and olefin, addition-polymerization polymers of norbornene-type monomers, and their derivatives. One or more different types of norbornene resins may be used herein either singly or as combined.

The norbornene-type monomer includes, for example, norbornene derivatives such as bicyclo[2,2,1]hept-2-ene (norbornene), 6-methylbicyclo[2,2,1]hept-2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-isobutylbicyclo[2,2,1]hept-2-ene, 7-methylbicyclo[2,2,1]hept-2-ene.

As the hydrogenates of ring-cleaved polymers of the above-mentioned norbornene-type monomer, widely used are those produced by ring-cleavage polymerization of a norbornene-type monomer in a known method and then hydrogenating the resulting polymer at the double bond remaining therein. The hydrogenates of ring-cleaved polymers may be homopolymers of a norbornene-type monomer or may also be copolymers of a norbornene-type monomer and any other cyclic olefin monomer.

The addition polymerization polymers of the above-mentioned norbornene-type monomer and an α-olefin include copolymers of the norbornene-type monomer and an α-olefin. Not specifically defined, the α-olefin includes those having from 2 to 20 carbon atoms, preferably from 2 to 10 carbon atoms, for example, ethylene, propylene, 1-butene, 3-methyl-1-butene, 1-pentene, 3-methyl-1-pentene, 4-methyl-1-pentene, 1-hexene, 1-octene, 1-decene, 1-dodecene, 1-tetradecene, 1-hexadecene. Of those, preferred is ethylene as its copolymerizability is good. In case where a norbornene-type monomer is copolymerized with any other α-olefin, ethylene is preferably present in the system as being able to increase the copolymerizability of the monomers.

The norbornene-type resin may be any known one, and is commercially available. Examples of the known norbornene resin are, for example, those described in JP-A 1-240517. Examples of commercially-available norbornene resins are, for example, JSR's Arton series, and Nippon Zeon's Zeonoa series.

Further, the saturated norbornene resin having a following structure can be used for the film of the invention. In the invention, the saturated norbornene resin can be exemplified by
[A-1] a hydrogenated product of random copolymer of α-olefin having 2 to 20 carbon atoms and cyclic olefin represented by the following formula (II),
[A-2] a hydrogenated product of a copolymer or a ring-opened polymer of cyclic olefin represented by the following formula (II)), or the like.

These saturated norbornene resin has preferably the glass transition temperature (Tg) measured by DSC of 70° C. or higher, more preferably in the range of 70 to 250° C., particularly preferably in the range of 120 to 180° C.

These saturated norbornene resin is amorphous or low crystalline and crystallinity of the resin measured by a X-ray diffraction method is generally 20% or below, preferably 10% or below, further preferably 2% or below.

In addition, the saturated norbornene resin of the invention has intrinsic viscosity [η] measured in decalin at 135° C. generally in the range of 0.01 to 20 dl/g, preferably in the range of 0.03 to 10 dl/g, further preferably in the range of 0.05 to 5 dl/g and the melt flow rate (MFR) measured under the load of 2.16 kg at 260° C. in accordance with ASTM D1238 generally in the range of 0.1 to 200 g/10 min, preferably in the range of 1 to 100 g/10 min, further preferably in the range of 5 to 50 g/10 min.

The softening point of the cycloolefin resins is measured by a thermal mechanical analyzer (TMA) and generally 30° C. or higher, preferably 70° C. or higher, and further preferably in the range of 80 to 260° C.

The structure of the saturated norbornene represented by the formula (II) will be described in detail.

In the formula (II), n is 0 or 1; m is 0 or an integer of 1 or higher; and q is 0 or 1. When q is 1, $R^a$ and $R^b$ are independently selected from the atoms represented as below and a hydrocarbon group. When q is 0, each bond is bonded to form a 5-membered ring.

$R^1$ to $R^{18}$, $R^a$, and $R^b$ are independently selected from a hydrogen atom, a halogen atom, and a hydrocarbon group. Here, examples of the halogen atom include a fluorine atom, a chlorine atom, a bromine atom, and an iodine atom.

In general, examples of the hydrocarbon group include alkyl group having 1 to 20 carbon atoms, cycloalkyl group having 3 to 15 carbon atoms, and aromatic hydrocarbon group. More specifically, examples of the alkyl group include a methyl group, an ethyl group, a propyl group, an isopropyl group, an amyl group, a hexyl group, an octyl group, a decyl group, a dodecyl group, an octadecyl group, and the like; example of the cycloalkyl group includes a cyclohexyl group; and examples of the aromatic hydrocarbon group include a phenyl group, a naphthyl group, and the like. These hydrocarbon groups may be substituted by a halogen atom. In the formula (II), $R^{15}$ to $R^{18}$ may be bonded to each other (jointly each other) to form a single ring or multiple rings. In addition, the single ring or multiple rings thus formed may have a double bond.

Cycloolefin represented by the formula (II) will be further specifically exemplified below. For example, bicyclo[2.2.1]-2-heptene (commonly named as norbornene) represented by the following formula:

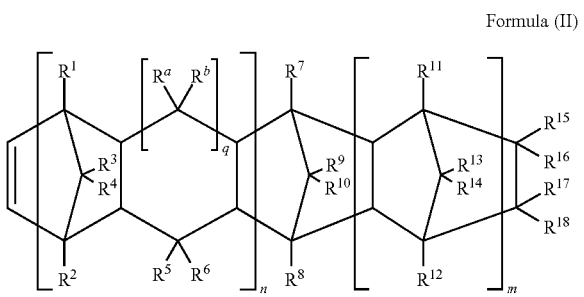

Formula (II)

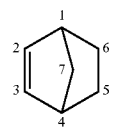

(wherein numerals 1 to 7 indicate position numbers of carbon atoms), and derivatives thereof in which the compound is substituted by a hydrocarbon group can be exemplified.

Examples of the substituted hydrocarbon group include 5-methyl group, 5,6-dimethyl group, 1-methyl group, 5-ethyl group, 5-n-butyl group, 5-isobutyl group, 7-methyl group, 5-phenyl group, 5-methyl-5-phenyl group, 5-benzyl group, 5-tolyl group, 5-(ethylphenyl) group, 5-(isopropylphenyl) group, 5-(biphenyl) group, 5-(β-naphthyl) group, 5-(α-naphthyl) group, 5-(antracenyl) group, 5,6-diphenyl group, and the like.

Examples of the derivatives include bicyclo[2.2.1]-2-heptene derivatives such as an adduct of cyclopentadiene-acenaphthylene, 1,4-methano-1,4,4a,9a-tetrahydrofluorene, 1,4-methano-1,4,4a,5,10,10a-hexahydroanthracene, and the like.

In addition, example of the derivatives include tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene, 5-methyltricyclo[4.3.0.1$^{2,5}$]-3-decene, and the like; tricyclo[4.4.0.1$^{2,5}$]-3-undecene derivatives such as tricyclo[4.4.0.1$^{2,5}$]-3-undecene, 10-methyltricyclo[4.4.0.1$^{2,5}$]-3-undecene, and the like; and tetracyclo[4.4.0.1$^{2,5}$.1$^{7,10}$]-3-dodecene represented by the following formula:

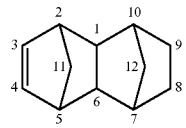

and derivatives thereof in which the compound is substituted by a hydrocarbon group.

Examples of the hydrocarbon group include 8-methyl group, 8-ethyl group, 8-propyl group, 8-butyl group, 8-isobutyl group, 8-hexyl group, 8-cyclohexyl group, 8-stearyl group, 5,10-dimethyl group, 2,10-dimethyl group, 8,9-dimethyl group, 8-ethyl-9-methyl group, 11,12-dimethyl group, 2,7,9-trimethyl group, 2,7-dimethyl-9-ethy group, 9-isobutyl-2,7-dimethyl group, 9,11,12-trimethyl group, 9-ethyl-11,12-dimethyl group, 9-isobutyl-11,12-dimethyl group, 5,8,9,10-tetramethyl group, 8-ethylidene group, 8-ethylidene-9-methyl group, 8-ethylidene-9-ethyl group, 8-ethylidene-9-isopropyl group, 8-ethylidene-9-butyl group, 8-n-propylidene group, 8-n-propylidene-9-methyl group, 8-n-propylidene-9-ethyl group, 8-n-propylidene-9-isopropyl group, 8-n-propylidene-9-butyl group, 8-isopropylidene group, 8-isopropylidene-9-methyl group, 8-isopropylidene-9-ethyl group, 8-isopropylidene-9-isopropy group, 8-isopropylidene-9-butyl, 8-chloro, 8-bromo, 8-fluoro, 8,9-dichloro group, 8-phenyl group, 8-methyl-8-phenyl group, 8-benzyl group, 8-tolyl group, 8-(ethylphenyl) group, 8-(isopropylphenyl) group, 8,9-diphhenyl group, 8-(biphenyl) group, 8-(β-naphtyl) group, 8-(α-naphtyl) group, 8-(anthracenyl) group, 5,6-diphenyl group, and the like.

In addition, examples of the hydrocarbon group include tetracyclo[4.4.0.1$^{2,5}$.1$^{7,10}$]-3-dodecene derivates such as an adduct of (cyclopentadiene-acenaphtylene adduct) with cyclopentadiene, pentacyclo[6.5.1.1$^{3,6}$.0$^{2,7}$.0$^{9,13}$]-4-pentadecene and derivates thereof, pentacyclo[7.4.0.1$^{2,5}$.1$^{9,12}$.0$^{8,13}$]-3-pentadecene and derivates thereof, pentacyclo[8.4.0.1$^{2,5}$.1$^{9,12}$.0$^{8,13}$]-3-hexadecene and derivates thereof, pentacyclo[6.6.1.1$^{3,6}$.0$^{2,7}$. 0$^{9,14}$]-4-hexadecene and derivates thereof, hexacyclo[6.6.1.1$^{3,6}$.1$^{10,13}$.0$^{2,7}$.0$^{9,14}$]-4-heptadecene and derivates thereof, heptacyclo[8.7.0.1$^{2,9}$. 1$^{4,7}$.1$^{11,17}$.0$^{3,8}$.0$^{12,16}$]-5-eicosene and derivates thereof, heptacyclo[8.7.0.1$^{3,6}$.1$^{10,17}$.1$^{12,15}$.0$^{2,7}$.0$^{11,16}$]-4-eicosene and derivates thereof, heptacyclo[8.8.0.1$^{2,9}$. 1$^{4,7}$. 1$^{11,18}$.0$^{3,8}$.0$^{12,17}$]-5-heneicosen and derivates thereof, octacyclo[8.8.0.1$^{2,9}$. 1$^{4,7}$.1$^{11,18}$.1$^{13,16}$.0$^{3,8}$.0$^{12,17}$]-5-docosen and derivates thereof, nonacyclo[10.9.1.1$^{4,7}$.1$^{13,20}$. 1$^{15,18}$.0$^{2,10}$.0$^{3,8}$. 0$^{12,21}$.0$^{14,19}$]-5-pent acosen and derivates thereof, and the like.

Specific examples of the saturated norbornene resin are as described above and further specific structures of these compounds are shown in paragraph Nos. [0032] to [0054] of JP-A No. H7-145213.

In addition, for a method of synthesizing the saturated norbornene resins, the synthesis can be carried out with reference to the method described in paragraph Nos. [0039] to of JP-A No. 2001-114836.

In addition, as the saturated norbornene resin of the invention, cycloolefin (co)polymer consisting a polymerized unit from at least one kind of the compounds represented by the following formulae (I) to (VI), or a polymerized unit from at least one kind thereof and a compound represented by the flowing formula (VII) is exemplified. Here, the proportion of the polymerized unit from the compound represented by the formula (VII) is in the range of 0 to 99 mol %.

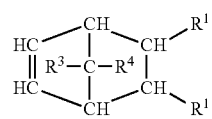  (I)

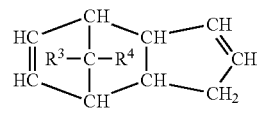  (II)

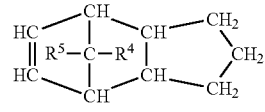  (II')

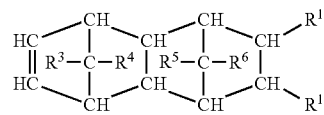  (III)

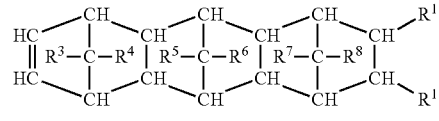  (IV)

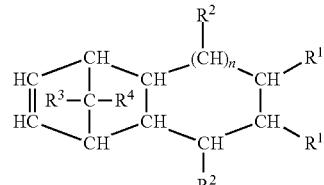  (V)

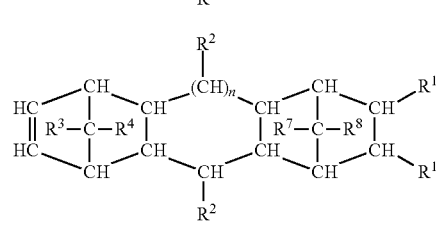  (VI)

wherein $R^1$, $R^2$, $R^3$, $R^4$, $R^5$, $R^6$, $R^7$ and $R^8$ are each a hydrogen atom and a hydrocarbon group having 1 to 20 carbon atoms, such as an alkyl group having 1 to 8 carbon atoms, an aryl group having carbon atoms 6 to 18, an alkylenearyl group having 7 to 20 carbon atoms, a cyclic or acyclic alkenyl group having 2 to 20 carbon atoms, or form a saturated, unsaturated or aromatic ring. N is an integer of 0 to 5.

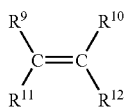

(VII)

wherein $R^9$, $R^{10}$, $R^{11}$ and $R^{12}$ are each a hydrogen atom, a linear or branched, saturated or unsaturated hydrocarbon group having 1 to 20 carbon atoms, such as an alkyl group having 1 to 8 carbon atoms and an alkyl group having 6 to 18 carbon atoms.

The cycloolefin polymers may also be obtained by ring-opening polymerization of at least one of the monomers having the formulae (I) to (VI), followed by hydrogenation of the resultant products.

The cycloolefin copolymer according to the invention may moreover contain from 0 to 45 mol %, based on the entire structure of the cycloolefin copolymer, of polymerized units derived from one or more monocyclic olefins of the formula (VIII).

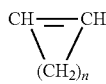

(VIII)

wherein n is an integer of 2 to 10.

The proportion of polymerized units derived from cyclic, in particular polycyclic, olefins is preferably from 3 to 75 mol %, based on the entire structure of the cycloolefin copolymer. The proportion of polymerized units derived from acyclic olefins is preferably from 5 to 80 mol %, based on the entire structure of the cycloolefin copolymer.

The cycloolefin (co)polymers preferably consist of polymerized units derived from one or more polycyclic olefins, in particular from polycyclic olefins of the formulae (I) or (III), and of polymerized units derived from one or more acyclic olefins of the formula (VII), in particular α-olefins having from 2 to 20 carbon atoms. Preference is particularly given to cycloolefin (co) polymers which consist of polymerized units derived from a polycyclic olefin of the formula (I) or (III) and from an acyclic olefin of the formula (VII). Preference is furthermore given to terpolymers which consist of polymerized units derived from a polycyclic monoolefin of the formula (I) or (III), from an acyclic monoolefin of the formula (VII) and from a cyclic or acyclic olefin (polyene) which contains at least two double bonds, in particular cyclic, preferably polycyclic, dienes, such as norbornadiene or cyclic, particularly preferably polycyclic, alkenes, such as vinylnorbornene, which carry an alkenyl group having 2 to 20 carbon atoms.

The cycloolefin polymers according to the invention preferably comprise olefins based on a norbornene structure, particularly preferably norbornene, tetracyclododecene and, if desired, vinylnorbornene or norbornadiene. Preference is also given to cycloolefin (co)polymers which comprise polymerized units derived from acyclic olefins having terminal double bonds, such as a α-olefins having 2 to 20 carbon atoms, particularly preferably ethylene or propylene. Particular preference is given to norbornene-ethylene (co)polymers and tetracyclododecene-ethylene (co) polymers.

Among the terpolymers, particular preference is given to norbornene-vinylnorbornene-ethylene terpolymers, norbornene-norbornadiene-ethylene terpolymers, tetracyclododecene-vinylnorbornene-ethylene terpolymers and tetracyclododecene-vinyltetracyclododecene-ethylene terpolymers. The proportion of the polymerized units derived from a polyene, preferably vinylnorbornene or norbornadiene, is from 0.1 to 50 mol %, particularly preferably from 0.1 to 20 mol %, and the proportion of the acyclic monoolefin of the formula (VII) is from 0 to 99 mol %, preferably from 5 to 80 mol %, based on the entire structure of the cycloolefin (co)polymer. In the terpolymers described, the proportion of the polycyclic monoolefin is from 0.1 to 99 mol %, preferably from 3 to 75 mol %, based on the entire structure of the cycloolefin (co)polymer.

The cycloolefin (co)polymer according to the invention preferably comprises at least one cycloolefin copolymer which comprises polymerized units which can be derived from polycyclic olefins of the formula (I) and polymerized units which can be derived from acyclic olefins of the formula (VII).

These cycloolefin copolymers can be synthesized according to the method described in paragraph Nos. [0019] to of JP-A No. H10-168201.

In the invention, various additives may be added, if desired, to the thermoplastic resin as in the above, not interfering with attaining the object of the invention. The additives are, for example, for preventing deterioration of thermoplastic resin, and for improving the heat resistance, the UV resistance and the smoothness of the formed optical films. They include phenolic or phosphorus-containing antioxidants, lactone-type thermal deterioration inhibitors, benzophenone-type, benzotriazole-type or acrylonitrile-type UV absorbents; lubricants such as aliphatic alcohol esters, polyalcohol partial esters or partial ethers; amine-type antistatic agents; and plasticizers. One or more such additives may be added to the resin in the invention either singly or as combined.

<<Melt-Casting Film Formation>>

A method of melt-casting film formation of a thermoplastic resin is described below, concretely with reference to an example of a method of cellulose acylate resin film formation. However, the invention should not be limited to it. The invention is applicable also to production of norbornene resin or polycarbonate resin films, in accordance with the description given hereinunder at a temperature suitably selected for the film formation.

(1) Pellets:

The cellulose acylate resin may be used as powder, but is preferably used as pellets for the purpose of reducing the film thickness fluctuation in film formation.

In case where the drying is carried out, such drying method can be employed as heating them in a heating furnace at 90° C. for at least 8 hours, but this is not the only one method. The pellet can be formed by melting the cellulose acylate and the additive using a twin screw kneading extruder at 150 to 240° C., and solidifying the extruded product in a noodle state in water and then cutting it. The pellet may also be formed according to an under water cutting method in which the mixture is molten with an extruder and then extruded from a pipe sleeve directly into water to be cut.

For the extruder, any publicly known single screw extruder, non-intermeshing counter-rotating twin screw extruder, intermeshing counter-rotating twin screw extruder, intermeshing corotating twin screw extruder can be used as long as it can give sufficient melt kneading.

The pellet has preferably such size as the cross-sectional area of 1 to 300 mm² and the length of 1 to 30 mm, more preferably the cross-sectional area of 2 to 100 mm² and the length of 1.5 to 10 mm.

When the pellet is formed, the additive also may be thrown through the raw material-throwing port or vent port provided in the midstream of an extruder.

The extruder has a rotation number of preferably 10 to 1000 rpm, more preferably 20 to 700 rpm, even more preferably 30 to 500 rpm. The rotation number of at least 10 rpm can realize reasonable staying time, and thus the lowering of molecular weight caused by thermal degradation and yellow hue deterioration hardly occurs. When the rotation number is at most 1000 rpm, the break of the molecule due to shear hardly occurs, and thus the lowering of the molecular weight and the increase in the generation of cross-linked gel hardly occur.

In the pelletization, the staying time in the extruder is preferably 10 seconds to 30 minutes, more preferably 15 seconds to 10 minutes, even more preferably 30 seconds to 3 minutes. When sufficient melting is possible, a shorter staying time is preferred in point that the degradation of resin and the generation of yellow hue can be prevented.

(2) Drying:

Prior to melt-casting film formation, the pellets are preferably dried to remove water so as to have a water content o at most 1.0% by mass, more preferably at most 0.1% by mass, even more preferably at most 0.01% by mass.

(3) Melt Extrusion:

The dried cellulose acylate resin is fed into a cylinder via the feed port of the kneading extruder. The screw compression ratio of the kneading extruder is preferably from 2.5 to 4.5, more preferably from 3.0 to 4.0. L (screw length)/D (screw diameter) is preferably from 20 to 70, more preferably from 24 to 50. The extrusion temperature is preferably from 190 to 240° C. The barrel of the extruder is preferably heated with a heater divided into from 3 to 20 portions for melting the resin therein. The preferred melting temperature is from 160° C. to 240° C., more preferably from 170° C. to 235° C., even more preferably from 180° C. to 235° C. In this case, it is desirable that the temperature on the inlet port side (on the hopper side) is low and the temperature on the outlet port side is higher by from 10° C. to 60° C. The screw may be a fullflight screw, a maddock screw, or a dalmage screw. For preventing resin oxidation, it is more desirable that the inner atmosphere of the kneading extruder is an inert gas (e.g., nitrogen), or an extruder with a vent is used and it is degassed to be in vacuum.

(4) Filtration

In order to filtrate foreign substances in resin or avoid damage of a gear pump caused by foreign substances, a so-called breaker plate type filtration is preferably carried out, wherein a filtering medium is provided for the extruder outlet. In addition, in order to filtrate foreign substances with a higher accuracy, a filtering apparatus built with a so-called leaf type disc filter is preferably disposed after the pass of the gear pump. The filtration can be effected by providing one filtration section, or may be multi-step filtration effected by providing a plurality of filtering sections. The filtering medium preferably may have a higher filtration accuracy, but from the viewpoint of the pressure capacity of the filtering medium or the increase of filtering pressure that is caused by the clogging of the filtering medium, the filtration accuracy is preferably 15-3 μmm, more preferably 10-3 μmm. In particular, in case where an apparatus using a leaf type disc filter that carries out final foreign substance filtration is employed, the use of a filtering medium having a high accuracy is preferred in point of the quality, and the adjustment based on the loading number of the filter sheet is possible for the purpose of securing the fitness for the pressure capacity and the lifetime of the filter. For the type of the filtering medium, since it is used under high temperatures and high pressures, the use of steel materials are preferred, and of these, the use of stainless steel or steel is preferred, and the use of stainless steel is especially desirable in point of corrosion resistance. For the filtering medium, in addition to those having a constitution formed by knitting wire material, a sintered filtering medium formed by sintering, for example, metal long fibers or metal powder can be used, and the sintered filtering medium is preferred from the viewpoint of the filtration accuracy and filter life.

(5) Gear Pump

To improve uniformity in the thickness, reducing fluctuation in the discharge amount is important. Disposing a gear pump between the extruder and the die, and supplying a fixed amount of a cellulose acylate resin through the gear pump is effective. Such a gear pump has a pair of gears, i.e., a drive gear and a driven gear engaged with each other. By driving the drive gear to engage and rotate the two gears, a molten resin is sucked into the cavity through a suction port provided on the housing, and the resin is discharged through a discharge port also provided on the housing in a constant amount. Even if the pressure of the resin at the tip of the extruder slightly fluctuates, such fluctuation is absorbed by the use of the gear pump, and thus the fluctuation in the pressure of the resin in the downstream of the film forming apparatus becomes very small, and this improves thickness fluctuation. By using a gear pump, the fluctuation of the pressure resin at the die can be kept within +/−1%.

To improve the capability of volumetric feeding of gear pumps, an approach of controlling the pressure before a gear pump at a constant value by changing the rotational number of the screw is also applicable. A high accuracy gear pump using 3 or more gears in which fluctuation in the gear is eliminated is also effective.

For other advantages of using a gear pump, since film forming can be performed with a decreased pressure at the screw tip, reduction of energy consumption, prevention of increase in the resin temperature, improvement in transportation efficiency, shortening of the residence time in the extruder and reduction of the L/D in the extruder can be expected. Further, when using a filter for removing contaminants, the amount of the resin supplied through the screw may fluctuate due to increase in the filtration pressure in the absence of a gear pump; this problem, however, can be solved by using a gear pump in combination. On the other hand, such a gear pump has a disadvantage that equipment becomes long depending on which equipment is selected, and the residence time of the resin is extended. In addition, due to the shearing stress in the gear pump, molecular chains may be broken. Accordingly, attention must be paid to these disadvantages.

A preferred residence time for a resin which is introduced into the extruder through a supply port and discharged from the die is from 2 to 60 minutes, more preferably from 3 to 40 minutes, and further preferably from 4 to 30 minutes.

If the flow of polymer for circulation in a bearing of the gear pump becomes poor, sealing with the polymer at the driving part and the bearing part becomes poor, causing problems such as large fluctuation in the pressure of measurement and the pressure of extrusion and feeding of liquid. Therefore, designing of gear pumps (particularly clearance) in accordance with the melt viscosity of cellulose acylate resin is necessary. Further, in some cases, the residence part in the gear pump gives rise to deterioration of transparent thermoplastic resin, and therefore a structure with the smallest possible residence is preferred. A polymer tube and adapters connecting the extruder and the gear pump or the gear pump and the die must also be designed with the smallest possible residence. In addition, for the stabilization of the extrusion pressure of transparent thermoplastic resin whose melt viscosity is highly dependent on the temperature, fluctuation in the temperature is preferably kept as small as possible. In general, a band heater whose equipment cost is low is often used for heating the polymer tube, but an aluminum cast heater with a smaller temperature fluctuation is more preferably used. Further, to stabilize the discharge pressure of the extruder as described above, melting is preferably performed by heating with a heater dividing the barrel of the extruder into 3 to 20 areas.

(6) Die

A transparent thermoplastic resin is melted in an extruder configured as above, and the molten resin is continuously fed to a die, if necessary, through a filtering device and/or a gear pump. Any type of commonly used dies such as a T-die, a fish-tail die, and a hanger coat die may be used as long as the die is designed so that the residence of the molten resin in the die is short. A static mixer may be disposed immediately before the T die in order to improve uniformity of the resin temperature. The clearance of the T die outlet is generally 1.0 to 5.0 times, preferably 1.2 to 3 times, more preferably 1.3 to 2 times the film thickness. When the lip clearance is less than 1.0 times the film thickness, a well-formed sheet is difficult to obtain by film forming. When the lip clearance is larger than 5.0 times the film thickness, the uniformity in the thickness of the sheet is disadvantageously decreased. The die is a very important device for determining the thickness uniformity of the film, and a die capable of precisely controlling the thickness is preferred. The thickness is generally controllable in increments of 40 to 50 mm, but dies capable of controlling the film thickness in increments of preferably 35 mm or less, more preferably 25 mm or less are preferred. In order to improve the uniformity of the formed film, a design in which unevenness in the temperature of the die and unevenness in the flow rate in the width direction are as small as possible is essential. In addition, an automatic thickness control die in which the film thickness in the downstream is measured to calculate thickness deviation and the result is given as a feedback for controlling the thickness in the die is effective for reducing thickness fluctuation in a long-term continuous production.

A single layer film forming apparatus whose equipment cost is low is generally used for producing a film. In some cases, however, a multi-layer film forming apparatus may also be used for forming a functional layer as an outer layer so as to produce a film having two or more structures. Generally, a thin functional layer is preferably stacked on the surface layer, and the ratio of the thickness of the layers is not particularly limited.

(7) Casting:

Preferably, the resin is cast into a film, according to the above-mentioned casting condition.

(8) Winding:

Preferably, the film is trimmed at both edges thereof before wound up. As the trimming cutter, usable is any of rotary cutter, shear blade, or knife. Its material may be any of carbon steel or stainless steel. In general, ultra-hard blades or ceramic blades are preferred as the blade life is long and the machining dust may be reduced. The trimmed scraps may be ground and recycled for the starting material for film. It is also desirable that the film is knurled at one side or at both sides before wound up. Preferably, the knurling height is preferably from 1 to 200 μm, more preferably from 10 to 150 μm, even more preferably from 20 to 100 μm. The film may be knurled on its both surfaces or on its one surface. The knurling width is preferably from 1 to 50 mm, more preferably from 3 to 30 mm, even more preferably from 5 to 20 mm. The extrusion may be effected at room temperature to 300° C.

Before the take-up, a lamination film is preferably applied to at least one surface for preventing scars. The thickness of lamination film is 5 to 200 μm, more preferably 10 to 150 μm, and further preferably 15 to 100 μm. The material may be polyethylene, polyester, polypropylene, or the like, without being particularly limited.

The take up tension is preferably 1 kg/m in width to 50 kg/m in width, more preferably 2 kg/m in width to 40 kg/m in width, and further preferably 3 kg/m in width to 20 kg/m in width. When the take-up tension is 1 kg/m or more in width, uniform take up of the film tends to be easy. On the other hand, when the take-up tension is 50 kg/m or less in width, the tight winding of the film or giving a poor appearance of the wound film tend to improve, and also problems such as raised portions in the film is extended due to creep, resulting in waving of the film, and residual birefringence is produced due to extension of the film, are more likely to improve. The take-up tension is detected by tension control along the line, and the film is preferably taken up being controlled to a constant take-up tension. When the film temperature varies depending on the position in the film forming line, films may have a slightly different length due to thermal expansion. Accordingly, it is necessary that the drawing ratio of nip rolls is adjusted so that a tension higher than a pre-determined tension is not applied to the film in the line.

The film can be taken up at a constant tension by the control in the tension control. More preferably, however, the tension is tapered proportional to the roll diameter to determine an appropriate take-up tension. Generally, the tension is gradually reduced as the roll diameter increases, but in some cases, the tension is preferably increased as the roll diameter increases.

The film width is preferably from 1 m to 5 m, more preferably from 1.2 m to 4 m, even more preferably from 1.3 m to 3 m.

<<Physical Properties of Unstretched Cellulose Acylate Film>>

The residual solvent in the thermoplastic film of the invention is preferably at most 0.01% by mass, more preferably 0% by mass.

From the viewpoint of the handlability of the film in working it into polarizers and the curling resistance of the formed polarizers as well as the producibility of the film, the thickness of the unstretched film is preferably from 20 to 300 μm, more preferably from 30 to 250 μm, even more preferably from 35 to 200 μm. Especially for thin films, their thickness is preferably from 30 μm to 100 μm, more preferably from 30 μm to 60 μm. In forming it in a mode of melt-casting film formation by cooling and solidifying a resin melt having run out from a die on a casting drum, such a thin film may be simultaneously and uniformly cooled in the direction of the film thickness from the surface on the casting drum side to the surface opposite thereto, and therefore residual distortion may hardly remain inside the film and the film may hardly undergo retardation change with time. On the other hand, a thick film is gradually cooled from the side of the casting drum having a large heat capacity toward the opposite side thereto, and therefore the thermal shrinkage of the film on the casting drum side is larger than that on the opposite side thereto, thereby often producing distortion in the film. As a result, the retardation change of the film with time may be large.

The film thickness fluctuation is preferably from 0 to 3 μm, more preferably from 0 to 2 μm, even more preferably from 0 to 1 μm.

The film surface roughness Ra is preferably from 0.01 to 200 nm, more preferably from 0.01 to 150 nm, even more preferably from 0.01 to 100 nm.

The ratio of the surface roughness Ra of the two surfaces of the film is preferably from 0.8 to 1.2, more preferably from 0.85 to 1.1, even more preferably from 0.9 to 1.05.

The unstretched cellulose acylate film of the invention is preferably such that Re=from 0 to 10 nm and Rth=from −15 to 15 nm, more preferably Re=from 0 to 5 nm and Rth=from −10 to 10 nm, even more preferably Re=from 0 to 4 nm and Rth=from −8 to 8 nm, as in the above-mentioned formulae (I) and (II). Re and Rth are data measured at 25° C. and a relative humidity of 60% and at a wavelength of 590 nm. The Re and Rth fluctuation is preferably from 0% to 1.5%, more preferably from 0% to 1% both in the longitudinal direction and the transverse direction of the film.

The absolute value of the difference between Re at 25° C. and a relative humidity of 10% and Re at 25° C. and a relative humidity of 80% is preferably at most 5 nm, more preferably at most 4 nm, even more preferably at most 3 nm.

The absolute value of the difference between Rth at 25° C. and a relative humidity of 10% and Rth at 25° C. and a relative humidity of 80% is preferably at most 15 nm, more preferably at most 12 nm, even more preferably at most 10 nm.

The equilibrated water content at a relative humidity of 80% is preferably from 1% by mass to 2.5% by mass, more preferably from 1.1% by mass to 2.4% by mass, even more preferably from 1.2% by mass to 2.3% by mass.

The behavior of the optical characteristics of the melt-cast cellulose acylate film of the invention may be controlled relative to the wavelength of light. Specifically, it is desirable that the absolute value of the difference between Re(400) and Re(700) at a wavelength of 400 nm and 700 nm is from 0 to 15 nm, more preferably from 0 to 10 nm.

Also preferably the absolute value of the difference between Rth(400) and Rth(700) at a wavelength of 400 nm and 700 nm is from 0 to 35 nm, more preferably from 0 to 20 nm.

With formula expression, the film preferably satisfies the following formulae (A-1) and (A-2):

$$0 \leq |Re(700)-Re(400)| \leq 15 \text{ nm} \quad (A\text{-}1)$$

$$0 \leq |Rth(700)-Rth(400)| \leq 35 \text{ nm} \quad (A\text{-}2)$$

(wherein Re(400) and Re(700) indicate the in-plane retardation at a wavelength of 400 nm and 700 nm, respectively; and Rth(400) and Rth(700) indicate the thickness direction retardation at a wavelength of 400 nm and 700 nm, respectively).

The water permeability at 40° C. and a relative humidity of 90% is preferably from 250 g/m²·day to 1200 g/m²·day, more preferably from 300 g/m²·day to 1000 g/m²·day.

Preferably, the thermoplastic film of the invention is transparent. According to the production method of the invention, such a transparent thermoplastic film can be favorably produced. Preferably, the total light transmittance of the thermoplastic film of the invention is from 90% to 100%, more preferably from 91 to 100%. "Transparent" as referred to in the invention means that the total light transmittance of the film is at least 88%.

The tensile elasticity is preferably from 1.0 kN/mm² to 3.5 kN/mm², more preferably from 1.4 kN/mm² to 2.6 kN/mm².

The breaking elongation is preferably from 8% to 400%, more preferably from 10% to 300%, even more preferably from 15% to 200%.

Tg of the cellulose acylate is preferably from 95° C. to 145° C., more preferably from 100 to 145° C. The thermal dimensional change at 80° C. for 1 day is preferably from 0% to ±1%, more preferably from 0% to ±0.3% on both the lateral and longitudinal sides.

<<Stretching and Physical Properties of Stretched Cellulose Acylate Film>>
(Stretching)

The unstretched film may be stretched to control its Re and Rth. The thermoplastic film of the invention produced in the manner as above is preferably stretched in the longitudinal/transverse direction. The film may be stretched in any of the longitudinal direction or the transverse direction, or may be stretched in the two directions. The longitudinal direction and/or transverse direction stretching may be effected each once, or may be effected each plural times. The two stretching modes may be effected at the same time.

The stretching may be attained in the longitudinal direction, using at least two pairs of nip rolls of which the peripheral speed of the rolls on the outlet port side is made higher (longitudinal direction stretching), or may be effected in the crossing direction (the direction vertical to the longitudinal direction) by holding both edges of the film with chucks (transverse direction stretching). In addition, as in JP-A 2000-37772, 2001-113591, 2002-103445, a simultaneous biaxial stretching method may also be employed The draw ratio in stretching may be obtained according to the following formula:

Draw Ratio (%)=100×{(length after stretching)−(length before stretching)}/(length before stretching).

Concretely, the following stretching methods are preferred. The thermoplastic film of the invention mentioned above is stretched as described below, whereby the surface smoothness of the film may be improved, the surface roughness thereof may be reduced, the surface streaks of the film may be reduced, and the optical properties (Re and Rth fluctuation unevenness) thereof may be improved.

(1) Longitudinal Direction Stretching:

The longitudinal direction stretching may be attained, using two pairs of nip rolls between which the film is led to run. The peripheral speed of the nip rolls on the outside port side is made higher than that of the nip rolls on the inside port side, and while the film is led to run between the rolls under heat, the film may be stretched in the longitudinal direction. In this case, when the distance (L) between the nip rolls and the unstretched film width (W) are changed, then the expressibility of the retardation in the film thickness direction (Rth) may be changed. When L/W (this may be referred to as an aspect ratio) is from more than 2 to 50 (long-pan stretching), then Rth may be reduced; but when the aspect ratio is from 0.01 to 0.3 (short-pan stretching), then Rth may be large. These are suitably used in accordance with the intended Rth (aimed value of Rth). This is described in detail hereinunder.

(1-1) Long Span Stretching.

When stretched, the film is elongated. In this stage, the film reduces its thickness and width so as to reduce its volume change. In this, the film shrinkage in the transverse direction is limited owing to the friction between the nip rolls and the film. Accordingly, when the nip roll distance is large, then the film may readily shrink in the transverse direction and the film thickness reduction may be controlled. Large thickness reduction produces the same effect as that of the compression of the film in the thickness direction, therefore with the result that the molecular orientation in the film plane may be promoted to enlarge Rth. When the aspect ratio is large and the thickness reduction is small, the case is opposite to the above case, or that is, the film hardly expresses Rth and may have a low Rth.

When the aspect ratio is further longer, then the uniformity of the film in the transverse direction may be improved. This is because of the following reasons.

(i) When stretched in the longitudinal direction, the film shrinks in the transverse direction. Around the center in the transverse direction, both sides of the center of the film shrink in the transverse direction, and therefore they are in a tug of war state and could not freely shrink.

(ii) On the other hand, the edges in the transverse direction of the film are in a tug of war state only on one side thereof, and can therefore freely shrink.

(iii) The difference in the shrinking behavior with stretching between the edges and the center part causes stretching unevenness in the transverse direction.

Such unevenness between the edges and the center part produces the retardation fluctuation in the transverse direction and the axial shifting (orientation angle distribution of slow axis). As opposed to it, in long span stretching, the film is slowly stretched in a long span between two nip rolls, and therefore the unevenness may be canceled to be even during the stretching (the molecular orientation is unified). As opposed to it, in ordinary longitudinal direction stretching (aspect ratio=from more than 0.3 to less than 2), such unification does not occur.

The aspect ratio is preferably from more than 2 to 50, more preferably from 3 to 40, even more preferably from 4 to 20. The stretching temperature is preferably from (Tg−5° C.) to (Tg+100° C.), more preferably from (Tg) to (Tg+50° C.), even more preferably from (Tg+5° C.) to (Tg+30° C.). The draw ratio in stretching is preferably from 1.05 to 3 times, more preferably from 1.05 to 1.7 times, even more preferably from 1.05 to 1.4 times. The long span stretching may be multi-stage stretching with at least 3 pairs of nip rolls, in which the largest aspect ratio in the multiple stages may fall within the above-mentioned range.

The long span stretching may be attained by heating the film between two pairs of nip rolls spaced from each other by a predetermined distance therebetween, in which the heating method may be a heater-assisted heating method (where the film is heated by radiation heat from an IR heater, a halogen heater or a panel heater disposed on or below the film); or may be a zone heating method (where hot air is jetted into a heating zone and the film is heated in the zone conditioned at a predetermined temperature). In the invention, from the viewpoint of the uniformity of the stretching temperature, the zone heating method is preferred. In this case, the nip rolls may be disposed inside the stretching zone, or may be outside it; but for preventing the film from sticking to the nip rolls, the nip rolls are preferably disposed outside the zone. Before thus stretched, it is desirable to preheat the film; and in this case, the preheating temperature is preferably from (Tg−80° C.) to (Tg+100° C.).

Thus stretched in the manner as above, the film may have an Re value of preferably from 0 to 200 nm, more preferably from 10 to 200 nm, even more preferably from 15 nm to 100 nm. Thus stretched, the film may have an Rth value of preferably from 30 to 500 nm, more preferably from 50 to 400 nm, even more preferably from 70 to 350 nm. According to the stretching method, the ratio of Rth to Re (Rth/Re) may be made to be, for example, from 0.4 to 0.6, preferably from 0.45 to 0.55. Further, the Re and Rth fluctuation of the thus-stretched film is, for example, at most 5% each, preferably at most 4% each, more preferably at most 3% each.

Thus stretched, the ratio of the film width before and after stretching (film width after stretching/film width before stretching) is, for example, from 0.5 to 0.9, more preferably from 0.6 to 0.85, more preferably from 0.65 to 0.83.

(1-2) Short Span Stretching:

The film may be stretched in the longitudinal direction at the aspect ratio (L/W) thereof of, for example, from more than 0.01 to less than 0.3, preferably from 0.03 to 0.25, more preferably from 0.05 to 0.2 (short span stretching). Stretching at the aspect ratio (L/W) falling within the range may reduce the degree of necking-in of the film (film shrinkage in the direction vertical to the stretching direction, owing to the stretching). For compensating for the elongation in the stretching direction, the width and the thickness of the film may reduce, but in the short span stretching, the transverse direction shrinkage may be controlled and the thickness reduction may go on predominantly. As a result, the film may be compressed in the thickness direction, and the thickness direction orientation (plane orientation) goes on. As a result, the Rth value that is the criterion of the anisotropy in the thickness direction tends to increase. On the other hand, in a conventional method, the stretching is attained at an aspect ratio (L/W) of about 1 (from 0.7 to 1.5). This is because in a conventional method, a film is stretched with a heater disposed between nip rolls, but when L/W is too large, then the film could not be heated uniformly therefore resulting in that the film is often stretched unevenly; and when L/W is too small, then the heater is difficult to dispose and the film could not be heated sufficiently.

The above-mentioned short span stretching may be attained by varying the conveying speed of at least two pairs of nip rolls. Different from ordinary roll disposition, the two pairs of nip rolls may be disposed obliquely to each other to attain the intended stretching (the forward and backward nip rolls are so disposed that their rotation axes are shifted upward and downward).

Accordingly, since a heater could not be disposed between the nip rolls, it is desirable that a heating medium is led to run inside the nip rolls to thereby heat the film. Further, it is also desirable that a preheating roll with a heating medium running inside it, is disposed before the nip roll on the inlet side to thereby heat the film before stretched. The stretching temperature is preferably from (Tg−5° C.) to (Tg+100° C.), more preferably from (Tg) to (Tg+50° C.), even more preferably from (Tg+5° C.) to (Tg+30° C.). The preheating temperature is preferably from (Tg−80° C.) to (Tg+100° C.).

The long span stretching and the short span stretching are described in detail hereinunder.

Figure 5:
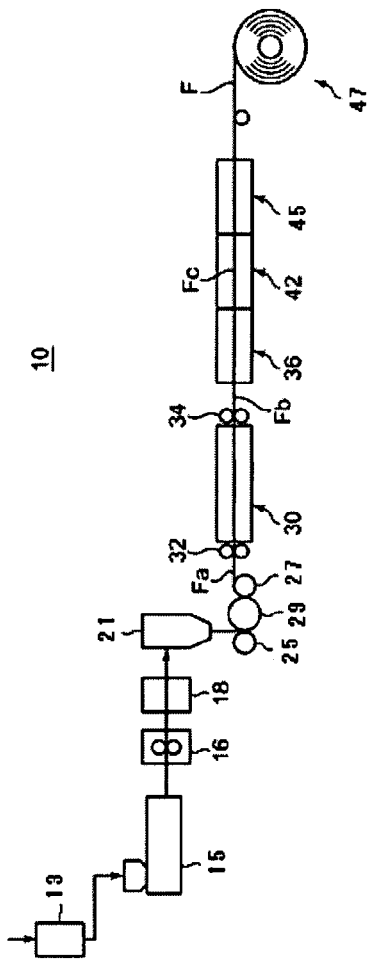
FIG. 5 is a diagrammic illustration of an apparatus for producing a thermoplastic film formed by stretching at a long span.

FIG. 5 is a constitutional outline view of a film forming apparatus 10 for producing a thermoplastic film through melt-casting film formation, in which the formed film is long span stretched.

The film-forming apparatus 10 is an apparatus for producing a thermoplastic film F that may be used in liquid-crystal display devices, etc. The starting material of the thermoplastic film F, cellulose acylate resin or cycloolefin resin pellets are introduced into a drier 13 and dried therein, and then the pellets are extruded out through an extruder 15, and fed to a filter 18 via a gear pump 16. Next, the impurities are removed through the filter 18, and the melt is extruded out via a die 21. Next, the extruded melt is held between a casting drum 29 and a touch roll 25, and solidified while led to pass between the casting drum 29 and the touch roll 27, thereby forming an unstretched film Fa having a predetermined surface roughness. The unstretched film Fa is then fed to a longitudinal direction stretching zone 30 where it is long span stretched.

Figure 6:
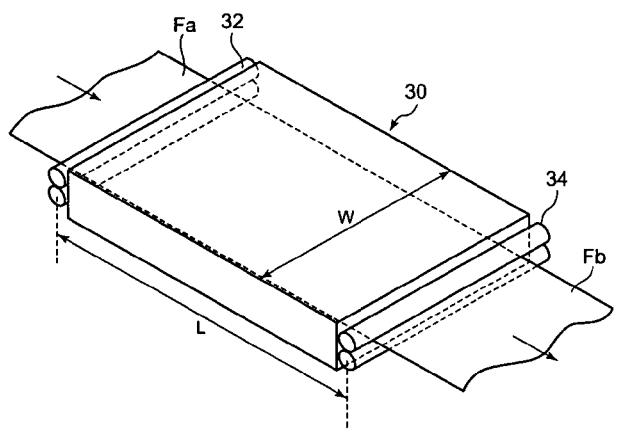
FIG. 6 is a perspective illustration of a longitudinal stretching part in FIG. 5.

In the longitudinal direction (MD) stretching zone 30, the unstretched film Fa is stretched in the longitudinal direction between the inlet side nip rolls 32 and the outlet side nip rolls 34, thereby forming an MD-stretched film Fb. FIG. 6 is a perspective explanatory view of the MD stretching zone 30, in which the ratio of length/width (L/W) in MD stretching is defined by the distance L between the inlet side nip rolls 32 and the outlet side nip rolls 34, and the width W in the longitudinal direction of the inlet side nip rolls 32 and the outlet side nip roll 34. Next, the MD stretched film Fb is led to pass through a preheating zone 36 in which it is controlled at a predetermined preheating temperature, and then fed to a transverse direction (TD) stretching zone 42.

In the TD stretching zone 42, the MD stretched film Fb is stretched in the transverse direction perpendicular to the longitudinal direction, thereby forming a TD stretched film Fc. Then, the TD stretched film Fc is fed to a thermal solidifying zone 45, through which it is wound up in the winding zone 47, thereby giving a final product, thermoplastic film F of which the orientation angle and the retardation are regulated. The TD stretched film Fc may be further subjected to thermal relaxation treatment after having passed through the thermal solidifying zone 45.

Figure 7:
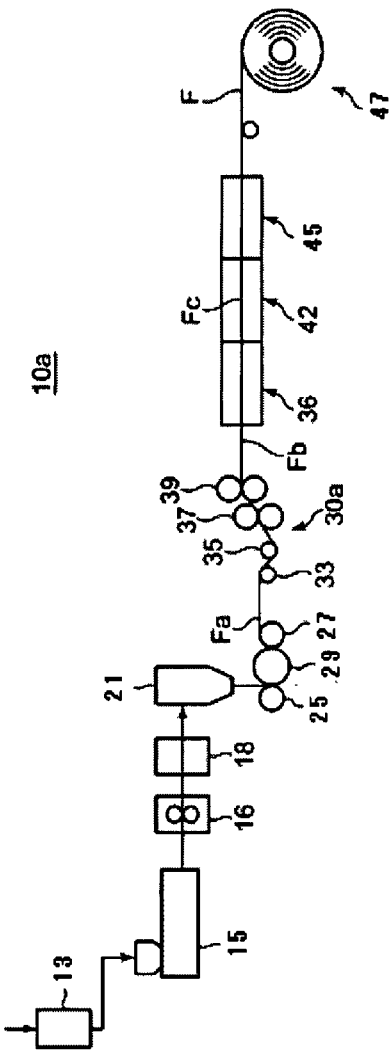
FIG. 7 is a diagrammic illustration of an apparatus for producing a thermoplastic film formed by stretching at a short span.

On the other hand, FIG. 7 is an outline constitutional view of a film forming apparatus 10a that comprises a short span longitudinal direction stretching zone 30a, in place of the long span longitudinal direction stretching zone 30 in FIG. 5 and FIG. 6.

In this film forming apparatus 10a, an unstretched film Fa is preheated by preheating rolls 33 and 35, up to a predetermined temperature, and then fed between two pairs of nip rolls 37 and 39 between which it is stretched in the longitudinal direction. In this case, the nip rolls 37 and 39 are disposed near to each other in the longitudinal direction of the unstretched film Fa but they differ in their position in the vertical direction by a predetermined length. Disposing the nip rolls 37 and 39 in that manner ensures the traveling length of the unstretched film Fa in the MD stretching zone 30a, and the distance between the mechanisms disposed before and after the MD stretching zone 30a may be thereby shortened and the film forming apparatus 10a may be down-sized.

Figure 8:
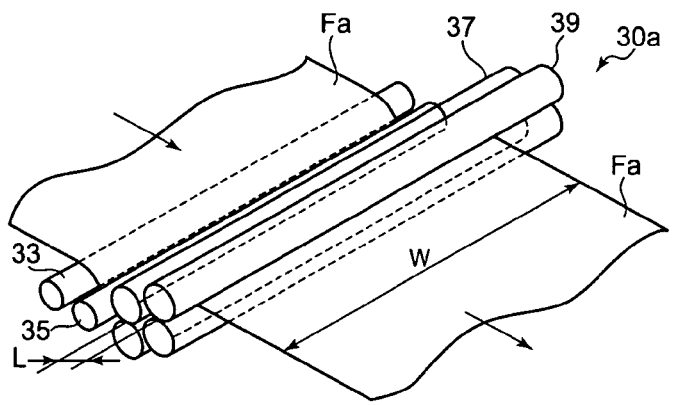
FIG. 8 is a perspective illustration of a longitudinal stretching part in FIG. 7.

FIG. 8 is a perspective explanatory view of the MD stretching zone 30a, in which the ratio of the length/width (L/W) in MD stretching is defined by the length L in the longitudinal direction of the unstretched film Fa to be nipped by the nip rolls 37 and 39, and the width W in the longitudinal direction of the nip rolls 37 and 39.

(2) Transverse Direction Stretching:

Combining longitudinal direction (MD) stretching and transverse direction (TD) stretching may regulate Re and Rth. The film may be stretched monoaxially alone in any mode of longitudinal direction stretching or transverse direction stretching; but combining the stretching in both directions may prevent over-orientation in the stretching direction to thereby prevent excessive increase in the absolute value of Re. In addition, combining MD stretching and TD stretching may offset the orientation in the longitudinal direction and the orientation in the transverse direction, thereby reducing Re. In addition, since the film may be elongated both in the longitudinal direction and in the transverse direction, its thickness may reduce greatly to promote in-plane orientation, thereby increasing Rth of the film.

The MD stretching and the TD stretching may be effected in any desired order, or may be effected simultaneously. More preferably, the film is first MD-stretched and then TD-stretched. In the stretching mode, the necessary apparatus may be made compact. The MD stretching and the TD stretching may be effected independently of each other, or may be effected continuously. More preferably, they are effected continuously.

The TD stretching may be carried out, for example, using a tenter. Specifically, both edges in the transverse direction of the film are held by clips, and the film is stretched by expanding it in the transverse direction. In this case, air at a desired temperature may be introduced into the tenter to thereby control the stretching temperature. The stretching temperature is preferably from (Tg−10° C.) to (Tg+60° C.), more preferably from (Tg−5° C.) to (Tg+45° C.), even more preferably from (Tg) to (Tg+30° C.). The draw ratio in stretching is preferably from 1.01 times to 4 times, more preferably from 1.03 times to 3.5 times, even more preferably from 1.05 times to 2.5 times. The ratio of TD draw ratio to MD draw ratio (TD draw ratio/MD draw ratio) is preferably from 1.1 to 100 or from 0.9 to 0.01, more preferably from 2 to 60 or from 0.5 to 0.017, even more preferably from 4 to 40 or from 0.25 to 0.025.

Before the stretching or after the stretching, the film may be subjected to heat treatment. Employing the means reduces the Re and Rth distribution after the stretching, therefore reducing the orientation angle fluctuation with bowing. Any one of preheating and heat treatment may be carried out, but both of the two are preferably carried out. Preferably, the preheating and the heat treatment are carried out with holding the film with clips, or that is, these are preferably carried out continuously with stretching.

The film may be preheated at a temperature higher than the stretching temperature preferably by 1° C. to 50° C., more preferably by 2° C. to 40° C., even more preferably by 3° C. to 30° C. The preheating time may be preferably from 1 second to 10 minutes, more preferably from 5 seconds to 4 minutes, even more preferably from 10 seconds to 2 minutes.

The heat treatment is effected at a temperature lower than the stretching temperature preferably by 1° C. to 50° C., more preferably by 2° C. to 40° C., even more preferably by 3° C. to 30° C. Still more preferably, the heat treatment is effected at a temperature not higher than the stretching temperature and not higher than Tg. The preheating time may be preferably from 1 second to 10 minutes, more preferably from 5 seconds to 4 minutes, even more preferably from 10 seconds to 2 minutes.

The preheating and the heat treatment reduce the orientation angle, Re and Rth fluctuation for the following reasons.

(i) The film is stretched in the transverse direction and is to thin in the running direction (longitudinal direction) (necking in).

(ii) Accordingly, before and after transverse direction stretching, the film may have pulled stress occurring therein. However, since both edges of the film in the transverse direction are held by chucks, and are therefore hardly deformed by stress, but the center part of the film in the transverse direction is readily deformed. As a result, the necked-in stress deforms like a bow to cause bowing. Accordingly, the in-plane Re and Rth fluctuation and the orientation axis distribution may occur.

Figure 9:
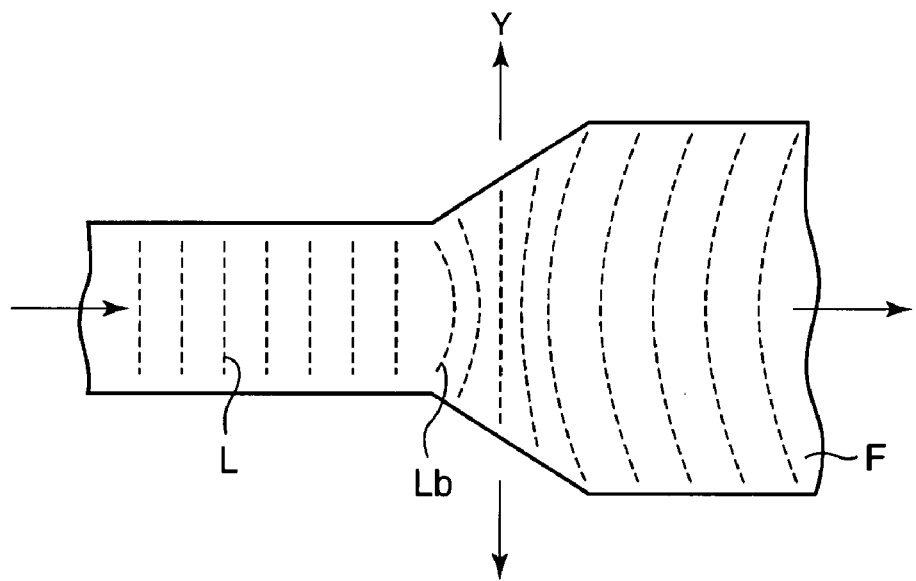
FIG. 9 is illustrating bowing caused by a method in which the film is not treated for heat-solidifying.
Figure 10:
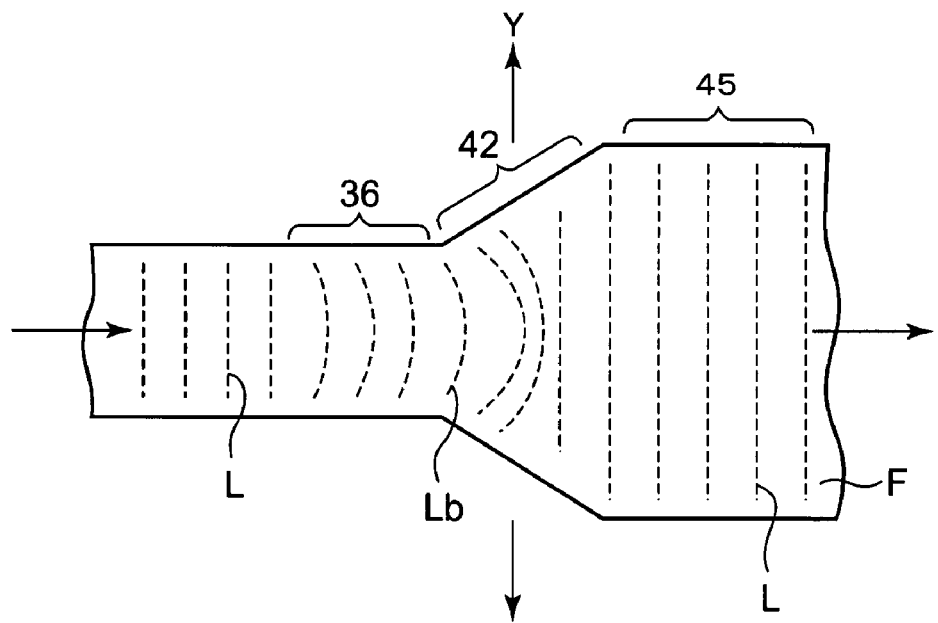
FIG. 10 is illustrating inhibition of bowing by heat-solidifying.

(iii) To prevent it, when the temperature on the preheating side (before stretching) is kept high and the temperature in heat treatment (after stretching) is kept low, then the film may be necked in on the high-temperature side having a lower elasticity (preheating side), but hardly on the heat treatment side (after stretching). In other words, when the film is not treated for heat-solidifying, then the film may be convexly bowed on the upstream side in the longitudinal direction near the outlet port of the TD-stretching zone of the TD-stretched film F, as in FIG. 9; but in the invention, since the film is treated for heat-solidifying in the heat-solidifying zone 45 just after the TD-stretching zone 42, and therefore the film may be prevented from being convexly bowed on the upstream side in the longitudinal direction, as in FIG. 10. In case where the film is preheated in the preheating zone 36 just before the TD-stretching zone 42, the resin distribution may readily expand on the downstream side in the longitudinal direction near the inlet port of the TD-stretching zone 42, thereby enabling uniform TD-stretching with the result that the film is hardly convexly bowed on the upstream side in the longitudinal direction near the outlet port of the TD-stretching zone 42. As a result, the film is prevented from being bowed after stretching.

The stretching mode as above may reduce the site-dependent fluctuation of Re and Rth in the transverse direction and in the longitudinal direction preferably to at most 5%, more preferably at most 4%, even more preferably at most 3%. Further, the orientation angle is preferably within 90°±5° or 0°±5°; more preferably within 90°±3° or 0°±3°; even more preferably within 90°±1° or 0°±1°.

(3) Relaxation:

After thus stretched, the film may be subjected to relaxation and its dimensional stability may be thereby improved. Thermal relaxation may be effected preferably after MD stretching or TD stretching or after the two, more preferably after TD stretching. The relaxation may be carried out continuously on line, or after the film is wound up, it may be subjected to off-line relaxation.

The thermal relaxation may be effected while the film is conveyed preferably at from (Tg−50° C.) to (Tg+30° C.), more preferably at from (Tg−30° C.) to (Tg+20° C.), even more preferably at from (Tg−15° C.) to (Tg+10° C.), preferably for 1 second to 10 minutes, more preferably for 5 seconds to 4 minutes, even more preferably for 10 seconds to 2 minutes, preferably under a tension of from 0.1 kg/m to 20 kg/m, more preferably from 1 kg/m to 16 kg/m, even more preferably from 2 kg/m to 12 kg/m.

After stretched, Re and Rth of the cellulose acylate film preferably satisfy the following formulae:

$|Rth| \geq Re$, $200 \geq Re \geq 0$, $300 \geq Rth \geq -100$.

More preferably, Re and Rth of the cellulose acylate film after stretched satisfy the following formulae:

$|Rth| \geq Re \times 1.2$, $150 \geq Re \geq 20$, $250 \geq Rth \geq -100$.

The angle θ between the film-forming direction (longitudinal direction) and the slow axis is preferably within 0±3°, more preferably with 0±1° in MD stretching. In TD stretching, the angle is preferably within 90±3° or −90±3°, more preferably within 90±1° or −90±1°.

Preferably, the thickness of the stretched cellulose acylate film is from 15 μm to 200 μm, more preferably from 30 μm to 150 μm, even more preferably from 30 μm to 120 μm. The thin film may have residual distortion remaining therein, and therefore it may hardly have retardation change with time. This is because, when a thick film is cooled after stretched, then the inside cooling thereof may be slower than the surface cooling thereof and therefore residual distortion may readily occur inside the film owing to the thermal shrinkage difference therein.

The film thickness fluctuation is preferably from 0 to 3 μm, more preferably from 0 to 2 μm, even more preferably from 0 to 1 μm both in the longitudinal direction and in the transverse direction.

Preferably, the physical data of the stretched cellulose acylate film fall within the following range.

The tensile elasticity is preferably from 1.0 kN/mm² to less than 3.0 kN/mm², more preferably from 1.3 kN/mm² to 2.6 kN/mm². The breaking elongation is preferably from 3% to 200%, more preferably from 8% to 150%. When kept at 80° C. for 1 day, the thermal dimensional change of the film is preferably from 0% to ±1%, more preferably from 0% to ×0.3% both in the longitudinal direction and in the transverse direction.

(Working of Cellulose Acylate Film)

Working processes applicable to the thermoplastic film of the invention are described below with reference to preferred embodiments thereof.

(Surface Treatment)

The surface treatment of a mixed cellulose acylate film is sometimes effective for providing an improved adhesion between it and any functional layer (for example, an undercoat or backup layer). Examples are glow discharge treatment, ultraviolet irradiation, corona treatment, flame treatment and acid or alkali treatment.

Glow discharge treatment is preferably carried out by treatment with a low-temperature plasma occurring at a low gas pressure of $10^{-3}$ to 20 torr (0.13 to 2700 Pa) or by plasma treatment at an atmospheric pressure. Plasma-excitable gas is gas excited into a plasma under such conditions, for example, argon, helium, neon, krypton, xenon, nitrogen, carbon dioxide, tetrafluoromethane or any other Freon, or a mixture thereof. Details thereof are stated in Published Technical Report of The Hatsumei Kyokai (Association of Inventions) (Report No. 2001-1745, published on Mar. 15, 2001 by Hatsumei Kyokai), pages 30 to 32.

The alkali saponification treatment of a cellulose acylate film may be effected by dipping the film in a saponifying solution or coating it with the solution. The dipping method may be carried out by passing a film for a period of 0.1 to 10 minutes through a tank containing an aqueous solution of e.g. NaOH or KOH having a pH of 10 to 14 and a temperature of 20° C. to 80° C., neutralizing it, washing it with water and drying it.

The coating method may be carried out by dip coating, curtain coating, extrusion coating, bar coating or E type coating. A coating solution for alkali saponification treatment is preferably prepared by selecting a solvent which improves the wetting property of the saponifying solution on the film and maintains its surface in a good condition without forming any unevenness thereon. More specifically, an alcoholic solvent is preferable and isopropyl alcohol is particularly preferable. An aqueous solution of a surface active agent can also be used as a solvent.

The alkali in the coating solution for alkali saponification is preferably one soluble in the solvent and KOH or NaOH is particularly preferable. The coating solution preferable has a pH of 10 or higher and more preferably 12 or higher. The reaction of alkali saponification is preferably carried out for a period of from one second to five minutes, more preferably from five seconds to five minutes and still more preferably from 20 seconds to three minutes, all at room temperature. The reaction of alkali saponification is preferably followed by washing with water the surface coated with the saponifying solution, or by washing it with an acid and thereafter with water. These methods of saponification are specifically described in, for example, JP-A 2002-82226 and WO02/46809.

An undercoat layer is preferably formed for adhesion to a functional layer. The undercoat layer may be formed after the above surface treatment or without any surface treatment. For details of the undercoat layer, reference is made to Published Technical Report of The Hatsumei Kyokai (Association of Inventions) (Report No. 2.001-1745, published on Mar. 15, 2001 by Hatsumei Kyokai), page 32.

<<Use of Thermoplastic film of the Invention>>

Preferably, thermoplastic film of the invention is combined with any of the functional groups described in detail in Hatsumei Kyokai Disclosure Bulletin (No. 2001-1745, published by the Hatsumei Kyokai on Mar. 15, 2001), pp. 32-45. Above all, preferred are polarizing plates, optical compensation films and antireflection films. These are described below in that order.

(1) Construction of Polarizing Plates:
(Polarizing Element)

The polarizing element in the invention preferably comprises polyvinyl alcohol (PVA) and dichroic molecules. However, as in JP-A 11-248937, PVA and polyvinyl chloride may be dewatered and dechlorinated to produce a polyene structure, and this may be aligned to give a polyvinylene-based polarizing element for use in the invention. In addition, a polarizing element produced according to a coating method such as typically those by Optiva Inc. is also usable herein.

PVA is a polymer material prepared by saponification of polyvinyl acetate. It may contain a component copolymerizable with vinyl acetate such as, for example, unsaturated carboxylic acids, unsaturated sulfonic acids, olefins, vinyl ethers. A modified PVA that has an acetoacetyl group, a sulfonic acid group, a carboxyl group, an oxyalkylene group or the like may also be employed herein.

Not specifically defined, the degree of saponification of PVA is preferably from 80 to 100 mol %, more preferably from 90 to 100 mol % from the viewpoint of its solubility. Also not specifically defined, the degree of polymerization of PVA is preferably from 1000 to 10000, more preferably from 1500 to 5000. The syndiotacticity of PVA is preferably at least 55% for its better durability, as in Japanese Patent 2978219, but it may be preferably from 45 to 52.5% as in Japanese Patent 3317494.

After formed into a film, PVA is dyed with dichroic molecules introduced thereinto, and then stretched to obtain a polarizing element. For the details of the method for producing the polarizing element, preferably referred to are those described in JP-A 2005-138375, paragraphs [0075] to [0082], JP-A 2006-2026, paragraphs [0138] to [0141], JP-A 2006-45500, paragraphs [0099] to [0108].

(Polarizing Plate)

Not specifically defined in the invention, the polarizing element and the protective film of cellulose acylate may be stuck together, for example, with an adhesive comprising a vinyl alcohol-based polymer, or with an adhesive comprising at least a water-soluble crosslinking agent for vinyl alcohol-based polymer such as boric acid, borax, glutaraldehyde, melamine or oxalic acid. In particular, because of the best adhesiveness to the polyvinyl alcohol film, the polyvinyl alcohol-based adhesive is preferably used. The adhesive layer may be formed as a dry coating layer of an aqueous solution of the adhesive. In preparing the aqueous solution, if desired, any other additive or a catalyst such as an acid may be added thereto. For the details of the method for constructing the polarizing plate and the properties of the polarizing plate, preferably referred to are those described in JP-A 2005-138375, paragraphs [0083] to [0113], JP-A 2006-2026, paragraphs [0142] to [0145], JP-A 2006-45500, paragraphs [0109] to [0111].

In general, a liquid-crystal display device has a liquid-crystal cell sandwiched between two polarizing plates, and in general, the liquid-crystal cell is formed by injecting a liquid crystal into the space between two substrates. Accordingly, an ordinary liquid-crystal display device has four polarizing plate-protective films. The thermoplastic film of the invention may be used in any of those four polarizing plate-protective films. The polarizing plate-protective film may be disposed as follows: One polarizing plate comprises a first protective film, a polarizing element and a second protective film laminated in that order, and two such polarizing plates are put to intersect at a right angle with the second protective film of the two facing inside (on the side of the liquid-crystal cell). However, the thermoplastic film of the invention is characterized in that its Re and Rth are minimized, that the humidity-dependent Re and Rth fluctuation is small and that the equilibrated water content thereof is low. Therefore, for the purpose of further improving the liquid-crystal display device comprising the film of the invention in point of its viewing angle dependence, its aging resistance, its light leakage resistance at the time of black level of display and its discoloration resistance, the thermoplastic film of the invention may be used as the second protective film to be disposed between the polarizing element and the liquid-crystal layer (liquid-crystal cell) in the liquid-crystal display device.

Also preferably, the first protective film of the upper polarizing plate to be disposed on the upper side (viewing side) of the liquid-crystal cell is selected from the melt-cased transparent cellulose acylate film or the solution-cast triacetyl cellulose film of the invention, and at least one layer of a hard coat layer, an antiglare layer and an antireflection layer is provided on its surface, and the first protective film of the polarizing plate is disposed on the viewing side of the display device. Also preferably, the first protective film of the lower polarizing plate to be disposed below (on the back side) the liquid-crystal cell is selected from the melt-cased transparent cellulose acylate film or the solution-cast triacetyl cellulose film of the invention, and the first protective film of the polarizing plate is disposed on the backlight unit side of the display device.

(2) Construction of Optical Compensation Film:

An optically-anisotropic layer is for compensating the liquid-crystal compound in the liquid-crystal cell at the time of black level of a liquid-crystal display device, and this may be formed by providing an orientation film on a cellulose acylate film and imparting optical anisotropy thereto. The optical compensation film of the invention may be constructed, using the thermoplastic film of the invention as a substrate and providing an optical compensation layer thereon.

(Orientation Film)

An orientation film is provided on the surface-treated cellulose acylate film. The film has a function of defining the orientation direction of liquid-crystalline molecules. However, in case where the orientation state of liquid-crystalline molecules is fixed after they are aligned, the orientation is useless for its role, and therefore it is not always an indispensable constitutive element in the invention. Specifically, only the optically-anisotropic layer on an orientation film of which the orientation state is fixed may be transferred onto a polarizing element, with which the polarizing plate of the invention may be constructed. For the details of the method for forming the orientation film and the material of the film, preferably referred to are those described in JP-A 2006-2026, paragraphs [0148] to [0159], JP-A 2006-45500, paragraphs [0114] to [0127], JP-A 2006-45501, paragraphs [0080] to [0085]. Thus formed, the thickness of the orientation film is preferably from 0.1 to 10 μm.

Next, the liquid-crystalline molecules in the optically-anisotropic layer on the orientation film are aligned. Then, if desired, the orientation film polymer may be reacted with the polyfunctional monomer contained in the optically-anisotropic layer, or the orientation film polymer may be crosslinked with a crosslinking agent.

(Optical Compensation Layer)

The liquid-crystalline molecules to be used in the optically-anisotropic layer include rod-shaped liquid-crystalline molecules and discotic liquid-crystalline molecules. The rod-shaped liquid-crystalline molecules and discotic liquid-crystalline molecules may be high-molecular liquid crystals or low-molecular liquid crystals, further including crosslinked low-molecular liquid crystals that do not exhibit liquid crystallinity.

Rod-Like Liquid Crystal Molecule

As the rod-like liquid crystal molecules, azomethines, azoxy compounds, cyanobiphenyls, cyanophenyl esters, benzoic acid esters, cyclohexanecarboxylic acid phenyl esters, cyanophenylcyclohexane compounds, cyano-substituted phenylpyrimidines, alkoxy-substituted phenylpyrimidines, phenyldioxanes, tolans and alkenylcyclohexylbenzonitriles are preferably used.

The rod-like liquid crystal molecules include metal complexes. Liquid crystal polymers containing rod-like liquid crystal molecules in repeating units can also be used as the rod-like liquid crystal molecule. In other words, the rod-like liquid crystal molecule may be bonded to a (liquid crystal) polymer.

The rod-like liquid crystal molecules are described in Kikan Kagaku Sosetsu (Quarterly Chemical Review), vol. 22, "Chemistry of Liquid Crystal", edited by the Chemical Society of Japan (1994), Chapters 4, 7, and 11, and "Liquid Crystal Device Handbook", edited by Japan Society for the Promotion of Science, 142nd Committee, Chapter 3.

The rod-like liquid crystal molecule preferably has a birefringence in the range of 0.001 to 0.7.

The rod-like liquid crystal molecule preferably has a polymerizable group in order to fix the oriented state thereof. The polymerizable group is preferably a radically polymerizable unsaturated group or a cationic polymerizable group. Specific examples include the polymerizable groups and polymerizable liquid crystal compounds described in JP-A No. 2002-62427, paragraphs [0064] to [0086].

Disk-like Liquid Crystal Molecule

Examples of the disk-like (discotic) liquid crystal molecule include benzene derivatives disclosed in the research report of C. Destrade et al., Mol. Cryst., vol. 71, p. 111 (1981); truxene derivatives disclosed in the research report of C. Destrade et al., Mol. Cryst., vol. 122, p. 141 (1985) and Phyics. Lett., A, vol. 78, p. 82 (1990); cyclohexane derivatives disclosed in the research report of B. Kohne et al., Angew. Chem. Soc., vol. 96, p. 70 (1984); and azacrown and phenylacetylene macrocycles disclosed in the research report of J. M. Lehn et al., J. Chem. Commun. p. 1794 (1985), and the research report of J. Zhang et al., J. Am. Chem. Soc. vol. 116, p. 2655 (1994).

The disk-like liquid crystal molecules include those having a structure in which linear alkyl groups, alkoxy groups or substituted benzoyloxy group radially substitute on a base nucleus locating at the center of the molecule and showing liquid crystallinity. Compounds of which molecule or cluster of molecules shows rotational symmetry and can be given a certain orientation are preferred. As for the optically anisotropic layer formed with disk-like liquid crystal molecules, the compound finally contained in the optically anisotropic layer does not need to be consisted of disk-like liquid crystal molecules, and for example, compounds obtained by polymerization or crosslinking of low molecular weight disk-like liquid crystal molecules having a thermo- or photo-reactive group with heat or light to form a polymer and thus no longer exhibiting liquid crystallinity are also included. Preferred examples of the disk-like liquid crystal molecule are described in Japanese Patent Laid-open Publication No. 8-50206. Polymerization of disk-like liquid crystal molecules is disclosed in JP-A No. H8-27284.

In order to fix the disk-like liquid crystal molecules by polymerization, it is necessary to bond a polymerizable group as a substituent to the disk-like core of the disk-like liquid crystal molecule. A compound in which the disk-like core and the polymerizable group are bonded through a bridging group is preferred. By such a structure, the orientation state of the compound can be kept in the polymerization reaction. Examples of such a compound include the compounds described in JP-A No. 2000-155216, paragraphs [0151] to [0168].

In the hybrid orientation, the angle formed by the long axis (disc plane) of disk-like liquid crystal molecule and plane of polarizing plate increases or decreases with increase of distance from the plane of polarizing plate along the depth direction of the optically anisotropic layer. The angle preferably decreases with increase of the distance. Further, variation of the angle may be continuous increase, continuous decrease, intermittent increase, intermittent decrease, variation including continuous increase and decrease or intermittent variation including increase or decrease. The intermittent variation includes a region during which the tilt angle does not change in the middle of the thickness along the thickness direction of the layer. Even if such a region in which the angle does not change is included, it is sufficient that the angle should increase or decrease as a whole. It is more preferred that the angle should continuously change.

The average direction of the long axis of the disk-like liquid crystal molecule on the polarizing plate side can be generally controlled by selecting the disk-like liquid crystal molecule or the material of the orientation layer, or by selecting the method for the rubbing treatment. The direction of the long axis (disc plane) of disk-like liquid crystal molecule on the surface side (air side) can be generally controlled by selecting type of the disk-like liquid crystal molecule or type of additive used together with the disk-like liquid crystal molecule. Examples of the additive used together with the disk-like liquid crystal molecule include plasticizer, surfactant, polymerizable monomer and polymer and so forth. Further, degree of the variation of the orientation angle can also be controlled by selection of the liquid crystal molecule and additive like the aforementioned control.

Other Components of Optically Anisotropic Layer

By using a plasticizer, surfactant, polymerizable monomer and so forth together with the aforementioned liquid crystal molecules, uniformity of the coated film, strength of the film, orientation state of the liquid crystal molecules and so forth can be improved. Those components are preferably substances that are compatible with the liquid crystal molecules and can change the tilt angle of the liquid crystal molecules or do not inhibit the orientation.

Examples of the polymerizable monomer include radically polymerizable compounds and cationic polymerizable compounds. The polymerizable monomer is preferably a polyfunctional radically polymerizable monomer, and such a monomer copolymerizable with the aforementioned liquid crystal compound having the polymerizable group is preferred. Examples include those described in JP-A No. 2002-296423, paragraphs [0018] to [0020]. The amount of the compound is generally 1 to 50%, preferably 5 to 30 weight %, of the disk-like liquid crystal molecules.

Although the surfactant may be a conventionally known compound, a fluorine-containing compound is particularly preferred. Specific examples thereof include the compounds described in JP-A No. 2001-330725, paragraphs [0028] to [0056].

It is preferred that the polymer used together with the disk-like liquid crystal molecules can change the tilt angle of the disk-like liquid crystal molecules.

Examples of the polymer include cellulose esters. Preferred examples of the cellulose esters include those described in JP-A No. 2000-155216, paragraph [0178]. In order not to inhibit the orientation of the liquid crystal molecules, the amount of the polymer is preferably in the range of 0.1 to 10%, more preferably in the range of 0.1 to 8 weight %, with respect to the liquid crystal molecules.

The discotic nematic liquid crystal phase/solid phase transition temperature of the disk-like liquid crystal molecule is preferably 70 to 300° C., more preferably 70 to 170° C.

Formation of Optically Anisotropic Layer

The optically anisotropic layer can be formed by applying an application solution containing liquid crystal molecules as well as a polymerization initiator described later and arbitrary components as required on the orientation layer.

As the solvent used in the preparation of the application solution, an organic solvent is preferably used. Examples of the organic solvent include amides (for example, N,N-dimethylformamide), sulfoxides (for example, dimethyl sulfoxide), heterocyclic compounds (for example, pyridine), hydrocarbons (for example, benzene, hexane), alkyl halides (for example, chloroform, dichloromethane, tetrachloroethane), esters (for example, methyl acetate, butyl acetate), ketones (for example, acetone, methyl ethyl ketone) and ethers (for example, tetrahydrofuran, 1,2-dimethoxyethane). Alkyl halides and ketones are preferred. It is also possible to use two or more kinds of organic solvents together.

The application solution can be applied by a known method (for example, wire bar coating method, extrusion coating method, direct gravure coating method, reverse gravure coating method, die coating method).

The thickness of the optically anisotropic layer is preferably 0.1 to 20 μm, more preferably 0.5 to 15 μm, most preferably 1 to 10 μm.

Fixation of Oriented State of Liquid Crystal Molecules

The oriented liquid crystal molecules can be fixed with maintaining the oriented state. The fixation is preferably carried out by a polymerization reaction. The polymerization reaction includes a thermal polymerization reaction using a thermal polymerization initiator and a photopolymerization reaction using a photopolymerization initiator. The photopolymerization reaction is preferred.

Examples of the photopolymerization initiator include α-carbonyl compounds (described in U.S. Pat. Nos. 2,367,661 and 2,367,670), acyloin ethers (described in U.S. Pat. No. 2,448,828), α-hydrocarbon-substituted acyloin compounds (described in U.S. Pat. No. 2,722,512), polynuclear quinone compounds (described in U.S. Pat. Nos. 3,046,127 and 2,951,758), combinations of triarylimidazole dimer with p-aminophenyl ketone (described in U.S. Pat. No. 3,549,367), acridine and phenazine compounds (described in JP-A No. S60-105667 and U.S. Pat. No. 4,239,850) and oxadiazol compounds (described in U.S. Pat. No. 4,212,970).

The photopolymerization initiator is preferably used in an amount of 0.01 to 20 weight %, more preferably 0.5 to 5 weight %, based on the solid matter in the application solution.

Light irradiation for polymerizing the liquid crystal molecules is preferably performed by using an ultraviolet ray.

The irradiation energy is preferably in the range of 20 mJ/cm$^2$ to 50 J/cm$^2$, more preferably 20 to 5,000 mJ/cm$^2$, still more preferably 100 to 800 mJ/cm$^2$. For promoting the photopolymerization reaction, the light irradiation may be carried out with heating. Further, a protective layer may be provided on the optically anisotropic layer as required.

It is also preferable to combine this optical compensation film with a polarizing film. Specifically, such an application solution for forming the optically anisotropic layer as described above is applied on a surface of a polarizing plate to form an optically anisotropic layer. As a result, produced is a thin polarizing plate giving only a small stress (distortion×sectional area×elastic modulus) generated in connection with dimensional change of the polarizing film without using any polymer film between the polarizing plate and the optically anisotropic layer. By disposing a polarizing plate according to the present invention in a large-sized liquid crystal display device, images of high display quality can be displayed without causing problems such as light leakage.

The tilt angle between the polarizing film and the optical compensation layer is preferably adjusted by stretching the layers so that the angle should match the angle between the transmission axis of two polarizing plates adhered onto both surfaces of a liquid crystal cell constituting a LCD and the longitudinal or transverse direction of the liquid crystal cell. The tilt angle is generally 45°. However, transmission, reflection and semi-transmission type LCDs in which the angle is not necessarily 45° have recently been developed, and therefore it is preferred that the stretching direction can be arbitrarily adjusted depending on the design of LCD.

(3) Antireflection Film:

The thermoplastic film of the invention is preferably applicable to a hard coat layer, an antiglare layer and an antireflection layer. For the purpose of improving the visibility of LCD, PDP, CRT or EL flat panel displays, any or all of a hard coat layer, an antiglare layer and an antireflection layer may be given to one face or both faces of the thermoplastic film of the invention. In particular, the thermoplastic film of the invention is used as a substrate and an optical compensation layer is provided thereon, thereby constructing the optical compensation film of the invention. Preferred embodiments of such hard coat layers, antiglare layers and antireflection layers are described in detail in Hatsumei Kyokai Disclosure Bulletin (No. 2001-1745, published by the Hatsumei Kyokai on Mar. 15, 2001), pp. 54-57, JP-A 2005-178, paragraphs [0137] to [0167], JP-A 2005-325258, paragraphs [0136] to [0154], JP-A 2006-45500, paragraphs to [0175], JP-A 2006-45501, paragraphs [0095] to [0103]. These production methods are preferred for the film of the invention.

<<Liquid-Crystal Display Device>>

The thermoplastic film, the polarizing plate, the optical compensation film and the antireflection film of the invention may be used in liquid-crystal display devices of various display modes. Liquid-crystal display modes in which these films are usable are described below. Of those modes, the thermoplastic film, the polarizing plate and the optical compensation film of the invention are favorably used in liquid-crystal display devices of TN, STN, VA and IPS modes. These liquid-crystal display devices may be any of transmission-type, reflection-type or semitransmission-type ones.

(TN-Mode Liquid-Crystal Display Device)

A TN-mode liquid-crystal display device is most popularly utilized in color TFT liquid-crystal display devices, and this is described in a large number of references. The orientation state in the liquid-crystal cell at the time of black level of TN-mode displays is as follows: The rod-shaped liquid-crystalline molecules stand up in the center of the cell, and they lie down at around the substrate of the cell. The thermoplastic film of the invention may be used as a support of the retardation plate in the TN-mode liquid-crystal display device having a TN-mode liquid-crystal cell. The TN-mode liquid-crystal cell and the TN-mode liquid-crystal display device are well known from the past. The optical compensatory sheet for use in the TN-mode liquid-crystal display device is described in JP-A 3-9325, 6-148429, 8-50206, 9-26572; and in Mori et al's reports (Jpn. J. Appl. Phys. Vol. 36 (1997), p. 143; Jpn. J. Appl. Phys. Vol. 36 (1997), p. 1068).

(STN-Mode Liquid-Crystal Display Device)

The thermoplastic film of the invention may be used as a support of the retardation plate in an STN-mode liquid-crystal display device having an STN-mode liquid-crystal cell. In general, in an STN-mode liquid-crystal display device, the rod-shaped liquid-crystalline molecules in the liquid-crystal cell are twisted within a range of from 90 to 360 degrees and the product (Δnd) of the refractivity anisotropy (Δn) of the rod-shaped liquid-crystalline molecules and the cell gap (d) is within a range of from 300 to 1500 nm. The optical compensation sheet for use in the STN-mode liquid-crystal display device is described in JP-A 2000-105316.

(OCB-Mode Liquid-Crystal Display Device)

An OCB-mode liquid-crystal display device has a bent-orientation mode liquid-crystal cell in which the rod-shaped liquid-crystalline molecules are aligned substantially in the opposite directions (symmetrically) between the upper part and the lower part of the liquid-crystal cell. The liquid-crystal display device that comprises such a bent-orientation mode liquid-crystal cell is disclosed in U.S. Pat. Nos. 4,583,825 and 5,410,422. In this, since the rod-shaped liquid-crystalline molecules are symmetrically aligned in the upper part and the lower part of the liquid-crystal cell, the bent-orientation mode liquid-crystal cell has a self-optically-compensatory function. Accordingly, the liquid-crystal mode of the type is referred to as an OCB (optically-compensatory bend) liquid-crystal mode.

Regarding the orientation state at the time of black level of display in the OCB-mode liquid-crystal cell, the rod-shaped liquid-crystalline molecules stand up in the center of the cell, and they lie down at around the substrate of the cell, like in the TN-mode liquid-crystal cell.

(VA Mode Liquid Crystal Display Device)

A liquid crystal cell of the VA mode is characterized by substantially longitudinally aligning rod-like liquid crystal molecules when voltage is not applied, and liquid crystal cells of the VA mode include, in addition to (1) a liquid crystal cell of VA mode in a narrow sense in which rod-like liquid crystal molecules are substantially longitudinally aligned when voltage is not applied, and the molecules are essentially horizontally aligned while voltage is applied (described in JP-A No. H2-176625), (2) a liquid crystal cell of MVA mode in which the VA mode is modified to be multi-domain type in order to enlarge the viewing angle (described in SID97, Digest of tech. Papers, 28 (1997), 845), (3) a liquid crystal cell of n-ASM mode in which rod-like liquid crystal molecules are substantially longitudinally aligned while voltage is not applied, and the molecules are essentially oriented in twisted multi-domain orientation while voltage is applied (described in the proceedings of Nippon Ekisho Toronkai (Liquid Crystal Forum of Japan), 58-59 (1998)), and (4) a liquid crystal cell of SURVIVAL mode (published in LCD International '98).

The thermoplastic film of the invention may be used also as the optical compensation plate or as a support of the optical compensation plate in a VA-mode liquid-crystal display device having a VA-mode liquid-crystal cell. The resin film may also be usable especially advantageously for the protective film of a polarizing plate. The VA-mode liquid-crystal display device may be a domain-division system device, for example, as in JP-A 10-123576.

(IPS-Mode Liquid-Crystal Display Device)

This is characterized in that the rod-shaped liquid-crystalline molecules therein are aligned substantially in parallel to each other in the plane under a condition of no voltage application thereto, and that the liquid crystal orientation direction may be changed by switching the condition of the presence or absence of voltage application to the device. Concretely, herein usable are those described in JP-A 2004-365941, 2004-12731, 2004-215620, 2002-221726, 2002-55341, 2003-195333.

The thermoplastic film of the invention may be used also as the optical compensation plate or as a support of the optical compensation plate in a VA-mode liquid-crystal display device having a VA-mode liquid-crystal cell. The resin film may also be usable especially advantageously for the protective film of a polarizing plate. In these modes, the liquid-crystal display material is aligned nearly in parallel to each other at the time of black level of display, and under a condition of no voltage application thereto, the liquid-crystal molecules are aligned in parallel to the substrate face to give black display. In these embodiments, the polarizing plate that comprises the thermoplastic film of the invention contributes to enlarging the viewing angle and to bettering the contrast of the display.

(Reflection-Type Liquid-Crystal Display Device)

The thermoplastic film of the invention may be advantageously used as the retardation plate in TN-mode, STN-mode, HAN-mode or GH (guest-host)-mode reflection-type liquid-crystal display devices. These display modes are well known from the past. TN-mode reflection-type liquid-crystal display devices are described in JP-A 10-123478, WO98/48320, Japanese Patent 3022477. Optical compensation sheets for use in reflection-type liquid-crystal display devices are described in WO00/65384.

(Other Liquid-Crystal Display Devices)

The thermoplastic film of the invention may be advantageously used as a support of the optical compensation film in an ASM (axially symmetrically aligned microcell)-mode liquid-crystal cell-having ASM-mode liquid-crystal display device. The ASM-mode liquid-crystal cell is characterized in that the cell thickness is held by a position-adjustable resin spacer. The other properties of the cell are the same as those of the TN-mode liquid-crystal cell. ASM-mode liquid-crystal cells and ASM-mode liquid-crystal display devices are described in Kume et al's report (Kume et al., *SID 98 Digest* 1089 (1998)).

In addition, technique disclosed in the following publication can be used with the present invention without departing the scope of the gist of the present invention: JP-U No. H3-110418, JP-A No. H5-119216, JP-A No. H5-162261, JP-A No. H5-182518, JP-A No. H5-19115, JP-A No. H5-196819, JP-A No. H5-264811, JP-A No. H5-281411, JP-A No. H5-281417, JP-A No. H5-281537, JP-A No. H5-288921, JP-A No. H5-288923, JP-A No. H5-311119, JP-A No. H5-339395, JP-A No. H5-40204, JP-A No. H5-45512, JP-A No. H6-109922, JP-A No. H6-123805, JP-A No. H6-160626, JP-A No. H6-214107, JP-A No. H6-214108, JP-A No. H6-214109, JP-A No. H6-222209, JP-A No. H6-222353, JP-A No. H6-234175, JP-A No. H6-235810, JP-A No. H6-258520, JP-A No. H6-264030, JP-A No. H6-305270, JP-A No. H6-331826, JP-A No. H6-347641, JP-A No. H6-75110, JP-A No. H6-75111, JP-A No. H6-82779, JP-A No. H6-93133, JP-A No. H7-104126, JP-A No. H7-134212, JP-A No. H7-181322, JP-A No. H7-188383, JP-A No. H7-230086, JP-A No. H7-290652, JP-A No. H7-294903, JP-A No. H7-294904, JP-A No. H7-294905, JP-A No. H7-325219, JP-A No. H7-56014, JP-A No. H7-56017, JP-A No. H7-92321, JP-A No. H8-122525, JP-A No. H8-146220, JP-A No. H8-171016, JP-A No. H8-188661, JP-A No. H8-21999, JP-A No. H8-240712, JP-A No. H8-25575, JP-A No. H8-286179, JP-A No. H8-292322, JP-A No. H8-297211, JP-A No. H8-304624, JP-A No. H8-313881, JP-A No. H8-43812, JP-A No. H8-62419, JP-A No. H8-62422, JP-A No. H8-76112, JP-A No. H8-94834, JP-A No. H9-137143, JP-A No. H9-197127, JP-A No. H9-251110, JP-A No. H9-258023, JP-A No. H9-269413, JP-A No. H9-269414, JP-A No. H9-281483, JP-A No. H9-288212, JP-A No. H9-288213, JP-A No. H9-292525, JP-A No. H9-292526, JP-A No. H9-294959, JP-A No. H9-318817, JP-A No. H9-80233, JP-A No. H10-10320, JP-A No. H10-104428, JP-A No. H10-111403, JP-A No. H10-111507, JP-A No. H10-123302, JP-A No. H10-123322, JP-A No. H10-123323, JP-A No. H10-176118, JP-A No. H10-186133, JP-A No. H10-264322, JP-A No. H10-268133, JP-A No. H10-268134, JP-A No. H10-319408, JP-A No. H10-332933, JP-A No. H10-39137, JP-A No. H10-39140, JP-A No. H10-68821, JP-A No. H10-68824, JP-A No. H10-90517, JP-A No. H11-116903, JP-A No. H11-181131, JP-A No. H11-211901, JP-A No. H11-211914, JP-A No. H11-242119, JP-A No. H11-246693, JP-A No. H11-246694, JP-A No. H11-256117, JP-A No. H11-258425, JP-A No. H11-263861, JP-A No. H11-287902, JP-A No. H11-295525, JP-A No. H11-295527, JP-A No. H11-302423, JP-A No. H11-309830, JP-A No. H11-323552, JP-A No. H11-335641, JP-A No. H11-344700, JP-A No. H11-349947, JP-A No. H11-95011, JP-A No. H11-95030, JP-A No. H11-95208, JP-A No. 2000-109780, JP-A No. 2000-110070, JP-A No. 2000-119657, JP-A No. 2000-141556, JP-A No. 2000-147208, JP-A No. 2000-17099, JP-A No. 2000-171603, JP-A No. 2000-171618, JP-A No. 2000-180615, JP-A No. 2000-187, JP-A No. 2000-187, JP-A No. 2000-191819, JP-A No. 2000-191821, JP-A No. 2000-193804, JP-A No. 2000-204189, JP-A No. 2000-206306, JP-A No. 2000-214323, JP-A No. 2000-214329, JP-A No. 2000-230159, JP-A No. 2000-235107, JP-A No. 2000-241626, JP-A No. 2000-250038, JP-A No. 2000-267095, JP-A No. 2000-284122, JP-A No. 2000-304927, JP-A No. 2000-304928, JP-A No. 2000-304929, JP-A No. 2000-309195, JP-A No. 2000-309196, JP-A No. 2000-309198, JP-A No. 2000-309642, JP-A No. 2000-310704, JP-A No. 2000-310708, JP-A No. 2000-310709, JP-A No. 2000-310710, JP-A No. 2000-310711, JP-A No. 2000-310712, JP-A No. 2000-310713, JP-A No. 2000-310714, JP-A No. 2000-310715, JP-A No. 2000-310716, JP-A No. 2000-310717, JP-A No. 2000-321560, JP-A No. 2000-321567, JP-A No. 2000-338309, JP-A No. 2000-338329, JP-A No. 2000-344905, JP-A No. 2000-347016, JP-A No. 2000-347017, JP-A No. 2000-347026, JP-A No. 2000-347027, JP-A No. 2000-347029, JP-A No. 2000-347030, JP-A No. 2000-347031, JP-A No. 2000-347032, JP-A No. 2000-347033, JP-A No. 2000-347034, JP-A No. 2000-347035, JP-A No. 2000-347037, JP-A No. 2000-347038, JP-A No. 2000-86989, JP-A No. 2000-98392, JP-A No. 2001-100012, JP-A No. 2001-108805, JP-A No. 2001-108806, JP-A No. 2001-133627, JP-A No. 2001-133628, JP-A No. 2001-142062, JP-A No. 2001-142072, JP-A No. 2001-174630, JP-A No. 2001-174634, JP-A No. 2001-174637, JP-A No. 2001-179902, JP-A No. 2001-183526, JP-A No. 2001-188, JP-A No. 2001-188, JP-A No. 2001-188, JP-A No. 2001-188225, JP-A No. 2001-188231, JP-A No. 2001-194505, JP-A No. 2001-228311, JP-A No. 2001-228333, JP-A No. 2001-242461, JP-A No. 2001-242546, JP-A No. 2001-247834, JP-A No. 2001-26061, JP-A No. 2001-264517, JP-A No. 2001-272535, JP-A No. 2001-278924, JP-A No. 2001-2797, JP-A No. 2001-287308, JP-A No. 2001-305345, JP-A No. 2001-311827, JP-A No. 2001-350005, JP-A No. 2001-356207, JP-A No. 2001-356213, JP-A No. 2001-42122, JP-A No. 2001-42323, JP-A No. 2001-42325, JP-A No. 2001-4819, JP-A No. 2001-4829, JP-A No. 2001-4830, JP-A No. 2001-4831, JP-A No. 2001-4832, JP-A No. 2001-4834, JP-A No. 2001-4835, JP-A No. 2001-4836, JP-A No. 2001-4838, JP-A No. 2001-4839, JP-A No. 2001-51118, JP-A No. 2001-51119, JP-A No. 2001-51120, JP-A No. 2001-51273, JP-A No. 2001-51274, JP-A No. 2001-55573, JP-A No. 2001-66431, JP-A No. 2001-66597, JP-A No. 2001-74920, JP-A No. 2001-81469, JP-A No. 2001-83329, JP-A No. 2001-83515, JP-A No. 2002-162628, JP-A No. 2002-169024, JP-A No. 2002-189421, JP-A No. 2002-201367, JP-A No. 2002-20410, JP-A No. 2002-258046, JP-A No. 2002-275391, JP-A No. 2002-294174, JP-A No. 2002-311214, JP-A No. 2002-311246, JP-A No. 2002-328233, JP-A No. 2002-338703, JP-A No. 2002-363266, JP-A No. 2002-365164, JP-A No. 2002-370303, JP-A No. 2002-40209, JP-A No. 2002-48917, JP-A No. 2002-6109, JP-A No. 2002-71950, JP-A No. 2003-105540, JP-A No. 2003-114331, JP-A No. 2003-131036, JP-A No. 2003-139952, JP-A No. 2003-172819, JP-A No. 2003-35819, JP-A No. 2003-43252, JP-A No. 2003-50318, JP-A No. 2003-96066, JP-A No. 2006-45501, JP-A No. 2006-45502, JP-A No. 2006-45499, JP-A No. 2006-45500, JP-A No. 2006-182008, JP-A No. 2006-241433, JP-A No. 2006-348123, JP-A No. 2005-325258, JP-A No. 2006-2026, JP-A No. 2006-2025, JP-A No. 2006-183005, JP-A No. 2006-183004, JP-A No. 2006-143873, JP-A No. 2006-257204, JP-A No. 2006-205472, JP-A No. 2006-241428, JP-A No. 2006-251746, JP-A No. 2007-1198, JP-A No. 2007-1238, WO2005/103122, JP-A No. 2006-176736, JP-A No. 2006-243688, JP-A No. 2006-327105, JP-A No. 2006-124642, JP-A No. 2006-205708, JP-A No. 2006-341443, JP-A No. 2006-199913, JP-A No. 2006-335050, JP-A No. 2007-8154, JP-A No. 2006-334840, JP-A No. 2006-341450, JP-A No. 2006-327162, JP-A No. 2006-341510, JP-A No. 2006-327161, JP-A No. 2006-327107, JP-A No. 2006-327160, JP-A No. 2006-328316, JP-A No. 2006-334839, JP-A No. 2007-8151, JP-A No. 2007-1286, JP-A No. 2006-327106, JP-A No. 2006-334841, JP-A No. 2006-334842, JP-A No. 2005-330411, JP-A No. 2006-116945, JP-A No. 2005-301225, JP-A No. 2007-1287, JP-A No. 2006-348268, WO2006/132367, WO2006/132367, JP-A No. 2005-178, JP-A No. 2006-336004, JP-A No. 2006-249418, JP-A No. 2007-2216, JP-A No. 2006-28345, JP-A No. 2006-215535, JP-A No. 2006-28387, JP-A No. 2007-2215, JP-A No. 2006-343479, JP-A No. 2006-263992, JP-A No. 2000-352620, JP-A No. 2005-088578, JP-A No. 2005-300978, JP-A No. 2005-342929, JP-A No. 2006-021459, JP-A No. 2006-030425, JP-A No. 2006-036840, JP-A No. 2006-045306, JP-A No. 2006-045307, JP-A No. 2006-058825, JP-A No. 2006-063169, JP-A No. 2006-77067, JP-A No. 2006-77113, JP-A No. 2006-82261, JP-A No. 2006-91035, JP-A No. 2006-91078, JP-A No. 2006-104374, JP-A No. 2006-106247, JP-A No. 2006-111796, JP-A No. 2006-111797, JP-A No. 2006-113, JP-A No. 2006-113551, JP-A No. 2006-

113567, JP-A No. 2006-116904, JP-A No. 2006-117714, JP-A No. 2006-119, JP-A No. 2006-119, JP-A No. 2006-123513, JP-A No. 2006-123, JP-A No. 2006-124629, JP-A No. 2006-137821, JP-A No. 2006-142800, JP-A No. 2006-163033, JP-A No. 2006-163034, JP-A No. 2006-171404, JP-A No. 2006-178020, JP-A No. 2006-182020, JP-A No. 2006-182865, JP-A No. 2006-188663, JP-A No. 2006-195407, JP-A No. 2006-208934, JP-A No. 2006-219615, JP-A No. 2006-220814, JP-A No. 2006-224589, JP-A No. 2006-249221, JP-A No. 2006-256082, JP-A No. 2006-272616, JP-A No. 2006-290929, JP-A No. 2006-293201, JP-A No. 2006-301500, JP-A No. 2006-301592.

<<Measurement Methods and Assessment Methods>>

Measurement methods and assessment methods for thermoplastic resins, thermoplastic films and structures comprising them are described below. The data in this description are determined according to the methods described below. Briefly, the physical properties of the films of the invention are measured as follows: The film formed is sampled at typical five points in the longitudinal direction thereof, at the position of 5 m of the film just formed, at the position of ¼ of the overall length of the film, at the position of ½ of the overall length of the film, at the position of ¾ of the overall length of the film, and at the position of 5 m before the winding site of the film, each having the necessary sample size for the measurement of the physical properties thereof mentioned below; and every sample is analyzed for the physical properties thereof mentioned below.

(1) Thickness, and Thickness Fluctuation:

(1-1) Thickness Fluctuation:

At the above-mentioned five positions, samples each having a width of 35 mm and a length of 1 m are cut out at three points in the transverse direction thereof, the center and both edges at the position of 35% of the overall width from both edges thereof; and these are tested using a continuous thickness gauge (Anritsu Electric's Electronic Micrometer) at 600 mm/min. The data of every point are averaged, and the resulting mean value indicates the thickness of the film in the longitudinal direction, the MD thickness. At the above-mentioned five positions, samples are cut out in the transverse direction thereof, each having a width of 35 mm and a full-width length; and these are tested using a continuous thickness gauge (Anritsu Electric's Electronic Micrometer) at 600 mm/min. The data of every point are averaged, and the resulting mean value indicates the thickness of the film in the transverse direction, the TD thickness.

In the following Examples, the above-obtained MD and TD thickness data are arithmetically averaged, and the resulting mean value indicates the film thickness.

(1-2) Thickness Fluctuation in Longitudinal Direction (MD):

The film to be tested (having a width of 35 mm and a length of 1 m) is sampled at three points in the transverse direction thereof, the center and both edges at the position of 35% of the overall width from both edges thereof; and these are tested using a continuous thickness gauge (Anritsu Electric's Electronic Micrometer) at 600 mm/min. The difference between the maximum point and the minimum point indicates the MD-thickness fluctuation.

(1-3) Thickness Fluctuation in Transverse Direction (TD):

The film to be tested is sampled in the transverse direction thereof, having a width of 35 mm and a full-width length; and the samples are tested using a continuous thickness gauge (Anritsu Electric's Electronic Micrometer) at 600 mm/min. The difference between the maximum point and the minimum point indicates the TD-thickness fluctuation.

(2) Surface Roughness Ra:

The film to be tested is sampled in the transverse direction (TD) and in the longitudinal direction (MD); and using a three-dimensional surface roughness meter, Kosaka Laboratory's SEF-3500, the samples are tested to measure the center line average roughness Ra according to JIS B0601-1982. The data at 10 points are averaged, and the resulting mean value indicates Ra of the tested film. Both the front surface and the back surface of the film are tested for the surface roughness thereof in the manner as above, and the ratio of the surface roughness Ra of the two surfaces is obtained.

The test condition is as follows:
Diameter of the probe tip: 2 μm
Probe load: 0.07 g
Probe speed: 20 μm/min
Sample length: 100 mm (2) Residual Solvent A solution was prepared in which 300 mg of a sample film was dissolved in 30 ml of methyl acetate (Sample A). Another solution was prepared in which 300 mg of a sample film was dissolved in 30 ml of dichloromethane (Sample B). After that, these samples were measured by gas chromatography (GC) under the following conditions.

Column: DB-WAX (0.25 mmØ×30 m, 0.25 μm of thickness)
Column temperature: 50° C.
Carrier gas: nitrogen
Analysis time: 15 minutes
Sample injection amount: 1 μml The solvent amount was determined in the following manner.

Content ratios were determined using the calibration curve for each of the peaks in Sample A, except for that of the solvent (methyl acetate), and the aggregate was taken as Sa. In Sample B, the content ratio for each of the peaks in the region hidden by the solvent peak in Sample A was determined using calibration curves, and the aggregate was taken as Sb. The sum of Sa and Sb was taken as the residual solvent amount.

(3) Measurement Method for Re and Rth:

(3-1) Measurement of Re and Rth:

In this description, Re and Rth (unit; nm) are determined according to the method mentioned below. The film to be tested is conditioned at 25° C. and a relative humidity of 60% for 24 hours. Then, using a prism coupler (MODEL 2010 Prism Coupler, by Metricon), the mean refractive index (n) represented by the following formula (a) of the sample is measured with a solid laser at 532 nm, at 25° C. and a relative humidity of 60%.

$$n=(n_{TE}\times 2+n_{TM})/3 \qquad (a)$$

[wherein $n_{TE}$ is a refractive index of the film measured with a polarized light in the plane direction of the film; $n_{TM}$ is a refractive index of the film measured with a polarized film in the normal direction of the film plane].

Re (λ) and Rth(λ) indicate the in-plane retardation and the thickness direction retardation of the film at a wavelength λ. Re(λ) is measured by applying a light having a wavelength of λ nm in the normal direction of the film, using KOBRA-21ADH or WR (by Oji Scientific Instruments).

When the film tested is represented by a monoaxial or biaxial index ellipsoid, then its Rth(λ) is computed according to the method mentioned below.

With the in-plane slow axis (judged by KOBRA 21ADH or WR) taken as the inclination axis (rotation axis) of the film (in case where the film has no slow axis, the rotation axis of the film may be in any in-plane direction of the film), Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is computed with KOBRA 21ADH or WR.

In this description, Re and Rth with no specific indication of λ mean the data of Re and Rth measured with a light having a wavelength of 590 nm. With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be computed according to the following formulae (b) and (c):

(b):

$$Re(\theta) = \left| nx - \frac{ny \times nz}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}} \right| \times \frac{d}{\cos\left\{\sin^{-1}\left(\frac{\sin(-\theta)}{nx}\right)\right\}}$$

[wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny].

$$Rth = ((nx + ny)/2 - nz) \times d. \quad (c)$$

When the film to be tested could not be represented by a monoaxial or biaxial index ellipsoid, or that is, when the film does not have an optical axis, then its Rth(λ) may be computed according to the method mentioned below.

With the in-plane slow axis (judged by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is computed with KOBRA 21ADH or WR.

The mean refractive index and the film thickness are inputted therein, nx, ny and nz are computed with KOBRA 21ADH or WR. From the thus-computed data of nx, ny and nz, Nz=(nx−nz)/(nx−ny) is further computed.

(3-2) Humidity-Dependent Re and Rth Fluctuation:

The sample film to be tested is conditioned at a temperature of 25° C. and a humidity of 10% RH, and at a temperature of 25° C. and a humidity of 80% RH, for at least 3 hours; and then, at 25° C. and 10% RH and at 25° C. and 80% RH, Re and Rth of the film are measured in the same manner as above. From the thus-measured data, obtained are the difference of |Re(10%)'Re(80%)|, and the difference of |Rth(10%)−Rth(80%)|.

(3-3) Re and Rth Fluctuation in Transverse Direction and Longitudinal Direction:

The film to be tested is sampled in the longitudinal direction at intervals of 0.5 m, giving 50 samples of 1 cm×1 cm each. On the other hand, the film is sampled in the overall transverse direction at regular intervals, giving 50 samples of 1 cm×1 cm each. The difference between the maximum value and the minimum value of these 100 MD samples and 50 TD samples is divided by the mean value of the data, and it is expressed as percentage. This indicates the Re and Rth fluctuation of the film.

(4) Degree of Substitution of Cellulose Acylate:

The degree of substitution with acyl group is determined according to a method of ASTM D-817-91, or a method where the cellulose acylate to be analyzed is completely hydrolyzed and the resulting free carboxylic acid or its salt is quantitatively determined through gas chromatography or high-performance liquid chromatography, or a method of $^1$H-NMR or $^{13}$C-NMR, either singly or as combined.

(5) Number-Average Molecular Weight (Mn) and Weight-Average Molecular Weight (Mw) of Cellulose Acylate:

The resin to be tested is dissolved in THF to prepare a 0.5 mass % sample solution thereof. This is analyzed through GPC under the condition mentioned below to determine its weight-average molecular weight (Mw) and number-average molecular weight (Mn). The analytical curve is prepared, using polystyrene (TSK standard polystyrene: molecular weight 1050, 5970, 18100, 37900, 190000, 706000). The value obtained by dividing the data of Mw and Mn, by the molecular weight/segment obtained from the degree of substitution determined according to the above-mentioned method is DPw and DPn, respectively.

Column: TSK GEL Super HZ4000, TSK GEL Super HZ2000, TSK GEL Super HZM-M, TSK Guard Column Super HZ-L,
Column temperature: 40° C.,
Eluent: THF,
Flow rate: 1 ml/min,
Detector: RI.

(6) Tg of Cellulose Acylate:

10 to 20 mg of cellulose acylate pellets to be tested are weighed and put into a sample pan. Using DSC (differential scanning calorimeter), this is heated from 30° C. up to 250° C. at 10° C./min in a nitrogen atmosphere, and then cooled to 30° C. at −10° C./min. Next, this is again heated from 30° C. up to 250° C. at 10° C./min, and the temperature at which the base line begins to shift from the low temperature side is Tg of the sample.

(7) Melt Viscosity η:

Using a plate rheometer, (for example, Physica's MCR301 Model), the melt viscosity of cellulose acylate pellets is determined according to the condition mentioned below.
Temperature: 240° C.,
Plates: 25 mmφ parallel plates,
Gap: 1 mm,
Shear rate: 1 sec$^{-1}$.

(8) Haze:

This is determined, using a haze meter, Nippon Denshoku Kogyo's NDH-1001DP.

(9) Die Streaks:

The cellulose acylate film to be tested is visually checked for die streaks appearing thereon, at typical five points in the longitudinal direction thereof, at the position of 5 m of the film just formed, at the position of ¼ of the overall length of the film, at the position of ½ of the overall length of the film, at the position of ¾ of the overall length of the film, and at the position of 5 m before the winding site of the film, and is assessed for its total appearance. The assessment standard is as follows:
- A: No die streaks found.
- B: A few but slight die streaks found.
- C: Some obvious die streaks found.
- D: Many die streaks found in the entire surface.

(10) Lateral Unevenness:

The cellulose acylate film to be tested is visually checked for lateral unevenness appearing like transverse streaks thereon in the direction vertical to the longitudinal direction (transverse direction), at typical five points in the longitudinal direction thereof, at the position of 5 m of the film just formed, at the position of ¼ of the overall length of the film, at the position of ½ of the overall length of the film, at the position of ¾ of the overall length of the film, and at the position of 5 m before the winding site of the film, and is assessed for its total appearance. The assessment standard is as follows:
- A: No lateral unevenness found.
- B: A little but slight lateral unevenness found.
- C: Some obvious lateral unevenness found.
- D: Much lateral unevenness found.

(11) Test for Impurities:

The cellulose acylate film to be tested is exposed to reflected light at typical five points in the longitudinal direction thereof, at the position of 5m of the film just formed, at the position of ¼ of the overall length of the film, at the position of ½ of the overall length of the film, at the position of ¾ of the overall length of the film, and at the position of 5 m before the winding site of the film. At those positions, the area exposed to light is the overall width×1 m; and the film is visually checked for impurities appearing therein. Then, using a polarizing microscope, the samples are further checked for the impurities (fish eye, lint), and assessed for their average condition. When some abnormality is found with a surface tester, then the site is again visually checked, and the sample is then totally assessed. The assessment standard is as follows:
- A: No impurities found.
- B: A few but slight impurities found.
- C: Some obvious impurities found.
- D: Many impurities found in the entire surface.

(12) Contact Length Q:

The contact length Q is measured as follows: A cylinder pressure is previously applied for 30 seconds between the elastic roll or the metal belt and the casting roll for cooling to be used, via a pre-scale (for middle pressure, by Fuji Film) therebetween, and then the cylinder pressure is removed whereupon the coloring width of the pre-scale is measured. This is the contact length Q. By varying the cylinder pressure, the contact length Q necessary for film formation may be controlled.

(13) Center Angle θ:

Using the contact length Q determined in the above and the diameter R of the metallic casting roll for cooling, the contact angle θ to the casting roll for cooling is computed according to the following formula:

Center Angleθ=contact length $Q\times(360/\pi R)$ (unit: °)

EXAMPLES

The characteristics of the invention are described more concretely with reference to the following Examples and Comparative Examples. In the following Examples, the material used, its amount and ratio, the details of the treatment and the treatment process may be suitably modified or changed not overstepping the sprit and the scope of the invention. Accordingly, the scope of the invention should not be limitatively interpreted by the following Examples.

Production Example 1

Production of Cellulose Acetate Propionate (CAP1):

80 parts by mass of cellulose (linter) and 33 parts by mass of acetic acid were put into a reactor equipped with a stirrer and a condenser, and processed at 60° C. for 4 hours to activate the cellulose. 33 parts by mass of acetic anhydride, 518 parts by mass of propionic acid, 536 parts by mass of propionic anhydride and 4 parts by mass of sulfuric acid were mixed and cooled to −20° C., and added to the reactor.

This was esterified at a maximum reaction temperature of 35° C., and the time at which the viscosity of the reaction liquid reached 840 cP (0.84 Pa·s) was the end point of the reaction. The system was so controlled that the temperature of the reaction mixture at the end point could be 15° C. A mixture of 133 parts by mass of water and 133 parts by mass of acetic acid was cooled to −5° C. to prepare a reaction stopper, and this was added to the reactor so that the temperature of the reaction mixture could not exceed 23° C.

Kept at 60° C., the reaction mixture was stirred for 2 hours for partial hydrolysis. The reaction liquid was filtered under pressure through metal sintered filters having a retentive particle size of 40 μm, 10 μm and 3 μm in that order, thereby removing the impurities. This was mixed with aqueous acetic acid solution to re-precipitate the produced polymer compound, which was then repeatedly washed with hot water at 70 to 80° C. After dewatered, this was dipped in an aqueous 0.001 mass % calcium hydroxide solution, stirred for 30 minutes and then again dewatered. This was dried at 70° C. to obtain cellulose acetate propionate.

The obtained cellulose acetate propionate had a degree of acetyl substitution of 0.42, a degree of propionyl substitution of 2.40 and a total degree of acyl substitution of 2.82, and having a number-average molecular weight of 50200 (number-average degree of polymerization DPn=159), a weight-average molecular weight of 125900 (weight-average degree of polymerization DPw=398), a residual sulfate content of 85 ppm, a sodium content of 1 ppm, a magnesium content of 2 ppm, and a calcium content of 39 ppm. A dichloromethane solution of this sample was cast into a film, and the film was observed with a polarizing microscope. As a result, little insoluble matter was found. The melt viscosity of this sample at 240° C. was 675 Pa·s.

Production Example 2

Production of Cellulose Acetate Butyrate (CAB1):

200 parts by mass of cellulose (wood pulp) and 100 parts by mass of acetic acid were put into a reactor equipped with a stirrer and a condenser, and processed at 60° C. for 4 hours to activate the cellulose. 161 parts by mass of acetic acid, 449 parts by mass of acetic anhydride, 742 parts by mass of butyric acid, 1349 parts by mass of butyric anhydride and 14 parts by mass of sulfuric acid were mixed and cooled to −20° C., and added to the reactor.

This was esterified at a maximum reaction temperature of 30° C., and the time at which the viscosity of the reaction liquid reached 1050 cP (1.05 Pa·s) was the end point of the reaction. The system was so controlled that the temperature of the reaction mixture at the end point could be 10° C. A mixture of 297 parts by mass of water and 558 parts by mass of acetic acid was cooled to −5° C. to prepare a reaction stopper, and this was added to the reactor so that the temperature of the reaction mixture could not exceed 23° C.

Kept at 60° C., the reaction mixture was stirred for 2 hours and 30 minutes for partial hydrolysis. The reaction liquid was filtered under pressure through metal sintered filters having a retentive particle size of 40 µm, 10 µm and 3 µm in that order, thereby removing the impurities. This was mixed with aqueous acetic acid solution to re-precipitate the produced polymer compound, which was then repeatedly washed with hot water at 70 to 80° C. After dewatered, this was dipped in an aqueous 0.002 mass % calcium hydroxide solution, stirred for 30 minutes and then again dewatered. This was dried at 70° C. to obtain cellulose acetate butyrate.

The obtained cellulose acetate butyrate had a degree of acetyl substitution of 1.51, a degree of butyryl substitution of 1.19 and a total degree of acyl substitution of 2.70, and having a number-average molecular weight of 55600 (number-average degree of polymerization DPn=181), a weight-average molecular weight of 139000 (weight-average degree of polymerization DPw=451), a residual sulfate content of 122 ppm, a sodium content of 1 ppm, a magnesium content of 3 ppm, and a calcium content of 53 ppm. A dichloromethane solution of this sample was cast into a film, and the film was observed with a polarizing microscope. As a result, little insoluble matter was found. The melt viscosity of this sample at 240° C. was 815 Pa·s.

Example 1

Formation of Unstretched Thermoplastic Film 1:
(1) Additives to Cellulose Acylate:
The following additive composition was used as in Table 1 below. The amount of each additive is in terms of part by mass of the additive relative to 100 parts by mass of the resin to which it is added.

(3) Pelletization of Cellulose Acylate:
CAP1 obtained in the above Production Example 1 was stirred and mixed with the additives shown in Table 1 below, in a Henschel mixer (by Mitsui-Miike Machinery), and dried at 100° C. to have a water content of at most 0.1% by mass. The uniform resin mixture was pelletized, using the extruder mentioned below (filled with nitrogen during the entire process with it). Concretely, the cellulose acylate mixture was put into the hopper of the double-screw kneading extruder, then kneaded and melted therein at 180 to 220° C. and at a screw revolution of 300 rpm for a residence time of 40 seconds, then led to pass through a filter zone comprising a metal filter having a mean pore size of 30 µm and a metal filter having a mean pore size of 20 µm connected to the former, and thereafter extruded out into hot water at 85° C. to give strands, which were then cut into columnar pellets having a diameter of 3 mm and a length of 5 mm.

(4) Film Formation of Cellulose Acylate:
The resin pellets were dried with dry air at 90° C. to have a water content of at most 0.1% by mass, and then melt-cast into a film, using a single-screw extruder with a fullflight screw inserted thereinto and having L/D=35, a compression ratio of 3.5 and a screw diameter of 65 mm. Concretely, the pellets were put into the hopper which was so controlled that the film formation temperature could be 107° C., then melted in the extruder at a melting temperature on the upstream side of 195° C., at a melting temperature on the middle zone of 230° C. and at a melting temperature on the downstream side of 235° C., and thereafter a predetermined amount of the resulting melt was fed out with a gear pump for the purpose of

| Composition 1 | |
|---|---|
| Stabilizer: Sumilizer GP (by Sumitomo Chemical) | 0.2 parts by mass |
| Stabilizer: Adekastab AO-80 (by Asahi Denka Kogyo) | 0.15 parts by mass |
| Stabilizer: Adekastab 2112 (by Asahi Denka Kogyo) | 0.15 parts by mass |
| UV absorbent: Adekastab LA-31 (by Asahi Denka Kogyo) | 1.1 parts by mass |
| Fine particles: silica particles having a mean primary particle size of 1.2 µm (the proportion by mass of 0.9 to 1.5 µm particles is at least 95%; and that of larger particles than 1.5 µm particles is at most 1.0%) | 0.05 parts by mass |
| Composition 2 | |
| Stabilizer: Adekastab AO-60 (by Asahi Denka Kogyo) | 0.2 parts by mass |
| Stabilizer: Adekastab PEP36 (by Asahi Denka Kogyo) | 0.2 parts by mass |
| Stabilizer: Adekastab O-180A (by Asahi Denka Kogyo) | 1 part by mass |
| UV absorbent: Adekastab LA-31 (by Asahi Denka Kogyo) | 1.1 parts by mass |
| Fine particles: silica particles having a mean primary particle size of 1.2 µm (the proportion by mass of 0.9 to 1.5 µm particles is at least 95%; and that of larger particles than 1.5 µm particles is at most 1.0%) | 0.05 parts by mass |
| Composition 3 | |
| Stabilizer: Sumilizer GP (by Sumitomo Chemical) | 0.15 parts by mass |
| Stabilizer: Adekastab AO-60 (by Asahi Denka Kogyo) | 0.1 parts by mass |
| Stabilizer: Adekastab PEP36 (by Asahi Denka Kogyo) | 0.1 parts by mass |
| Plasticizer: Adekastab FP-700 (by Asahi Denka Kogyo) | 4 parts by mass |
| UV absorbent: Adekastab LA-31 (by Asahi Denka Kogyo) | 1.1 parts by mass |
| Fine particles: silica particles having a mean primary particle size of 1.2 µm (the proportion by mass of 0.9 to 1.5 µm particles is at least 95%; and that of larger particles than 1.5 µm particles is at most 1.0%) | 0.05 parts by mass |
| Composition 4 | |
| Stabilizer: Sumilizer GP (by Sumitomo Chemical) | 0.30 parts by mass |
| UV absorbent: Adekastab LA-31 (by Asahi Denka Kogyo) | 1.0 part by mass |
| Fine particles: silica particles having a mean primary particle size of 1.2 µm (the proportion by mass of 0.9 to 1.5 µm particles is at least 95%; and that of larger particles than 1.5 µm particles is at most 1.0%) | 0.05 parts by mass | increasing the thickness accuracy of the film to be formed. The polymer melt thus fed out via the gear pump was then filtered through a leaf disc filter having a filtration accuracy of 5 μm for removing impurities, and then fed out through a hanger coat die at 230° C. having a slit clearance of 0.8 mm via a static mixer, and formed into a film according to the casting film formation condition shown in Table 1. The solidified sheet was wound up into a roll. The metallic casting roll for cooling used was a metallic roll having a diameter of 500 mm, a wall thickness of 25 mm and a surface roughness Ra of 20 nm. The metallic elastic touch roll used had a diameter of 300 mm and its thin metallic outer coat had a thickness of 3 mm; and using it, the film was formed under a touch linear pressure was 10 kg/cm. The temperature of the filmy melt just before the touch roll was measured with a radiation thermometer. Just before wound up, the film was trimmed at both edges (each by 3% of the overall width), and then knurled at both edges each by a width of 10 mm to a height of 50 μm. On every level, the film formed was wound up, having a width of 1.5 m and at a speed of 30 m/min for a length of 3000m. Films of Samples No. 1-1 to No. 1-16 were thus produced.

In place of the metallic casting roll for cooling and the metallic elastic touch roll used in forming Samples No. 1-1 to No. 1-16, a metallic casting roll for cooling having a diameter of 300 mm, a wall thickness of 20 mm and a surface roughness Ra of 20 nm, and a metallic elastic touch roll having a diameter of 180 mm and a thin wall metallic outer coat thickness of 2.5 mm were used, and films of Samples No. 1-17 to No. 1-18 were formed in the same manner as above.

(Assessment)

The obtained films were tested and assessed for the thickness, the thickness fluctuation in the transverse direction and the longitudinal direction, the surface roughness Ra of both surfaces, the surface roughness ratio of both surfaces, Re and Rth, humidity-dependent Re and Rth fluctuation, die streaks, and lateral unevenness, and the results are given in Table 1 below.

TABLE 1

| Sample No. | Remarks | Types of Additives | Tg (° C.) | Temperature just before holding (° C.) | Touch System | Elastic Touch roll Surface Material | Surface Roughness (Ra) of Elastic Touch rotor (nm) | Temperature of Touch roll (Tt) (° C.) | Temperature of Metallic cooling roll (T1) (° C.) | Contract Length of Touch roll (Q) (cm) | Center angle of Touch roll (θ) (°) |
|---|---|---|---|---|---|---|---|---|---|---|---|
| 1-1 | Example | Composition 1 | 135 | 190 | Elastic roll | Metal | 20 | 125 | 130 | 0.4 | 0.9 |
| 1-2 | Example | Composition 1 | 135 | 190 | Elastic roll | Metal | 20 | 129.5 | 130 | 0.4 | 0.9 |
| 1-3 | Example | Composition 1 | 135 | 190 | Elastic roll | Metal | 20 | 110 | 130 | 0.4 | 0.9 |
| 1-4 | Comparative Example | Composition 1 | 135 | 190 | Elastic roll | Metal | 20 | 130 | 130 | 0.4 | 0.9 |
| 1-5 | Comparative Example | Composition 1 | 135 | 190 | Elastic roll | Metal | 20 | 108 | 130 | 0.4 | 0.9 |
| 1-6 | Example | Composition 1 | 135 | 190 | Elastic roll | Metal | 100 | 125 | 130 | 0.4 | 0.9 |
| 1-7 | Example | Composition 1 | 135 | 190 | Elastic roll | Metal | 20 | 125 | 130 | 0.1 | 0.2 |
| 1-8 | Example | Composition 1 | 135 | 190 | Elastic roll | Metal | 20 | 125 | 130 | 8.0 | 18.3 |
| 1-9 | Comparative Example | Composition 1 | 135 | 190 | Elastic roll | Metal | 20 | 125 | 130 | 0.05 | 0.1 |
| 1-10 | Comparative Example | Composition 1 | 135 | 190 | Elastic roll | Metal | 20 | 125 | 130 | 8.5 | 19.5 |
| 1-11 | Example | Composition 1 | 135 | 210 | Elastic roll | Metal | 40 | 130 | 135 | 0.7 | 1.6 |
| 1-12 | Comparative Example | Composition 1 | 135 | 230 | Elastic roll | Metal | 40 | 130 | 135 | 0.7 | 1.6 |
| 1-13 | Example | Composition 1 | 135 | 155 | Elastic roll | Metal | 20 | 125 | 130 | 0.3 | 0.7 |
| 1-14 | Comparative Example | Composition 1 | 135 | 150 | Elastic roll | Metal | 20 | 125 | 130 | 0.3 | 0.7 |
| 1-15 | Comparative Example | Composition 1 | 135 | 155 | Elastic roll | Rubber | 20 | 125 | 130 | 0.3 | 0.7 |
| 1-16 | Comparative Example | Composition 1 | 135 | 150 | | Unused | | | 130 | / | 0 |
| 1-17 | Example | Composition 1 | 135 | 190 | Elastic roll | Metal | 20 | 125 | 130 | 5.3 | 20.2 |
| 1-18 | Example | Composition 1 | 135 | 190 | Elastic roll | Metal | 20 | 125 | 130 | 7.9 | 30.2 |
| 1-19 | Comparative Example | Composition 1 | 135 | 190 | Elastic roll | Metal | 20 | 125 | 130 | 8.2 | 31.3 |

| Sample No. | Thickness (μm) | TD-thickness fluctuation (μm) | MD-thickness fluctuation (μm) | Surface Roughness (Ra) (nm) | The ratio of one Surface Roughness to the other | Re (nm) | Rth (nm) | \| Re(10%)-Re(80%) \| (nm) | \| Rth(10%)-Rth(80%) \| (nm) | Die Streak | Lateral unevenness | LCD Visibility |
|---|---|---|---|---|---|---|---|---|---|---|---|---|
| 1-1 | 80 | 0.5 | 0.8 | 100 | 1.0 | 0 | 3 | 1.3 | 4.1 | A | A | A |
| 1-2 | 80 | 1.5 | 1.3 | 138 | 0.8 | 0 | 5 | 1.5 | 5.5 | A | A | A |
| 1-3 | 80 | 2.1 | 1.8 | 158 | 1.2 | 1 | 7 | 2.0 | 7.5 | B | A | B |
| 1-4 | 80 | 3.2 | 2.1 | 300 | 0.5 | 2 | 10 | 2.5 | 7.9 | B | C | C |
| 1-5 | 80 | 2.7 | 3.5 | 350 | 0.3 | 4 | 9 | 3.1 | 6.2 | C | B | C |
| 1-6 | 80 | 1.4 | 3.0 | 200 | 0.8 | 3 | 8 | 3.2 | 7.7 | A | B | B |
| 1-7 | 80 | 3.0 | 0.7 | 80 | 1.0 | 6 | 11 | 3.5 | 7.5 | A | B | B |
| 1-8 | 80 | 1.0 | 3.0 | 150 | 0.8 | 0 | 2 | 0.9 | 1.0 | B | A | B |
| 1-9 | 80 | 3.5 | 0.7 | 360 | 0.4 | 5 | 15 | 4.9 | 10.3 | B | C | C |
| 1-10 | 80 | 1.0 | 4.3 | 295 | 1.1 | 0 | 1 | 0.8 | 1.1 | B | C | C |

TABLE 1-continued

| | | | | | | | | | | | | |
|---|---|---|---|---|---|---|---|---|---|---|---|---|
| 1-11 | 80 | 0.8 | 1.5 | 80 | 1.1 | 0 | 0 | 0.5 | 0.6 | A | A | A |
| 1-12 | 80 | 3.5 | 5.6 | 465 | 0.6 | 6 | 2 | 3.2 | 0.8 | C | C | C |
| 1-13 | 80 | 1.5 | 2.8 | 160 | 0.8 | 7 | 15 | 4.0 | 7.5 | A | B | B |
| 1-14 | 80 | 2.0 | 4.2 | 320 | 0.5 | 13 | 25 | 8.4 | 18.1 | C | B | C |
| 1-15 | 80 | 3.5 | 5.5 | 400 | 0.3 | 11 | 20 | 3.5 | 10.2 | C | C | C |
| 1-16 | 80 | 5.6 | 10.1 | 635 | 0.1 | 6 | 13 | 3.0 | 16.0 | D | D | D |
| 1-17 | 80 | 0.4 | 0.5 | 105 | 0.9 | 1 | 3 | 1.2 | 6.5 | A | A | A |
| 1-18 | 80 | 0.6 | 2.1 | 167 | 0.8 | 2 | 6 | 1.5 | 6.1 | B | B | A |
| 1-19 | 80 | 2.6 | 3.5 | 330 | 0.5 | 5 | 12 | 3.1 | 10.0 | C | C | C |

Samples No. 1-1 to No. 1-3, No. 1-6 to No. 1-8, No. 1-11, No. 1-13, No. 1-17 and No. 1-18 of the invention, produced according to the production method of the invention, were all good in point of the thickness fluctuation in the transverse direction and the longitudinal direction, the surface roughness Ra of both surfaces, the surface roughness ratio of both surfaces, the die streaks and the lateral unevenness. In addition, they were also good in that the haze was at most 0.3%, the Re unevenness and Rth unevenness was at most 5 nm, the transmittance was at least 91.8%, and neither coloration nor impurities were seen. The residual solvent content of the samples was measured, and was all 0%.

On the other hand, Comparative Examples No. 1-4 and 1-5 did not satisfy (T1−Tt) as defined in the invention, and therefore the comparative films were inferior to the films of the invention in point of the film thickness fluctuation, the surface roughness, the surface roughness ratio of both surfaces, the die streaks and the lateral unevenness. Comparative Example No. 1-9 did not satisfy the condition of the contact length Q as defined in the invention, and therefore the thickness of the comparative film greatly fluctuated both in TD and MD, and the surface roughness Ra thereof increased. Reference Example No. 1-10 satisfied the above formula (3) for the touch contact angle θ but its contact length Q was large, and therefore, the film thickness fluctuated both in TD and in MD and the film surface roughness Ra increased. Comparative Example No. 1-12 and No. 1-14 did not satisfy the condition of (Tg+20° C.) to (Tg+90° C.) since the temperature just before the filmy resin was held between the rolls was 230° C. and 150° C., and therefore, the film thickness fluctuated both in TD and in MD, optical distortion of Re and Rth remained in the films and the films were therefore not good. Comparative Example No. 1-15, for which silicone rubber was used as the surface material of the elastic touch roll, had an increased surface roughness Ra. Comparative Example No. 1-19 did not satisfy the contact length and the touch contact angle as defined in the invention, and the film thickness fluctuated both in TD and in MD, and the film surface roughness Ra increased. Comparative Example No. 1-16 for which a touch roll was not used were not good in point of the thickness fluctuation, the surface roughness, the surface roughness ratio of both surfaces, the die streaks and the lateral unevenness.

Example 2

Formation of Unstretched Thermoplastic Film 2:

In place of the metallic elastic touch roll used in Example 1, a metallic belt having a thickness of 0.3 mm and a belt length of 500 mm shown in FIG. 4 was used, and films were formed according to the condition shown in Table 2. The other condition is the same as in Example 1, and Samples No. 2-1 to 2-3 of the invention were formed. The films were tested and assessed for their physical properties, and the results are shown in Table 2 below. Samples No. 2-1 to No. 2-3 all had good properties like the samples of the invention in Example 1.

Example 3

Formation of Unstretched Thermoplastic Film 3:

In place of the CAP1 resin in Example 1 and Example 2, the following thermoplastic saturated norbornene-based resin was used.

(1) Saturated Norbornene Resin (i) Saturated Norbornene Resin—A

To 6-methyl-1,4,5,8-dimethano-1,4,4a,5,6,7,8,8a-octahydronaphthalene, 10 parts of a 15% cyclohexane solution of triethylaluminum, 5 parts of trinaphthalene, and 10 parts of 20% cyclohexane solution of titanium tetrachloride were added as a polymerization catalyst to carry out the ring-opening polymerization in cyclohexane. The obtained ring-opened polymer was hydrogenated with a nickel catalyst to obtain a polymer solution. The polymer solution was coagulated in isopropyl alcohol, and dried to obtain a powdery resin. The number average molecular weight (Mn), the weight-average molecular weight (Mw), the hydrogen additive rate, and the Tg of the resident were 40,000, (80000), 99.8% or more, and 139° C., respectively.

(ii) Saturated Norbornene Resin—B

To a reactor purged with nitrogen, 100 parts of 8-methyl-8-methoxycarbonitriletetracyclo[4.4.0.12.5,17.10]-3-dodecene (specific monomer B), 150 parts of 5-(4-biphenyl-carbonyloxy)bicycle[2.2.1]hepto-2-ene (specific monomer A), 18 parts of 1-hexene (molecular weight regulator), and 750 parts of toluene were fed, and the mixture was heated to 60° C. Subsequently, to the solution in the reactor, 0.62 parts of toluene solution of triethylaluminum (1.5 mol/l), and 3.7 parts of toluene solution (concentration 0.05 mol/l) of tungsten hexachloride (t-butanol: methanol: tungsten=0.35 mol: 0.3 mol: 1 mol) modified by t-butanol and methanol, were added as a polymerization catalyst, the system was heated and stirred at 80° C. for 3 hours, thereby subjecting to the ring-opening polymerization reaction to obtain the ring-opened polymer solution. The polymerization inversion rate in the polymerization reaction was 97%, and the intrinsic viscosity (πinh) when the obtained ring-opened polymer is measured in chloroform of 30° C. was 0.65 dl/g. 4,000 parts of thus obtained ring-opening polymerization solution was fed to an autoclave, to the ring-opened polymer solution, 0.48 parts of RuHCl (CO) [P($C_6H_5$)$_3$]$_3$ was added, the solution was heated and stirred for 3 hours, under the conditions of a hydrogen gas pressure of 100 kg/$cm^2$, a reacting temperature of 165° C., to carry out a hydrogenated reaction. The obtained reacting solution (hydrogenated polymer solution) was cooled, and then the hydrogen gas was discharged. The reacting solution was poured onto a large amount of methanol, and the aggregate was separated and recovered, and dried, to obtain a hydrogenated polymer (specific cyclic polyolefin resin). For thus obtained hydrogenated polymer, the hydrogen additive rate of olefin unsaturated bond was measured using a $^1$H-NMR at 400 MHz, the obtained value was 99.9%. The number average molecular weight (Mn) and the weight average molecular weight (Mw) in terms of polystyrene were measured according to a GPC method (solvent: tetrahydrofuran). As the results, the number average molecular weight (Mn), the weight-average molecular weight (Mw), and the molecular weight distribution (Mw/Mn) were 39,000, 126,000, and 3.23, respectively.

(iii) Saturated Norbornene Resin—C

A saturated norbornene compound (Tg: 127° C.) described in the Example 2 in Japanese Unexamined Patent Application Publication No. 2005-330465 was employed.

(iv) Saturated Norbornene Resin—D

A saturated norbornene compound (Tg: 181° C.) described in the Example 1 in PCT Japanese Translation Patent Publication No. 8-507800 was employed.

(v) Saturated Norbornene Resin—E

APL6015T manufactured by Mitsui Chemicals, Inc. (Tg: 145° C.) was employed.

(vi) Saturated Norbornene Resin—F

TOPAS 6013 manufactured by Polyplastics, Co., Ltd. (Tg: 130° C.) was employed.

(vii) Saturated Norbornene Resin—G

A saturated norbornene compound (Tg: 140° C.) described in the Example 1 in Japanese Patent No. 3693803 was employed.

(2) Pelletization of Saturated Norbornene-Based Resin:

The above-mentioned additive composition 4 was added to the above saturated norbornane resin, and processed at 220° C. to 240° C. in a nitrogen atmosphere in the same manner as in Example 1 to produce columnar pellets having a diameter of 3 mm and a length of 5 mm.

(3) Film Formation of Saturated Norbornene-Based Resin:

The resin pellets were dried in a vacuum drier at 110° C. to have a water content of at most 0.1% by mass, and then melt-cast into a film, using a single-screw extruder with a fullflight screw inserted thereinto and having L/D=35, a compression ratio of 3.5 and a screw diameter of 65 mm. Concretely, the pellets were put into the hopper which was so controlled that the film formation temperature could be 130° C., then melted in the extruder at a melting temperature on the upstream side of 210° C., at a melting temperature on the middle zone of 240° C. and at a melting temperature on the downstream side of 260° C., and thereafter a predetermined amount of the resulting melt was fed out with a gear pump for the purpose of increasing the thickness accuracy of the film to be formed. The polymer melt thus fed out via the gear pump was then filtered through a leaf disc filter having a filtration accuracy of 5 μm for removing impurities, and then fed out through a hanger coat die at 265° C. having a slit clearance of 0.8 mm via a static mixer, and formed into a film according to the casting film formation condition shown in Table 2. The other condition was the same as in Example 2, and Samples No. 3-1 to No. 3-9 of the invention were formed. The obtained films were tested and assessed for their physical properties, and the results are shown in Table 2.

Samples No. 3-1 to No. 3-3 of the invention are films formed of a starting material of saturated norbornene resin—A. Samples No. 3-4 to No. 3-9 are films formed of a starting material of saturated norbornene resin-B to saturated norbornene resin-G. Like the samples of the invention in Example 1, Samples No. 3-1 to No. 3-9 of the invention all had good properties.

TABLE 2

| Sample No. | Remarks | Types of Additives | Tg (° C.) | Temperature just before holding (° C.) | Touch System | Metallic Belt Surface Material | Surface Roughness (Ra) of Metallic belt (nm) | Temperature of Metallic belt (Tt) (° C.) | Temperature of Metallic cooling roll (T1) (° C.) | Contract Length of Touch roll (Q) (cm) | Center angle of Touch roll θ (°) |
|---|---|---|---|---|---|---|---|---|---|---|---|
| 2-1 | Example | Composition 1 | 135 | 190 | Metallic Belt | Metal | 25 | 125 | 130 | 5.0 | 11.5 |
| 2-2 | Example | Composition 1 | 135 | 190 | Metallic Belt | Metal | 25 | 130 | 135 | 6.0 | 13.8 |
| 2-3 | Example | Composition 1 | 135 | 190 | Metallic Belt | Metal | 25 | 108 | 118 | 6.0 | 13.8 |
| 3-1 | Example | Composition 4 | 139 | 210 | Metallic Belt | Metal | 25 | 135 | 140 | 4.0 | 9.2 |
| 3-2 | Example | Composition 4 | 139 | 210 | Metallic Belt | Metal | 25 | 130 | 135 | 4.0 | 9.2 |
| 3-3 | Example | Composition 4 | 139 | 210 | Elastic roll | Metal | 25 | 130 | 135 | 3.0 | 6.9 |
| 3-4 | Example | Composition 4 | 110 | 180 | Elastic roll | Metal | 25 | 105 | 108 | 3.0 | 6.9 |
| 3-5 | Example | Composition 4 | 127 | 210 | Elastic roll | Metal | 25 | 120 | 125 | 3.0 | 6.9 |
| 3-6 | Example | Composition 4 | 181 | 225 | Elastic roll | Metal | 25 | 160 | 175 | 3.0 | 6.9 |
| 3-7 | Example | Composition 4 | 145 | 220 | Elastic roll | Metal | 25 | 130 | 140 | 3.0 | 6.9 |
| 3-8 | Example | Composition 4 | 140 | 220 | Elastic roll | Metal | 25 | 130 | 135 | 3.0 | 6.9 |
| 3-9 | Example | Composition 4 | 140 | 220 | Elastic roll | Metal | 25 | 130 | 135 | 3.0 | 6.9 |

| Sample No. | Thickness (μm) | TD-thickness fluctuation (μm) | MD-thickness fluctuation (μm) | Surface Roughness (Ra) (nm) | The ratio of one Surface Roughness to the other | Re (nm) | Rth (nm) | \|Re (10%)-Re (80%)\| (nm) | \|Rth (10%)-Rth (80%)\| (nm) | Die Streak | Lateral unevenness | LCD Visibility |
|---|---|---|---|---|---|---|---|---|---|---|---|---|
| 2-1 | 150 | 0.4 | 0.6 | 125 | 0.9 | 1 | 6 | 1.4 | 4.5 | A | A | A |
| 2-2 | 90 | 0.6 | 0.8 | 130 | 0.9 | 0 | 4 | 1.1 | 2.1 | A | A | A |
| 2-3 | 60 | 0.3 | 0.5 | 150 | 0.9 | 1 | 5 | 1.3 | 1.7 | A | A | A |
| 3-1 | 100 | 0.5 | 0.6 | 90 | 0.9 | 0 | 0 | 0.6 | 2.0 | A | A | A |
| 3-2 | 80 | 0.4 | 0.5 | 61 | 0.9 | 0 | 0 | 0.6 | 2.2 | A | A | A |
| 3-3 | 65 | 0.4 | 0.7 | 102 | 0.9 | 1 | 3 | 0.7 | 1.9 | A | A | A |
| 3-4 | 50 | 0.3 | 0.5 | 100 | 0.9 | 0 | 1 | 0.6 | 1.5 | A | A | A |
| 3-5 | 60 | 0.4 | 0.5 | 90 | 0.9 | 1 | 2 | 0.5 | 1.4 | A | A | A |
| 3-6 | 70 | 0.5 | 0.7 | 80 | 0.9 | 3 | 4 | 0.8 | 1.6 | A | A | A |
| 3-7 | 80 | 0.4 | 0.6 | 130 | 0.9 | 2 | 3 | 0.8 | 1.8 | A | A | A |
| 3-8 | 120 | 0.6 | 0.9 | 105 | 1.1 | 4 | 6 | 0.9 | 2.1 | A | A | A |
| 3-9 | 65 | 0.5 | 0.8 | 90 | 0.9 | 1 | 3 | 0.7 | 1.5 | A | A | A |

Example 4

Formation of Unstretched Thermoplastic Film 4:

In place of the CAP1 resin in Example 1 and Example 2, herein used were various thermoplastic cellulose acylate resins that differ in the type of the acyl group, the degree of substitution and the degree of polymerization thereof, as mentioned below.

According to the method of the above-mentioned Production Examples 1 and 2 for cellulose acylate, various cellulose acylates shown in Table 2 were produced, for which the composition of the acylating agent, the reaction temperature and time for acylation, and the reaction temperature and time for partial hydrolysis were varied. Concretely, in accordance with the intended degree of acylation, cellulose was mixed with an acylating agent (selected from acetic acid, acetic anhydride, propionic acid, propionic anhydride, butyric acid and butyric anhydride, either singly or as combined) and a catalyst, sulfuric acid, and it was thus acylated at a reaction temperature kept not higher than 40° C. After the starting cellulose disappeared and the acylation finished, this was further heated at a temperature not higher than 40° C. to thereby control the degree of polymerization of the resulting polymer to a desired one. An aqueous acetic acid was added to it to hydrolyze the remaining acid anhydride, and then this was heated at a temperature not higher than 60° C. for partial hydrolysis, whereby the product was controlled to have a desired total degree of substitution. The remaining sulfuric acid was neutralized with an excessive amount of magnesium acetate. This was re-precipitated from aqueous acetic acid solution, and then repeatedly washed with water, thereby obtaining various cellulose acylates that differ in the type of the acyl group, the degree of substitution and the degree of polymerization as in Table 3 below.

As a substituted or unsubstituted aromatic acyl group-bonded cellulose acylate, produced was a cellulose acylate esterified with benzoic acid and acetic acid according to Example 1 in JP-A 2002-32201. In this, however, 2.45-substituted, or 2.20-substituted cellulose acylate was used as the starting cellulose acylate. As a result, herein obtained was an aromatic acyl group-substituted cellulose acylate having a degree of acetic acid substitution of 2.45, a degree of benzoic acid substitution of 0.55 and a number-average molecular weight of 38,000 (Sample No. 4-14 of the invention). Also obtained was an aromatic acyl group-substituted cellulose acylate having a degree of acetic acid substitution of 2.20, a degree of benzoic acid substitution of 0.80 and a number-average molecular weight of 41,000 (Sample No. 4-15 of the invention).

Also according to the above-mentioned method, produced was cellulose acetate propionate having a degree of acetyl substitution of 1.8, a degree of propionyl substitution of 0.8 and a number-average molecular weight of 60,000. To it, added was 10% by mass of the plasticizer described in Examples in JP-A 2006-195407 (Sample No. 4-16 of the invention).

Each of the obtained cellulose acylate resins was pelletized in the same manner as in Example 1, and then melt-cast into a film according to the film formation condition for Sample No. 1-1 of the invention in Example 1. The temperature of the metallic elastic touch roll used was Tg−10° C.; and the temperature of the casting roll was Tg−5° C. The other film formation condition was the same as that for Sample No. 1-1 of the invention in Example 1, thereby producing Samples No. 4-1 to 4-16 of the invention. The obtained films were tested and assessed for their physical properties, and the results are shown in Table 3. As a result, the samples of this Example all has good properties like the samples of the invention in Example 1.

Example 5

Formation of Unstretched Thermoplastic Film 5:

In place of the CAP1 resin in Example 1 and Example 2, herein used were various thermoplastic cellulose acylate resins that differ in the type of the acyl group, the degree of substitution and the degree of polymerization thereof, as mentioned below.

0.1 parts by mass of acetic acid and 2.7 parts by mass of propionic acid were sprayed over 10 parts by mass of cellulose (hardwood pulp), and then kept at room temperature for 1 hour. Apart from it, a mixture of 1.2 parts by mass of acetic anhydride, 61 parts by mass of propionic anhydride and 0.7 parts by mass of sulfuric acid was prepared, cooled to −10° C., and then mixed with the above pre-treated cellulose in a reactor. After 30 minutes, the outside temperature was elevated up to 30° C., and then this was reacted for 4 hours. 46 parts by mass of 25% aqueous acetic acid was added to the reactor, and the inside temperature was elevated up to 60° C., and this was stirred for 2 hours. 6.2 parts by mass of a solution prepared by mixing magnesium acetate 4-hydrate, acetic acid and water in a ratio of 1/1/1 was added to it, and stirred for 30 minutes. The reaction liquid was filtered under pressure through metal sintered filters having a retentive particle size of 40 μm, 10 μm or 3 μm in that order to remove impurities. Aqueous 75% acetic acid was mixed with the filtered reaction liquid, thereby precipitating cellulose acetate propionate, and then this washed with hot water at 70° C. until the pH of the wash waste could reach 6 to 7. Further, this was stirred in an aqueous 0.001% calcium hydroxide solution for 0.5 hours, and then filtered. The obtained cellulose acetate propionate was dried at 70° C. Its $^1$H-NMR confirmed that the obtained cellulose acetate propionate had a degree of acetyl substitution of 0.15, a degree of propionyl substitution of 2.62, a total degree of acyl substitution of 2.77, a number-average molecular weight of 54500 (number-average degree of polymerization DPn=173), a mass-average molecular weight of 132000 (mass-average degree of polymerization DPw=419), a residual sulfate content of 45 ppm, a magnesium content of 8 ppm, a calcium content of 46 ppm, a sodium content of 1 ppm, a potassium content of 1 ppm and an iron content of 2 ppm. The film formed through solution casting from a dichloromethane solution of this sample was observed with a polarizing microscope, and as a result, when the polarizing elements were kept crossed vertically or kept in parallel to each other, no impurities were found. Tg of the sample was 130° C.

Further, the amount of acetic anhydride and that of propionic anhydride were varied in the above, and cellulose acetate propionate was obtained, having a degree of acetyl substitution of 0.51, a degree of propionyl substitution of 2.33, a weight-average molecular weight of 136000 (mass-average degree of polymerization DPw=432) and a number-average molecular weight of 50300 (number-average degree of polymerization DPw=160). Its residual sulfate content was 32 ppm, its magnesium content was 11 ppm, its calcium content was 52 ppm, its sodium content was 2 ppm, its potassium content was 2 ppm, and its iron content was 1 ppm. The film formed through solution-casting from a dichloromethane solution of this sample was observed with a polarizing microscope, and as a result, when the polarizing elements were kept crossed vertically or kept in parallel to each other, no impurities were found. Tg of the sample was 137° C. The melt viscosity of the sample was 1015 Pa·s at 240° C.

The obtained cellulose acylate resin was pelletized in the same manner as in Example 1, and then melt-cast into a film according to the same film formation condition as that for Sample No. 1-1 of the invention in Example 1. The temperature of the metallic elastic touch roll sued was Tg-10° C.; and the temperature of the casting roll was Tg-5° C. The other film formation condition was the same as that for Sample No. 1-1 of the invention in Example 1, and Samples No. 5-1 to No. 5-2 of the invention were thus produced. On the other hand, under the same film formation condition as that for Sample No. 2-1 of the invention in Example 2 for which a metallic belt was used, Samples No. 5-3 and No. 5-4 of the invention were produced. The obtained films were tested and assessed for their physical properties, and the results are shown in Table 3. The data confirm that the samples of the invention in this Example all had good properties like the samples of the invention in Example

TABLE 3

| | | | | Material powder of Cellulose acylate | | | | | Film Property | |
|---|---|---|---|---|---|---|---|---|---|---|
| | | | | | Y or C | | X + Y | | | |
| | | | | | Substitution | | or | Number- | | |
| Sample No. | Remarks | Types of Additives | Tg (° C.) | X or A Substitution degree of Acetyl group | degree of groups except acetyl group | Groups except acetyl group | A + C Total substitution degree | Average Molecular Weight (x10000) | Thickness (μm) | TD-thickness fluctuation (μm) |
| 4-1 | Example | Composition 1 | 131 | 0.15 | 2.62 | Propionyl | 2.77 | 6.3 | 80 | 0.4 |
| 4-2 | Example | Composition 2 | 132 | 0.20 | 2.55 | Propionyl | 2.75 | 6.0 | 95 | 0.3 |
| 4-3 | Example | Composition 4 | 133 | 0.35 | 2.45 | Propionyl | 2.80 | 5.5 | 100 | 0.5 |
| 4-4 | Example | Composition 4 | 136 | 0.60 | 2.18 | Propionyl | 2.78 | 5.1 | 68 | 0.5 |
| 4-5 | Example | Composition 3 | 138 | 0.89 | 2.01 | Propionyl | 2.90 | 4.1 | 75 | 1.0 |
| 4-6 | Example | Composition 3 | 142 | 1.50 | 0.90 | Propionyl | 2.40 | 3.5 | 90 | 1.5 |
| 4-7 | Example | Composition 3 | 145 | 1.80 | 0.90 | Propionyl | 2.70 | 3.1 | 105 | 2.0 |
| 4-8 | Example | Composition 1 | 138 | 1.51 | 1.19 | Butyryl | 2.70 | 5.6 | 92 | 1.2 |
| 4-9 | Example | Composition 1 | 132 | 1.20 | 1.55 | Butyryl | 2.75 | 4.0 | 90 | 0.8 |
| 4-10 | Example | Composition 1 | 129 | 1.00 | 1.75 | Butyryl | 2.75 | 4.8 | 80 | 0.5 |
| 4-11 | Example | Composition 1 | 128 | 0.85 | 1.99 | Butyryl | 2.84 | 5.9 | 80 | 0.6 |
| 4-12 | Example | Composition 1 | 128 | 0.50 | 2.32 | Butyryl | 2.82 | 6.8 | 80 | 0.4 |
| 4-13 | Example | Composition 1 | 131 | 0.50 | 2.16 | Pentanoyl | 2.66 | 4.9 | 80 | 0.6 |
| 4-14 | Example | Composition 1 | 150 | 2.45 | 0.55 | Benzoyl | 3.00 | 3.8 | 68 | 0.8 |
| 4-15 | Example | Composition 1 | 148 | 2.20 | 0.80 | Benzoyl | 3.00 | 4.1 | 75 | 0.9 |
| 4-16 | Example | Composition 4 | 148 | 1.80 | 0.80 | Propionyl | 2.60 | 6.0 | 80 | 2.2 |
| 5-1 | Example | Composition 1 | 130 | 0.15 | 2.62 | Propionyl | 2.77 | 5.4 | 70 | 0.5 |
| 5-2 | Example | Composition 1 | 137 | 0.51 | 2.33 | Propionyl | 2.84 | 5.0 | 80 | 0.6 |
| 5-3 | Example | Composition 1 | 130 | 0.15 | 2.62 | Propionyl | 2.77 | 5.4 | 80 | 0.4 |
| 5-4 | Example | Composition 1 | 137 | 0.51 | 2.33 | Propionyl | 2.84 | 5.0 | 60 | 0.9 |

| | | | | Film Property | | | | | | |
|---|---|---|---|---|---|---|---|---|---|---|
| Sample No. | MD-thickness fluctuation (μm) | Surface Roughness (Ra) (nm) | The ratio of one Surface Roughness to the other | Re (nm) | Rth (nm) | \|Re (10%)-Re (80%)\| (nm) | \|Rth (10%)-Rth (80%)\| (nm) | Die Streak | Lateral unevenness | LCD Visibility |
| 4-1 | 0.6 | 40 | 1.0 | 1 | 4 | 0.8 | 3.5 | A | A | A |
| 4-2 | 0.5 | 60 | 1.0 | 1 | 5 | 1.0 | 4.0 | A | A | A |
| 4-3 | 0.7 | 80 | 1.0 | 1 | 6 | 1.0 | 4.2 | A | A | A |
| 4-4 | 0.7 | 78 | 0.9 | 0 | 5 | 1.5 | 6.2 | A | A | A |
| 4-5 | 1.5 | 80 | 0.9 | 2 | 7 | 2.5 | 10.0 | A | B | B |
| 4-6 | 1.8 | 167 | 1.1 | 3 | 10 | 3.0 | 12.1 | B | B | B |
| 4-7 | 2.1 | 195 | 1.2 | 5 | 12 | 3.5 | 15.0 | B | B | B |
| 4-8 | 1.5 | 158 | 1.0 | 2 | 6 | 2.5 | 11.4 | A | B | A |
| 4-9 | 1.0 | 110 | 1.0 | 1 | 6 | 1.9 | 8.5 | A | A | A |
| 4-10 | 0.8 | 90 | 1.0 | 0 | 4 | 1.7 | 4.2 | A | A | A |
| 4-11 | 0.7 | 70 | 0.9 | 1 | 4 | 1.6 | 3.5 | A | A | A |
| 4-12 | 0.8 | 75 | 0.9 | 0 | 3 | 1.5 | 2.6 | A | A | A |
| 4-13 | 1 | 80 | 0.9 | 2 | 6 | 1.5 | 2.4 | A | A | A |
| 4-14 | 0.9 | 110 | 1.2 | 0 | 0 | 0.5 | 6.0 | A | A | A |
| 4-15 | 1.3 | 134 | 1.1 | 1 | 1 | 0.8 | 5.0 | A | A | A |
| 4-16 | 2.5 | 200 | 1.2 | 5 | 13 | 3.4 | 16.0 | B | B | B |
| 5-1 | 0.8 | 60 | 1.0 | 0 | 1 | 0.5 | 1.8 | A | A | A |
| 5-2 | 0.7 | 95 | 0.9 | 2 | 4 | 0.9 | 3.1 | A | A | A |
| 5-3 | 0.8 | 72 | 1.0 | 1 | 3 | 0.6 | 1.7 | A | A | A |
| 5-4 | 1.2 | 98 | 0.9 | 1 | 3 | 1.1 | 3.5 | A | A | A |

Example 6

Formation of Stretched Thermoplastic Film:

Unstretched films of Samples No. 2-1, No. 1-1, No. 3-1, No. 3-8, No. 4-14, No. 4-15 and No. 4-16 of the invention were stretched to the MD and TD draw ratio shown in Table 4 below, at Tg+10° C. and at 300%/min (under the same condition for both MD stretching and TD stretching). The properties of the stretched films are shown in Table 4. The draw ration in stretching is defined by the following formula:

Draw Ratio (%)=100×{(length after stretching)−(length before stretching)}/(length before stretching).

Re and Rth fluctuation (change) in the transverse direction and the longitudinal direction and the orientation angle in the above Table were measured according to the methods mentioned below.

(1) The film to be tested is sampled in the longitudinal direction (MD) at 100 points at intervals of 0.5 m in the longitudinal direction, giving 100 MD samples each having a size of 1 cm×1 cm. It is sampled in the transverse direction (TD) at 50 points at regular intervals throughout the overall width thereof, giving 50 TD samples each having a size of 1 cm×1 cm.

(2) Re and Rth are measured according to the above-mentioned method. In this measurement, the MD side of the sample film is set in parallel to the direction in which the sample holder is inserted into the tester, and the orientation angle is thus measured.

(3) Re and Rth fluctuation is determined as follows: The difference between the maximum value and the minimum value of the 100 MD samples and the 50 TD samples is divided by the mean value, and this is expressed as percentage as Re and Rth fluctuation. The orientation angle is represented by the difference between the maximum value and the minimum value of the absolute value of the above samples.

The thermal dimensional change shown in Table 4 was determined according to the following method.

(1) The sample to be tested is cut in MD and TD into a piece of 5 cm×25 cm, and holes are formed, as spaced by an interval of 20 cm.

(2) This is conditioned at 25° C. and a relative humidity of 60% for 2 hours, and in this environment, the distance between the two holes is measured using a pin gauge (this is $L^1$).

(3) The sample is put in an air thermostat at 80° C. for 5 hours.

(4) This is taken out, and conditioned at 25° C. and a relative humidity of 60% for 3 hours, and then in this environment, the distance between the two holes is measured using a pin gauge (this is $L^2$).

(5) The dimensional change (%) of the sample is represented by:

$$100 \times (L^1 - L^2)/L^1 \, (\%).$$

TABLE 4

| | Longitudinal Draw Ratio (%) | Transverse Draw Ratio (%) | Re (nm) | Rth (nm) | Unstretched sheet Sample No. | Transverse Stretching Longitudinal Stretching L/W | Preheating (° C.) | Heat-treatment (° C.) | Relaxation Temperature (° C.) | Tension (kg/m) |
|---|---|---|---|---|---|---|---|---|---|---|
| Stretching Film 1 | 0 | 60 | 60 | 195 | Sample No. 2-1 | — | Tg + 15 | Tg | Tg + 5 | 10 |
| Stretching Film 2 | 70 | 10 | 63 | 200 | Sample No. 2-1 | 0.1 | Tg + 20 | Tg − 5 | Tg − 5 | 5 |
| Stretching Film 3 | 25 | 50 | 38 | 212 | Sample No. 2-1 | 0.28 | Tg + 30 | Tg − 10 | Tg − 5 | 2 |
| Stretching Film 4 | 5 | 60 | 57 | 185 | Sample No. 2-1 | 0.05 | Tg + 15 | Tg − 25 | Tg − 25 | 0.3 |
| Stretching Film 5 | 0 | 40 | 36 | 135 | Sample No. 2-1 | — | Tg + 55 | Tg + 8 | Tg − 5 | 18 |
| Stretching Film 6 | 100 | 0 | 200 | 60 | Sample No. 2-1 | 3 | — | — | Tg | 10 |
| Stretching Film 7 | 100 | 0 | 180 | 115 | Sample No. 2-1 | 1.5 | — | — | Tg | 10 |
| Stretching Film 8 | 40 | 60 | 20 | 300 | Sample No. 2-1 | 0.1 | Tg + 20 | Tg − 5 | Tg − 5 | 5 |
| Stretching Film 9 | 10 | 45 | 40 | 180 | Sample No. 2-1 | 0.1 | Tg + 30 | Tg + 5 | Tg − 5 | 10 |
| Stretching Film 10 | 10 | 105 | 66 | 220 | Sample No. 2-1 | 0.1 | Tg + 20 | Tg − 5 | Tg − 5 | 22 |
| Stretching Film 11 | 10 | 105 | 67 | 208 | Sample No. 2-1 | 0.1 | Tg + 10 | Tg + 10 | Tg − 5 | 5 |
| Stretching Film 12 | 5 | 55 | 60 | 205 | Sample No. 1-1 | 0.15 | Tg + 20 | Tg + 5 | Tg − 10 | 7 |
| Stretching Film 13 | 50 | 5 | 55 | 200 | Sample No. 1-1 | 30 | Tg + 40 | Tg | Tg − 5 | 4 |
| Stretching Film 14 | 0 | 40 | 70 | 200 | Sample No. 3-1 | — | Tg + 20 | Tg + 5 | Tg − 5 | 3 |
| Stretching Film 15 | 5 | 35 | 55 | 185 | Sample No. 3-8 | 0.2 | Tg + 30 | Tg − 5 | Tg | 6 |
| Stretching Film 16 | 5 | 40 | 65 | 190 | Sample No. 3-8 | 10 | Tg + 40 | Tg − 5 | Tg − 5 | 8 |
| Stretching Film 17 | 10 | 35 | 80 | 40 | Sample No. 4-14 | 0.15 | Tg + 20 | Tg + 5 | Tg | 3 |
| Stretching Film 18 | 5 | 35 | 85 | 38 | Sample No. 4-15 | 0.2 | Tg + 30 | Tg − 10 | Tg − 5 | 5 |
| Stretching Film 19 | 5 | 35 | 36 | 139 | Sample No. 4-16 | 5 | Tg + 20 | Tg + 15 | Tg − 5 | 10 |

| | Re Fluctuation (%) | Rth Fluctuation (%) | Orientation angle (°) | Surface Roughness (Ra) (nm) | Thermal dimensional change (%) | Thickness after stretching (μm) | TD-thickness fluctuation (μm) | MD-thickness fluctuation (μm) | LCD Visibility |
|---|---|---|---|---|---|---|---|---|---|
| Stretching Film 1 | 2 | 3 | 1 | 90 | 0.04 | 92 | 0.2 | 0.3 | A |
| Stretching Film 2 | 3 | 5 | 1 | 80 | 0.06 | 78 | 0.1 | 0.4 | A |
| Stretching Film 3 | 1 | 2 | 0.5 | 80 | 0.03 | 80 | 0.2 | 0.3 | A |
| Stretching Film 4 | 3 | 6 | 2 | 85 | 0.06 | 88 | 0.3 | 0.5 | A |
| Stretching Film 5 | 2 | 4 | 2 | 120 | 0.08 | 105 | 0.2 | 0.2 | A |
| Stretching Film 6 | 4 | 5 | 3 | 70 | 0.06 | 73 | 0.2 | 0.4 | A |
| Stretching Film 7 | 11 | 15 | 14 | 70 | 0.16 | 75 | 0.3 | 0.3 | B |
| Stretching Film 8 | 1 | 4 | 0 | 70 | 0.02 | 67 | 0.2 | 0.3 | A |
| Stretching Film 9 | 3 | 5 | 7 | 70 | 0.05 | 90 | 0.2 | 0.3 | A |
| Stretching Film 10 | 9 | 12 | 8 | 70 | 0.20 | 65 | 0.3 | 0.5 | B |
| Stretching Film 11 | 12 | 16 | 12 | 70 | 0.15 | 67 | 0.4 | 0.6 | B |
| Stretching Film 12 | 1 | 3 | 1 | 80 | 0.02 | 50 | 0.3 | 0.5 | A |
| Stretching Film 13 | 2 | 4 | 1 | 80 | 0.04 | 51 | 0.3 | 0.5 | A |

TABLE 4-continued

| | | | | | | | | | |
|---|---|---|---|---|---|---|---|---|---|
| Stretching Film 14 | 1 | 2 | 1 | 80 | 0.01 | 70 | 0.4 | 0.4 | A |
| Stretching Film 15 | 1 | 2 | 1 | 90 | 0.01 | 83 | 0.4 | 0.8 | A |
| Stretching Film 16 | 1 | 1 | 1 | 75 | 0.01 | 80 | 0.3 | 0.7 | A |
| Stretching Film 17 | 4 | 3 | 2 | 95 | 0.03 | 48 | 0.5 | 0.6 | A |
| Stretching Film 18 | 4 | 3 | 1 | 120 | 0.05 | 53 | 0.5 | 1.0 | A |
| Stretching Film 19 | 5 | 9 | 7 | 175 | 0.10 | 55 | 1.1 | 1.9 | B |

Example 7

Construction of Polarizing Plate:
(1) Saponification of Cellulose Acylate Film:
The above-mentioned, long-aged, unstretched cellulose acylate film and stretched cellulose acylate film were subjected to dipping saponification according to the method mentioned below. The following coating saponification made on the films gave the same results as in the dipping saponification.
(1-1) Dipping Saponification:
An aqueous NaOH (2.0 mol/L) solution was prepared as a saponification solution, and conditioned at 60° C. The cellulose acylate film was dipped in the solution for 2 minutes. Next, this was dipped in an aqueous sulfuric acid (0.05 mol/L) solution for 30 seconds, and then led to pass through a water-washing bath.
(1-2) Coating Saponification:
80 parts by mass of water was added to 20 parts by mass of iso-propanol, and KOH was dissolved therein to have a concentration of 2.0 mol/L. This was conditioned at 60° C. and used as a saponification solution. This was applied to the cellulose acylate film at 60° C. in an amount of 10 g/m$^2$, and the film was thus saponified for 1 minute. Next, this washed by spraying thereon hot water at 50° C. in a degree of 10 L/m$^2$·min for 1 minute.
(2) Formation of Polarizing Element:
According to Example 1 in JP-A 2001-141926, a film was stretched in the longitudinal direction, between two pairs of nip rolls having a different peripheral speed to prepare a polarizing element having a thickness of 20 μm.
(3) Lamination:
Thus obtained, the polarizing element was laminated with any of the saponified, unstretched or stretched cellulose acylate film or a saponified unstretched triacetate film (Fujitac by Fuji Photo Film) according to the combination mentioned below, using an aqueous 3% PVA (Kuraray's PVA-117H) solution as an adhesive in such a manner that the stretching direction of the polarizing element could be in the film-running direction (longitudinal direction) of the cellulose acylate film, thereby constructing polarizing plates. The norbornene-based film of the invention was corona-treated on its surface so that the contact angle with the surface to water could be 60°. Using an acrylic adhesive, polarizing plates D and E were constructed.

Polarizing Plate A: unstretched cellulose acylate film/polarizing film/Fujitac (TD80UL)

Polarizing Plate B: unstretched cellulose acylate film/polarizing film/unstretched cellulose acylate film Polarizing Plate C: unstretched cellulose acylate film/polarizing film/stretched cellulose acylate film Polarizing Plate D: unstretched norbornene-based film/polarizing film/Fujitac (TD80UL)

Polarizing Plate E: stretched norbornene-based film/polarizing film/Fujitac (TD80UL)

Thus obtained, any of the polarizing plates A to E was fitted to a 20-inch VA-mode liquid-crystal display device of FIGS. 2 to 9 in JP-A 2000-154261 at 25° C. and a relative humidity of 60%, and then this was put in an atmosphere at 25° C. and a relative humidity of 10% or 80%, and visually assessed for its LCD visibility according to the standard mentioned below.

The results are shown in Table 1 to Table 3. The devices comprising the thermoplastic film produced according to the production method of the invention had good properties. However, the devices not falling within the scope of the invention had poor LCD visibility.

The standard for visibility assessment is as follows:
A: At the time of black level of display, the device had none of die streaks, blurred display and image distortion.
B: At the time of black level of display, the device had some but slight die streaks, blurred display and image distortion.
C: At the time of black level of display, the device had some obvious die streaks, blurred display and image distortion.
D: At the time of black level of display, the device had remarkable die streaks, blurred display and image distortion on the entire surface of the panel.

Example 8

Production of Optical Compensatory Film
(1) Unstretched Cellulose Acylate Film
The unstretched cellulose acylate film according to the invention was used as the first transparent substrate of Example 1 of JP-A No. H$_{11}$-316378. An optical compensatory film having excellent performances can be obtained.
(2) Stretched Cellulose Acylate Film
The stretched cellulose acylate film according to the invention was used in stead of the cellulose acylate film coated with the liquid crystal layer of Example 1 in JP-A No. H11-316378. An optical compensatory film having excellent performances can be obtained.

The stretched cellulose acylate film according to the invention was used in stead of the cellulose acylate film coated with the liquid crystal layer of Example 1 in JP-A No. H7-333433. An optical compensatory film having excellent performances can be obtained.

Example 9

Preparation of Low Reflective Film
Low reflective films were prepared by using the cellulose acylate films of the present invention according to Kokai Gifo of Japan Institute of Invention & Innovation, Kogi No. 2001-1745, Example 47. As a result, superior optical performance could be obtained.

Example 10

Preparation of Liquid Crystal Display Device
The aforementioned polarizing plates of the present invention were used in the liquid crystal display device described in JP-A No. H10-48420, Example 1, optically anisotropic layer containing discotic liquid crystal molecules and oriented film applied with polyvinyl alcohol described in JP-A No. H9-26572, Example 1, 20-inch VA type liquid crystal display device described in JP-A No. 2000-154261, FIGS. 2 to 9, and 20-inch OCB type liquid crystal display device described in JP-A No. 2000-154261, FIGS. 10 to 15. Further, the low reflective films of the present invention were adhered to the outermost layers of these liquid crystal display devices and evaluated. As a result, favorable liquid crystal display devices showing no display unevenness originated in the adhesion marks could be obtained.

According to the invention, a thermoplastic film can be produced which has more improved thickness accuracy and surface smoothness. Accordingly, the invention provides a transparent thermoplastic film at high producibility, having the advantages in that the film thickness accuracy is high, the film surface roughness Ra is minimized, the film has no trouble of rough streaks on its surface, and the film has reduced optical distortion with reduced retardation (Re and Rth). Therefore, the invention may solve the problems of blurred display and image distortion that may occur when a resin film is built in liquid-crystal display devices.

To that effect, the thermoplastic film of the invention is extremely useful for polarizing plates, optical compensation films and antireflection films. Accordingly, the industrial applicability of the invention is great.

The present disclosure relates to the subject matter contained in Japanese Patent Application No. 157004/2006 filed on Jun. 6, 2006, Japanese Patent Application No. 208740/2006 filed on Jul. 31, 2006, and Japanese Patent Application No. 123297/2007 filed on May 8, 2007 which are expressly incorporated herein by reference in their entirety. JP-A Nos. 11-314263, 2002-36332, 11-235747, 2004-216717, 2003-145609, and WO97/28950 referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a thermoplastic film, comprising cooling and solidifying a filmy thermoplastic resin melt extruded out through a die, by holding it between a metallic presser and a metallic casting roll for cooling; wherein the temperature of the filmy thermoplastic resin just before being held between the metallic presser and the casting roll for cooling is from Tg+20° C. to Tg+90° C., in which Tg is a glass transition temperature of the thermoplastic resin, and a difference between a surface temperature (Tt) of the metallic presser and a surface temperature (T1) of the casting roll for cooling satisfies the following formula (1), and a contact length Q, which is a length contacting one surface of the filmy thermoplastic resin with the metallic presser and contacting the other surface of the filmy thermoplastic resin with the casting roll for cooling, satisfies the following formula (2):

$$0.5° C. \leq T1-Tt \leq 20° C. \tag{1}$$

$$0.1\ cm \leq Q \leq 8\ cm \tag{2}$$

wherein T1 indicates a surface temperature of the casting roll for cooling; Tt indicates a surface temperature of the metallic presser; Q indicates a contact length, which is a length contacting one surface of the filmy thermoplastic resin with the metallic presser and contacting the other surface of the filmy thermoplastic resin with the casting roll for cooling.

2. A method for producing a thermoplastic film, comprising cooling and solidifying a filmy thermoplastic resin melt extruded out through a die, by holding it between a metallic presser and a metallic casting roll for cooling; wherein the temperature of the filmy thermoplastic resin just before being held between the metallic presser and the casting roll for cooling is from Tg+20° C. to Tg+90° C., in which Tg means a glass transition temperature of the thermoplastic resin, and a difference between a surface temperature (Tt) of the metallic presser and a surface temperature (T1) of the casting roll for cooling satisfies the following formula (1), and a center angle θ, which is derived from a contact length Q, which is a length contacting one surface of the filmy thermoplastic resin with the metallic presser and contacting the other surface of the filmy thermoplastic resin with the casting roll for cooling, and a radius of the metallic casting roll for cooling satisfies the following formula (3):

$$0.5° C. \leq T1-Tt \leq 20° C. \tag{1}$$

$$0.2° \leq \theta \leq 31° \tag{3}$$

wherein T1 indicates a surface temperature of the casting roll for cooling; Tt indicates a surface temperature of the metallic presser; Q indicates a contact length, which is a length contacting one surface of the filmy thermoplastic resin with the metallic presser and contacting the other surface of the filmy thermoplastic resin with the casting roll for cooling.

3. The method for producing a thermoplastic film according to claims 1 or 2, wherein the metallic presser is a metallic elastic touch roll or an endless metallic belt runnable under tension.

4. The method for producing a thermoplastic film according to claims 1 or 2, wherein the surface temperature (Tt) of the metallic presser is from Tg−40° C. to Tg+50° C., in which Tg means a glass transition temperature of the thermoplastic resin.

5. The method for producing a thermoplastic film according to claims 1 or 2, wherein the surface roughness Ra of the metallic presser and the casting roll for cooling is from 0 to 100 nm.

6. The method for producing a thermoplastic film according to claims 1 or 2, wherein from 1 to 6 metallic rigid rolls are installed on the downstream side of the metallic casting roll for cooling in series.

7. The method for producing a thermoplastic film according to claim 1, wherein the thermoplastic film is stretched in an aspect ratio, length/width, L/W of from 2 to 50, or from 0.01 to 0.3.

8. The method for producing a thermoplastic film according to claim 1, wherein the thermoplastic film is stretched in the transverse direction and preheated at a temperature higher than the stretching temperature by from 1° C. to 50° C. prior to the stretching.

9. The method for producing a thermoplastic film according to claim 1, wherein the thermoplastic film is stretched in the transverse direction and then heat-treated at a temperature lower than the stretching temperature by from 1° C. to 50° C.

10. The method for producing a thermoplastic film according to claim 1, wherein the thermoplastic film is stretched in at least one direction of longitudinal direction or transverse direction and then thermally relaxed by conveying it at a temperature of from (Tg−50° C.) to (Tg+30° C.) under a tension of from 0.1 kg/m to 20 kg/m.

11. The method for producing a thermoplastic film according to claim 1, wherein the surface roughness Ra of the metallic presser is from 0 to 50 nm, and the surface roughness Ra of the casting roll for cooling is from 0 to 100 nm.

* * * * *